United States Patent
Michael et al.

(10) Patent No.: US 11,177,895 B2
(45) Date of Patent: Nov. 16, 2021

(54) TRANSMISSION APPARATUS, TRANSMISSION METHOD, RECEPTION APPARATUS, AND RECEPTION METHOD

(71) Applicant: SONY CORPORATION, Tokyo (JP)

(72) Inventors: Lachlan Bruce Michael, Saitama (JP); Kazuyuki Takahashi, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/331,817

(22) PCT Filed: Sep. 1, 2017

(86) PCT No.: PCT/JP2017/031590
§ 371 (c)(1),
(2) Date: Mar. 8, 2019

(87) PCT Pub. No.: WO2018/051818
PCT Pub. Date: Mar. 22, 2018

(65) Prior Publication Data
US 2019/0245634 A1    Aug. 8, 2019

(30) Foreign Application Priority Data

Sep. 15, 2016  (JP) .............................. JP2016-180763

(51) Int. Cl.
*H04H 20/28* (2008.01)
*H04N 21/236* (2011.01)
(Continued)

(52) U.S. Cl.
CPC ............ *H04H 20/28* (2013.01); *H04H 60/73* (2013.01); *H04J 3/00* (2013.01); *H04L 1/0057* (2013.01);
(Continued)

(58) Field of Classification Search
CPC . H04H 20/28; H04H 60/73; H04J 3/00; H04J 3/0605; H04J 1/06; H04J 1/00;
(Continued)

(56) References Cited

U.S. PATENT DOCUMENTS 5,502,497 A    3/1996  Yamaashi et al.
2007/0243837 A1*  10/2007  Krishnamoorthi ..........................
H04L 25/0232
455/115.1
(Continued)

FOREIGN PATENT DOCUMENTS

CN    1929338 A    3/2007
EP    2234317 A1 *  9/2010  ........... H04L 5/0091
(Continued)

OTHER PUBLICATIONS

NPL (DVB-T2 Technical Spec. V1.2.1, Aug. 2012 ts_102831v010201p) (Year: 2012).*

(Continued)

*Primary Examiner* — Dong-Chang Shiue
(74) *Attorney, Agent, or Firm* — Oblon, McClelland, Maier & Neustadt, L.L.P.

(57) ABSTRACT

The present technology relates to a transmission apparatus capable of more flexibly realizing a plurality of multiplexing systems in the same broadcasting system, a transmission method, a reception apparatus, and a reception method. A transmission apparatus generates a physical layer frame multiplexed in a predetermined multiplexing system and including determination information capable of determining a multiplexing system, and transmits the physical layer frame as a broadcasting signal. On the other hand, a reception apparatus receives a broadcasting signal, and determines a multiplexing system of a physical layer frame multiplexed in a predetermined multiplexing system on the basis of determination information included in the physical (Continued)

layer frame acquired from the broadcasting signal, and processes the physical layer frame. The present technology can be applied to transmission systems for terrestrial digital TV broadcasting systems, for example.

19 Claims, 72 Drawing Sheets

(51) Int. Cl.
  *H04H 60/73* (2008.01)
  *H04J 3/00* (2006.01)
  *H04L 1/00* (2006.01)
(52) U.S. Cl.
  CPC ......... *H04L 1/0071* (2013.01); *H04N 21/236* (2013.01)
(58) Field of Classification Search
  CPC ... H04L 1/0023; H04L 1/0071; H04L 1/0057; H04N 21/236
  See application file for complete search history.

(56) References Cited

U.S. PATENT DOCUMENTS

| | | | |
|---|---|---|---|
| 2009/0183205 A1 | 7/2009 | McCartie et al. | |
| 2011/0299493 A1* | 12/2011 | Gutierrez | H04H 20/42 370/329 |
| 2012/0076127 A1* | 3/2012 | Mourad | H04H 20/426 370/345 |
| 2012/0188954 A1* | 7/2012 | Mourad | H04L 5/0037 370/329 |
| 2015/0358106 A1* | 12/2015 | Limberg | H04L 27/2273 375/308 |
| 2016/0226687 A1 | 8/2016 | Kim et al. | |
| 2016/0226694 A1* | 8/2016 | Kim | H04L 1/0075 |
| 2017/0005761 A1* | 1/2017 | Oh | H04L 27/2613 |
| 2017/0163461 A1* | 6/2017 | Baek | H04L 27/2602 |
| 2017/0324597 A1 | 11/2017 | Kim et al. | |
| 2017/0373894 A1 | 12/2017 | Kim et al. | |
| 2018/0375702 A1 | 12/2018 | Kim et al. | |

FOREIGN PATENT DOCUMENTS

| | | |
|---|---|---|
| JP | 5-64167 A | 3/1993 |
| JP | 2000-269827 A | 9/2000 |
| JP | 2011-515883 A | 5/2011 |

OTHER PUBLICATIONS

Partial Supplementary European Search Report dated Jul. 25, 2019 in corresponding European Patent Application No. 17850721.6, 12 pages.
International Search Report dated Nov. 21, 2017 in PCT/JP2017/031590, 2 pages.
ATSC, "Transmission System For Digital Terrestrial Television Broadcasting", ARIB Standard, ARIB STD-B31 Version 2.2, Mar. 18, 2014, 428 pages (with English Translation).
Extended European Search Report dated Oct. 29, 2019 in corresponding European Patent Application No. 17850721.6, 10 pages.
Chinese Office Action and Search Report Issued in Application CN201780054966.5 dated Mar. 3, 2020, with English Translation (15 pages).
Japanese Office Action dated Jun. 9, 2020 in Japanese Patent Application No. 2016-180763, 5 pages.
"ATSC Standard: A/321, System Discovery and Signaling", Advanced Television Systems Committee, Mar. 23, 2016, pp. 1-28.

* cited by examiner

FIG. 4

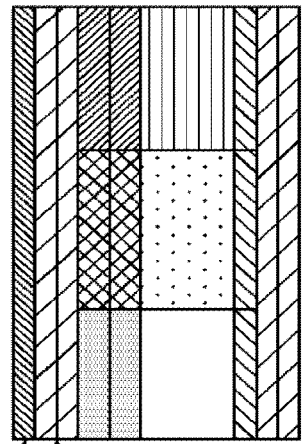

Proposed Framing Concept

- 1 x FSS symbol
  - ATSC3.0 bootstrap-like symbols
    - For sync and version/type recognition
- m x P1-type
  - m x ATSC3.0 bootstrap-like symbols
  - m ≥ 1
  - for signalling
  - Modulated full-band, decodeable per layer
- n x P2-type preambles
  - n x OFDM symbols
  - Built per layer, modulated as one symbol
  - Each layer consists of segments. Each segment consists of subcarriers
  - Subcarriers in layer carry L1 for the layer
  - FIL (frequency interleaver) per layer or no FIL.
- FIL
  - Config for fullband or per layer

FIG. 13

| g | FFT | Samples | Max bps | Robust bps |
|---|---|---|---|---|
| 0.25 | 512 | 768 | 9 | 5, 6 |
| 0.50 | 1024 | 1536 | 10 | 6, 7 |
| 1.00 | 2048 | 3072 | 11 | 7, 8 |
| 2.00 | 4096 | 6144 | 12 | 8, 9 |
| 4.00 | 8192 | 12288 | 13 | 9, 10 |

FIG. 22

| FFT | Samples Per sym | Max bps | Robust bps | # Syms | Max bits | Total Samples |
|---|---|---|---|---|---|---|
| 512 | 768 | 9 | 5 | 4 | 15 | 3072 |
| 1024 | 1536 | 10 | 6 | 3 | 12 | 4608 |
| 2048 | 3072 | 11 | 7 | 3 | 14 | 9216 |
| 4096 | 6144 | 12 | 8 | 3 | 16 | 18432 |
| 8192 | 12288 | 13 | 9 | 3 | 18 | 36864 |

FIG. 28

| Binary | Hexadecimal | Frame Multiplexing |
|---|---|---|
| 0000 0001 1001 1101 | 0x019D | FDM |
| 0000 0000 1110 1101 | 0x00ED | TDM |
| 0000 0001 1110 1000 | 0x01E8 | LDM |
| ... | ... | ... |

*FIG. 29*

Preamble 1 Signaling Data (12 bits)

| Syntax (TDM) | No. of Bits | Format | Semantics |
|---|---|---|---|
| P1_signaling() { | | | |
|   P1_P2_waveform_structure | 7 | uimsbf | FFT SIZE, GI, FEC TYPE, AND PILOT PATTERN |
|   P1_eas_wake_up | 1 | uimsbf | EMERGENCY ALARM FLAG |
|   P1_band_width | 2 | uimsbf | BAND WIDTH OF BROADCASTING SIGNAL |
|   P1_Reserved | 2 | uimsbf | FUTURE EXTENSION |
| } | | | |

FIG. 30

| P1_P2_waveform_structure | DETAILED EXAMPLES (FFT SIZE, GI, AND SP PATTERN (34)) |
|---|---|
| 0000000 | FFT SIZE = 8K, GI = 256, FEC TYPE = 1, PILOT PATTERN = 16_2 |
| 0000001 | FFT SIZE = 8K, GI = 256, FEC TYPE = 1, PILOT PATTERN = 16_4 |
| 0000010 | FFT SIZE = 8K, GI = 512, FEC TYPE = 1, PILOT PATTERN = 12_2 |
| ... | ... |
| 1000010 | FFT SIZE = 32K, GI = 2048, FEC TYPE = 2, PILOT PATTERN = 6_2 |
| ... | ... |
| 1111111 | FUTURE EXTENSION |

FIG. 31

Preamble 1 Signaling Data (12 bits)

| Syntax (FDM) | No. of Bits | Format | Semantics |
|---|---|---|---|
| P1_signaling() { | | | |
| P1_P2_waveform_structure | 7 | uimsbf | FFT SIZE, GI, FEC TYPE, PILOT PATTERN, AND NUMBER OF SEGMENTS OF LAYER A |
| P1_eas_wake_up | 1 | uimsbf | EMERGENCY ALARM FLAG |
| P1_band_width | 2 | uimsbf | BAND WIDTH OF BROADCASTING SIGNAL |
| P1_Reserved | 2 | uimsbf | FUTURE EXTENSION |
| } | | | |

FIG. 32

| P1_P2_waveform_structure | DETAILED EXAMPLES (FFT SIZE, GI, AND SP PATTERN (34)) |
|---|---|
| 0000000 | FFT SIZE =8K, GI = 256, FEC TYPE = 1, PILOT PATTERN = 16_2, NUMBER OF SEGMENTS OF LAYER A = 9 |
| 0000001 | FFT SIZE =8K, GI = 256, FEC TYPE = 1, PILOT PATTERN = 16_2, NUMBER OF SEGMENTS OF LAYER A = 7 |
| 0000010 | FFT SIZE =8K, GI = 256, FEC TYPE = 1, PILOT PATTERN = 16_2, NUMBER OF SEGMENTS OF LAYER A = 3 |
| 0000011 | FFT SIZE =8K, GI = 256, FEC TYPE = 1, PILOT PATTERN = 16_2, NUMBER OF SEGMENTS OF LAYER A = 1 |
| 0000100 | FFT SIZE =8K, GI = 256, FEC TYPE = 1, PILOT PATTERN = 16_4, NUMBER OF SEGMENTS OF LAYER A = 9 |
| ... | ... |
| 0010010 | FFT SIZE =16K, GI = 1024, FEC TYPE = 1, PILOT PATTERN = 12_2, NUMBER OF SEGMENTS OF LAYER A = 3 |
| 0010011 | FFT SIZE =16K, GI = 1024, FEC TYPE = 1, PILOT PATTERN = 12_2, NUMBER OF SEGMENTS OF LAYER A = 9 |
| ... | ... |
| 1000010 | FFT SIZE =32K, GI = 2048, FEC TYPE = 2, PILOT PATTERN = 6_2, NUMBER OF SEGMENTS OF LAYER A = 9 |
| ... | ... |
| 1111111 | FUTURE EXTENSION |

FIG. 33

Preamble 1 Signaling Data (12 bits)

| Syntax (LDM) | No. of Bits | Format | Semantics |
|---|---|---|---|
| P1_signaling() { | | | |
|   P1_P2_waveform_structure | 7 | uimsbf | FFT SIZE, GI, FEC TYPE, AND PILOT PATTERN |
|   P1_eas_wake_up | 1 | uimsbf | EMERGENCY ALARM FLAG |
|   P1_band_width | 2 | uimsbf | BAND WIDTH OF BROADCASTING SIGNAL |
|   P1_Reserved | 2 | uimsbf | FUTURE EXTENSION |
| } | | | |

FIG. 34

| P1_P2_waveform_structure | DETAILED EXAMPLES (FFT SIZE, GI, AND SP PATTERN (34)) |
|---|---|
| 0000000 | FFT SIZE = 8K, GI = 256, FEC TYPE = 1, PILOT PATTERN = 16_2 |
| 0000001 | FFT SIZE = 8K, GI = 256, FEC TYPE = 1, PILOT PATTERN = 16_4 |
| 0000010 | FFT SIZE = 8K, GI = 512, FEC TYPE = 1, PILOT PATTERN = 12_2 |
| ... | ... |
| 1000010 | FFT SIZE = 32K, GI = 2048, FEC TYPE = 2, PILOT PATTERN = 6_2 |
| ... | ... |
| 1111111 | FUTURE EXTENSION |

FIG. 35

| FFT/GI | 1/128 | 1/64 | 1/32 | 1/16 | 1/8 | 1/4 |
|--------|-------|------|------|------|-----|-----|
| 8K | N/A | N/A | 256 | 512 | 1024 | 2048 |
| 16K | N/A | 256 | 512 | 1024 | 2048 | N/A |
| 32K | 256 | 512 | 1024 | 2048 | N/A | N/A |

FIG. 36

| GI Pattern | Samples | 8K FFT | 16K FFT | 32K FFT |
|---|---|---|---|---|
| GI_256 | 256 | SP16_2, SP16_4 | SP32_2, SP32_4, SP16_2, SP16_4 | SP32_2 |
| GI3_512 | 512 | SP12_2, SP12_4, SP6_2, SP6_4 | SP24_2, SP24_4, SP12_2, SP12_4 | SP24_2 |
| GI5_1024 | 1024 | SP6_2, SP6_4, SP3_2, SP3_4 | SP12_2, SP12_4, SP6_2, SP6_4 | SP24_2, SP12_2 |
| GI7_2048 | 2048 | SP3_2, SP3_4 | SP6_2, SP6_4, SP3_2, SP3_4 | SP12_2, SP6_2 |

FIG. 37

Preamble 1 Signaling Data (12 bits)

| Syntax (TDM) | No. of Bits | Format | Semantics |
|---|---|---|---|
| P1_signaling() { | | | |
| P1_P2_waveform_structure | 7 | uimsbf | FFT SIZE, GI, FEC TYPE, AND PILOT PATTERN |
| P1_eas_wake_up | 1 | uimsbf | EMERGENCY ALARM FLAG |
| P1_band_width | 2 | uimsbf | BAND WIDTH OF BROADCASTING SIGNAL |
| P1_Frame_Multiplexing | 2 | uimsbf | FDM, TDM, LDM, AND OTHERS |
| } | | | |

*FIG. 38*

| P1_Frame_Multiplexing | MEANING |
|---|---|
| 00 | FDM |
| 01 | TDM |
| 10 | LDM |
| 11 | FUTURE EXTENSION |

FIG. 39

Preamble 1 Signaling Data (12 bits)

| Syntax (FDM) | No. of Bits | Format | Semantics |
|---|---|---|---|
| P1_signaling() { | | | |
| P1_P2_waveform_structure | 7 | uimsbf | FFT SIZE, GI, FEC TYPE, PILOT PATTERN, TOTAL NUMBER OF SEGMENTS, NUMBER OF SEGMENTS OF LAYER A |
| P1_eas_wake_up | 1 | uimsbf | EMERGENCY ALARM FLAG |
| P1_band_width | 2 | uimsbf | BAND WIDTH OF BROADCASTING SIGNAL |
| P1_Frame_Multiplexing | 2 | uimsbf | FDM, TDM, LDM, AND OTHERS |
| } | | | |

FIG. 40

| P1_Frame_Multiplexing | MEANING |
|---|---|
| 00 | FDM |
| 01 | TDM |
| 10 | LDM |
| 11 | FUTURE EXTENSION |

FIG. 41

Preamble 1 Signaling Data (12 bits)

| Syntax (LDM) | No. of Bits | Format | Semantics |
|---|---|---|---|
| P1_signaling() { | | | |
| P1_P2_waveform_structure | 7 | uimsbf | FFT SIZE, GI, FEC TYPE, AND PILOT PATTERN |
| P1_eas_wake_up | 1 | uimsbf | EMERGENCY ALARM FLAG |
| P1_band_width | 2 | uimsbf | BAND WIDTH OF BROADCASTING SIGNAL |
| P1_Frame_Multiplexing | 2 | uimsbf | FDM, TDM, LDM, AND OTHERS |
| } | | | |

FIG. 42

| P1_Frame_Multiplexing | MEANING |
|---|---|
| 00 | FDM |
| 01 | TDM |
| 10 | LDM |
| 11 | FUTURE EXTENSION |

FIG. 43

Preamble 2 L1-Basic Signaling Fields and Syntax (128 bits / 16 bytes)

| Syntax (TDM) | No. of Bits | Format | Semantics |
|---|---|---|---|
| L1_Basic_signaling() { | | | |
| L1B_version | 3 | uimsbf | VERSION INFORMATION OF L1-Basic |
| L1B_eas-wake_up | 1 | uimsbf | EMERGENCY ALARM FLAG |
| L1B_lls_flag | 1 | uimsbf | FLAG INDICATING UPPER LAYER SIGNALING |
| L1B_time_info_flag | 1 | uimsbf | TIME INFORMATION FLAG |
| L1B_L1_Detail_size_bytes | 8 | uimsbf | SIZE OF L1-Detail |
| L1B_L1_Detail_fec_type | 2 | uimsbf | FEC TYPE OF L1-Detail |
| L1B_reserved | 80 | uimsbf | FUTURE EXTENSION |
| L1B_crc | 32 | uimsbf | PARITY OF ERROR DETECTION |
| } | | | |

FIG. 44

Preamble 2 L1-Basic Signaling Fields and Syntax (128 bits / 16 bytes)

| Syntax (FDM) | No. of Bits | Format | Semantics |
|---|---|---|---|
| L1_Basic_signaling() { | | | |
| L1B_version | 3 | uimsbf | VERSION INFORMATION OF L1-Basic |
| L1B_eas-wake_up | 1 | uimsbf | EMERGENCY ALARM FLAG |
| L1B_lls_flag | 1 | uimsbf | FLAG INDICATING UPPER LAYER SIGNALING |
| L1B_time_info_flag | 1 | uimsbf | TIME INFORMATION FLAG |
| L1B_num_layers | 2 | uimsbf | NUMBER OF LAYERS |
| L1B_L1_Detail_size_bytes | 8 | uimsbf | SIZE OF L1-Detail |
| L1B_L1_Detail_fec_type | 2 | uimsbf | FEC TYPE OF L1-Detail |
| L1B_reserved | 78 | uimsbf | FUTURE EXTENSION |
| L1B_crc | 32 | uimsbf | PARITY OF ERROR DETECTION |
| } | | | |

FIG. 45

Preamble 2 L1-Basic Signaling Fields and Syntax (128 bits / 16 bytes)

| Syntax(LDM) | No. of Bits | Format | Semantics |
|---|---|---|---|
| L1_Basic_signaling() { | | | |
| L1B_version | 3 | uimsbf | VERSION INFORMATION OF L1-Basic |
| L1B_eas-wake_up | 1 | uimsbf | EMERGENCY ALARM FLAG |
| L1B_lls_flag | 1 | uimsbf | FLAG INDICATING UPPER LAYER SIGNALING |
| L1B_time_info_flag | 1 | uimsbf | TIME INFORMATION FLAG |
| L1B_num_layers | 2 | uimsbf | NUMBER OF LAYERS |
| L1B_L1_Detail_size_bytes | 8 | uimsbf | SIZE OF L1-Detail |
| L1B_L1_Detail_fec_type | 2 | uimsbf | FEC TYPE OF L1-Detail |
| L1B_reserved | 78 | uimsbf | FUTURE EXTENSION |
| L1B_crc | 32 | uimsbf | PARITY OF ERROR DETECTION |
| } | | | |

FIG. 46

Preamble 1 Signaling Data (12 bits)

| Syntax (COMMON) | No. of Bits | Format | Semantics |
|---|---|---|---|
| P1_signaling() { | | | |
|   P1_P2_waveform_structure | 7 | uimsbf | DIFFERENT MEANING PER FDM, TDM, OR LDM |
|   P1_eas_wake_up | 1 | uimsbf | EMERGENCY ALARM FLAG |
|   P1_band_width | 2 | uimsbf | BAND WIDTH OF BROADCASTING SIGNAL |
|   P1_Frame_Multiplexing | 2 | uimsbf | FDM, TDM, LDM, AND OTHERS |
| } | | | |

FIG. 47

Preamble 2 L1-Basic Signaling Fields and Syntax (128 bits / 16 bytes)

| Syntax (COMMON) | No. of Bits | Format | Semantics |
|---|---|---|---|
| L1_Basic_signaling() { | | | |
| L1B_version | 3 | uimsbf | VERSION INFORMATION OF L1-Basic |
| L1B_eas-wake_up | 1 | uimsbf | EMERGENCY ALARM FLAG |
| L1B_lls_flag | 1 | uimsbf | FLAG INDICATING UPPER LAYER SIGNALING |
| L1B_time_info_flag | 1 | uimsbf | TIME INFORMATION FLAG |
| L1B_num_layers | 2 | uimsbf | NUMBER OF LAYERS |
| L1B_L1_Detail_size_bytes | 8 | uimsbf | SIZE OF L1-Detail |
| L1B_L1_Detail_fec_type | 2 | uimsbf | FEC TYPE OF L1-Detail |
| L1B_reserved | 78 | uimsbf | FUTURE EXTENSION |
| L1B_crc | 32 | uimsbf | PARITY OF ERROR DETECTION |
| } | | | |

FIG. 48

| Syntax (TDM-1) | No. of Bits | Format | Semantics |
|---|---|---|---|
| L1_Detail_signaling() { | | | |
|   L1D_version | 4 | uimsbf | VERSION INFORMATION OF L1-Detail |
|   if (L1B_time_info_flag) { | | | |
|        L1D_ntp_time | 64 | uimsbf | TIME INFORMATION |
|   } | | | |
|   if (P1_eas_wake_up) { | | | |
|        L1B_eas_code | 8 | uimsbf | EMERGENCY ALARM CODE INFORMATION |
|   } | | | |
|   L1D_num_subframes | 2 | uimsbf | |
|   for (subframe= 1 .. L1D_num_subframes) { | | | |
|     L1D_fft_size | 2 | uimsbf | FFT SIZE |
|     L1D_guard_interval | 2 | uimsbf | GI: Guard Interval |
|     L1D_scattered_pilot_pattern | 5 | uimsbf | SPP: Scattered Pilot Pattern |
|     L1D_pilot_pattern_boost | 2 | uimsbf | |
|     L1D_num_ofdm_symbols | 1 | uimsbf | |
|     L1D_bs_first | 1 | uimsbf | |
|     L1D_bs_last | | | |
|     if (L1D_bs_first | L1D_bs_last) { | | | |
|        L1D_fcs_null_cells | 13 | uimsbf | |
|     } | | | |
|     L1D_num_layers_plp | 2 | uimsbf | |
|     for (plp=1 .. L1D_num_layers_plp) { | | | |
|        L1D_plp_id | 4 | uimsbf | PLP ID |
|        L1D_plp_lls_flag | 1 | uimsbf | FLAG INDICATING UPPER LAYER SIGNALING |
|        L1D_plp_start | 24 | uimsbf | |
|        L1D_plp_size | 24 | uimsbf | |
|        L1D_plp_mod | 4 | uimsbf | MODULATION SYSTEM |
|        L1D_plp_cod | 4 | uimsbf | ENCODING RATE |
|        L1D_plp_type | 1 | uimsbf | TYPE |
|        L1D_plp_TI_num_ti_blocks | 4 | uimsbf | NUMBER OF TI BLOCKS |
|        L1D_plp_TI_num_fec_blocks_max | 12 | uimsbf | MAXIMUM NUMBER OF FEC BLOCKS |
|     } // end plp loop | | | |
|   } // end subframe loop | | | |
|   L1D_reserved | as needed | uimsbf | FUTURE EXTENSION |
|   L1D_crc | 32 | uimsbf | PARITY OF ERROR DETECTION |
| } | | | |

FIG. 49

| Syntax (TDM-2) | No. of Bits | Format | Semantics |
|---|---|---|---|
| L1_Detail_signaling() { | | | |
|   L1D_version | 4 | uimsbf | VERSION INFORMATION OF L1-Detail |
|   if (L1B_time_info_flag) { | | | |
|       L1D_ntp_time | 64 | uimsbf | TIME INFORMATION |
|   } | | | |
|   if (P1_eas_wake_up) { | | | |
|       L1B_eas_code | 8 | uimsbf | EMERGENCY ALARM CODE INFORMATION |
|   } | | | |
|   for (layers= 1 .. L1B_num_layers) { | | | |
|     L1D_fft_size | 2 | uimsbf | FFT SIZE |
|     L1D_guard_interval | 2 | uimsbf | GI |
|     L1D_scattered_pilot_pattern | 5 | uimsbf | SPP |
|     L1D_pilot_pattern_boost | 2 | uimsbf | |
|     L1D_num_ofdm_symbols | 1 | uimsbf | |
|     L1D_bs_first | 1 | uimsbf | |
|     L1D_bs_last | | | |
|     if (L1D_bs_first | L1D_bs_last) { | | | |
|         L1D_fcs_null_cells | 13 | uimsbf | |
|     } | | | |
|     L1D_plp_id | 4 | uimsbf | PLP ID |
|     L1D_plp_lls_flag | 1 | uimsbf | FLAG INDICATING UPPER LAYER SIGNALING |
|     L1D_plp_start | 24 | uimsbf | |
|     L1D_plp_size | 24 | uimsbf | |
|     L1D_plp_mod | 4 | uimsbf | MODULATION SYSTEM |
|     L1D_plp_cod | 4 | uimsbf | ENCODING RATE |
|     L1D_plp_type | 1 | uimsbf | TYPE |
|     L1D_plp_TI_num_ti_blocks | 4 | uimsbf | NUMBER OF TI BLOCKS |
|     L1D_plp_TI_num_fec_blocks_max | 12 | uimsbf | MAXIMUM NUMBER OF FEC BLOCKS |
|   } // end layers loop | | | |
|   L1D_reserved | as needed | uimsbf | FUTURE EXTENSION |
|   L1D_crc | 32 | uimsbf | PARITY OF ERROR DETECTION |
| } | | | |

FIG. 50

| Syntax(FDM-1) | No. of Bits | Format | Semantics |
|---|---|---|---|
| L1_Detail_signaling() { | | | |
|   L1D_version | 4 | uimsbf | VERSION INFORMATION OF L1-Detial |
|   if (L1B_time_info_flag) { | | | |
|     L1D_ntp_time | 64 | uimsbf | TIME INFORMATION |
|   } | | | |
|   if (P1_eas_wake_up) { | | | |
|     L1B_eas_code | 8 | uimsbf | EMERGENCY ALARM CODE INFORMATION |
|   } | | | |
|   L1D_num_ofdm_symbols | 10 | uimsbf | FRAME SIZE |
|   L1D_bs_present | 1 | uimsbf | |
|   if (L1D_bs_present) { | | | |
|     L1D_bs_null_cells | 13 | uimsbf | |
|   } | | | |
|   L1D_scattered_pilot_pattern | 5 | uimsbf | SPP |
|   L1D_scattered_pilot_boost | 3 | uimsbf | |
|   L1D_num_layers | 4 | uimsbf | NUMBER OF LAYERS |
|   for (layer=1 .. L1B_num_layers) { | | | |
|     L1D_numsegs | 6 | uimsbf | NUMBER OF SEGMENTS |
|     L1D_layer_id | 4 | uimsbf | LAYER ID |
|     L1D_plp_lls_flag | 1 | uimsbf | FLAG INDICATING UPPER LAYER SIGNALING |
|     L1D_plp_mod | 1 | uimsbf | MODULATION SYSTEM |
|     L1D_plp_cod | 1 | uimsbf | ENCODING RATE |
|     L1D_plp_TI_num_ti_blocks | 4 | uimsbf | NUMBER OF TI BLOCKS |
|     L1D_plp_TI_num_fec_blocks_max | 12 | uimsbf | MAXIMUM NUMBER OF FEC BLOCS |
|   } // end layer loop | | | |
|   L1D_reserved | as needed | uimsbf | FUTURE EXTENSION |
|   L1D_crc | 32 | uimsbf | PARITY OF ERROR DETECTION |
| } | | | |

FIG. 51

| Syntax(FDM-2a) | No. of Bits | Format | Semantics |
|---|---|---|---|
| L1_Detail_signaling_LayerA() { | | | |
|   L1D_version | 4 | uimsbf | VERSION INFORMATION OF L1-Detail |
|   if (L1B_time_info_flag) { | | | |
|       L1D_ntp_time | 64 | uimsbf | TIME INFORMATION |
|   } | | | |
|   if (P1_eas_wake_up) { | | | |
|     L1B_eas_code | 8 | uimsbf | EMERGENCY ALARM CODE INFORMATION |
|   } | | | |
|   L1D_num_ofdm_symbols | 10 | uimsbf | FRAME SIZE |
|   L1D_bs_present | 1 | uimsbf | |
|   if (L1D_bs_present) { | | | |
|       L1D_bs_null_cells | 13 | uimsbf | |
|   } | | | |
|   L1D_scattered_pilot_pattern | 5 | uimsbf | SPP |
|   L1D_scattered_pilot_boost | 3 | uimsbf | |
|   L1D_num_layers | 4 | uimsbf | NUMBER OF LAYERS |
|   L1D_numsegs | 6 | uimsbf | NUMBER OF SEGMENTS |
|   L1D_layer_id | 4 | uimsbf | LAYER ID |
|   L1D_plp_lls_flag | 1 | uimsbf | FLAG INDICATING UPPER LAYER SIGNALING |
|   L1D_plp_mod | 4 | uimsbf | MODULATION SYSTEM |
|   L1D_plp_cod | 4 | uimsbf | ENCODING RATE |
|   L1D_plp_TI_num_ti_blocks | 4 | uimsbf | NUMBER OF TI BLOCKS |
|   L1D_plp_TI_num_fec_blocks_max | 12 | uimsbf | MAXIMUM NUMBER OF FEC BLOCKS |
|   L1D_reserved | as needed | uimsbf | FUTURE EXTENSION |
|   L1D_crc | 32 | uimsbf | PARITY OF ERROR DETECTION |
| } | | | |

FIG. 52

| Syntax (FDM-2b) | No. of Bits | Format | Semantics |
|---|---|---|---|
| L1_Detail_signaling_LayerB() { | | | |
|   L1D_numsegs | 6 | uimsbf | NUMBER OF SEGMENTS |
|   L1D_layer_id | 4 | uimsbf | LAYER ID |
|   L1D_plp_lls_flag | 1 | uimsbf | FLAG INDICATING UPPER LAYER SIGNALING |
|   L1D_plp_mod | 4 | uimsbf | MODULATION SYSTEM |
|   L1D_plp_cod | 4 | uimsbf | ENCODING RATE |
|   L1D_plp_TI_num_ti_blocks | 4 | uimsbf | NUMBER OF TI BLOCKS |
|   L1D_plp_TI_num_fec_blocks_max | 12 | uimsbf | MAXIMUM NUMBER OF FEC BLOCKS |
|   L1D_reserved | as needed | uimsbf | FUTURE EXTENSION |
|   L1D_crc | 32 | uimsbf | PARITY OF ERROR DETECTION |
| } | | | |

FIG. 53

| Syntax (FDM-3a) | No. of Bits | Format | Semantics |
|---|---|---|---|
| L1_Detail_signaling_LayerA() { | | | |
|   L1D_version | 4 | uimsbf | VERSION INFORMATION OF L1-Detail |
|   if (L1B_time_info_flag) { | | | |
|       L1D_ntp_time | 64 | uimsbf | TIME INFORMATION |
|   } | | | |
|   if (P1_eas_wake_up) { | | | |
|     L1B_eas_code | 8 | uimsbf | EMERGENCY ALARM CODE INFORMATION |
|   } | | | |
|   L1D_num_ofdm_symbols | 10 | uimsbf | FRAME SIZE |
|   L1D_bs_present | 1 | uimsbf | |
|   if (L1D_bs_present) { | | | |
|       L1D_bs_null_cells | 13 | uimsbf | |
|   } | | | |
|   L1D_scattered_pilot_pattern | 5 | uimsbf | SPP |
|   L1D_scattered_pilot_boost | 3 | uimsbf | |
|   L1D_num_layers | 4 | uimsbf | NUMBER OF LAYERS |
|   L1D_numsegs | 6 | uimsbf | NUMBER OF SEGMENTS |
|   L1D_layer_id | 4 | uimsbf | LAYER ID |
|   L1D_plp_lls_flag | 1 | uimsbf | FLAG INDICATING UPPER LAYER SIGNALING |
|   L1D_plp_mod | 4 | uimsbf | MODULATION SYSTEM |
|   L1D_plp_cod | 4 | uimsbf | ENCODING RATE |
|   L1D_plp_TI_num_ti_blocks | 4 | uimsbf | NUMBER OF TI BLOCKS |
|   L1D_plp_TI_num_fec_blocks_max | 12 | uimsbf | MAXIMUM NUMBER OF FEC BLOCKS |
|   L1D_reserved | as needed | uimsbf | FUTURE EXTENSION |
|   L1D_crc | 32 | uimsbf | PARITY OF ERROR DETECTION |
| } | | | |

FIG. 54

| Syntax(FDM-3b) | No. of Bits | Format | Semantics |
|---|---|---|---|
| L1_Detail_signaling_LayerB() { | | | |
|   L1D_version | 4 | uimsbf | VERSION INFORMATION OF L1-Detail |
|   if (L1B_time_info_flag) { | | | |
|       L1D_ntp_time | 64 | uimsbf | TIME INFORMATION |
|   } | | | |
|   if (P1_eas_wake_up) { | | | |
|     L1B_eas_code | 8 | uimsbf | EMERGENCY ALARM CODE INFORMATION |
|   } | | | |
|   L1D_num_ofdm_symbols | 10 | uimsbf | FRAME SIZE |
|   L1D_bs_present | 1 | uimsbf | |
|   if (L1D_bs_present) { | | | |
|     L1D_bs_null_cells | 13 | uimsbf | |
|   } | | | |
|   L1D_scattered_pilot_pattern | 5 | uimsbf | SPP |
|   L1D_scattered_pilot_boost | 3 | uimsbf | |
|   L1D_num_layers | 4 | uimsbf | NUMBER OF LAYERS |
|   L1D_numsegs | 6 | uimsbf | NUMBER OF SEGMENTS |
|   L1D_layer_id | 4 | uimsbf | LAYER ID |
|   L1D_plp_lls_flag | 1 | uimsbf | FLAG INDICATING UPPER LAYER SIGNALING |
|   L1D_plp_mod | 4 | uimsbf | MODULATION SYSTEM |
|   L1D_plp_cod | 4 | uimsbf | ENCODING RATE |
|   L1D_plp_TI_num_ti_blocks | 4 | uimsbf | NUMBER OF TI BLOCKS |
|   L1D_plp_TI_num_fec_blocks_max | 12 | uimsbf | MAXIMUM NUMBER OF FEC BLOCKS |
|   L1D_reserved | as needed | uimsbf | FUTURE EXTENSION |
|   L1D_crc | 32 | uimsbf | PARITY OF ERROR DETECTION |
| } | | | |

FIG. 55

| Syntax (LDM-1) | No. of Bits | Format | Semantics |
|---|---|---|---|
| L1_Detail_signaling() { | | | |
|   L1D_version | 4 | uimsbf | VERSION INFORMATION OF L1-Detail |
|   if (L1B_time_info_flag) { | | | |
|       L1D_ntp_time | 64 | uimsbf | TIME INFORMATION |
|   } | | | |
|   if (P1_eas_wake_up) { | | | |
|     L1B_eas_code | 8 | uimsbf | EMERGENCY ALARM CODE INFORMATION |
|   } | | | |
|   L1D_num_ofdm_symbols | 10 | uimsbf | FRAME SIZE |
|   L1D_bs_present | 1 | uimsbf | |
|   if (L1D_bs_present) { | | | |
|       L1D_bs_null_cells | 13 | uimsbf | |
|   } | | | |
|   L1D_scattered_pilot_pattern | 5 | uimsbf | SPP |
|   L1D_scattered_pilot_boost | 3 | uimsbf | |
|   L1D_num_layers | 4 | uimsbf | NUMBER OF LAYERS |
|   for (level=1 .. L1B_num_layers) { | | | |
|     L1D_layer_id | 4 | uimsbf | LAYER ID |
|     L1D_plp_lls_flag | 1 | uimsbf | FLAG INDICATING UPPER LAYER SIGNALING |
|     L1D_plp_mod | 4 | uimsbf | MODULATION SYSTEM |
|     L1D_plp_cod | 4 | uimsbf | ENCODING RATE |
|     L1D_plp_TI_num_ti_blocks | 4 | uimsbf | NUMBER OF TI BLOCKS |
|     L1D_plp_TI_num_fec_blocks_max | 12 | uimsbf | MAXIMUM NUMBER OF FEC BLOCKS |
|   } // end layer loop | | | |
|   L1D_reserved | as needed | uimsbf | FUTURE EXTENSION |
|   L1D_crc | 32 | uimsbf | PARITY OF ERROR DETECTION |
| } | | | |

FIG. 56

| Syntax(LDM-2a) | No. of Bits | Format | Semantics |
|---|---|---|---|
| L1_Detail_signaling_Layerk() { | | | |
|   L1D_version | 4 | uimsbf | VERSION INFORMATION OF L1-Detail |
|   if (L1B_time_info_flag) { | | | |
|       L1D_ntp_time | 64 | uimsbf | TIME INFORMATION |
|   } | | | |
|   if (P1_eas_wake_up) { | | | |
|     L1B_eas_code | 8 | uimsbf | EMERGENCY ALARM CODE INFORMATION |
|   } | | | |
|   L1D_num_ofdm_symbols | 10 | uimsbf | FRAME SIZE |
|   L1D_bs_present | 1 | uimsbf | |
|   if (L1D_bs_present) { | | | |
|       L1D_bs_null_cells | 13 | uimsbf | |
|   } | | | |
|   L1D_scattered_pilot_pattern | 5 | uimsbf | SPP |
|   L1D_scattered_pilot_boost | 3 | uimsbf | |
|   L1D_num_layers | 4 | uimsbf | NUMBER OF LAYERS |
|   L1D_layer_id | 4 | uimsbf | LAYER ID |
|   L1D_plp_lls_flag | 1 | uimsbf | FLAG INDICATING UPPER LAYER SIGNALING |
|   L1D_plp_mod | 4 | uimsbf | MODULATION SYSTEM |
|   L1D_plp_cod | 4 | uimsbf | ENCODING RATE |
|   L1D_plp_TI_num_ti_blocks | 4 | uimsbf | NUMBER OF TI BLOCKS |
|   L1D_plp_TI_num_fec_blocks_max | 12 | uimsbf | MAXIMUM NUMBER OF FEC BLOCKS |
|   L1D_reserved | as needed | uimsbf | FUTURE EXTENSION |
|   L1D_crc | 32 | uimsbf | PARITY OF ERROR DETECTION |
| } | | | |

FIG. 57

| Syntax (LDM-2b) | No. of Bits | Format | Semantics |
|---|---|---|---|
| L1_Detail_signaling_Layerk+1 () { | | | |
| L1D_layer_id | 4 | uimsbf | LAYER ID |
| L1D_plp_lls_flag | 1 | uimsbf | FLAG INDICATING UPPER LAYER SIGNALING |
| L1D_plp_mod | 4 | uimsbf | MODULATION SYSTEM |
| L1D_plp_cod | 4 | uimsbf | ENCODING RATE |
| L1D_plp_TI_num_ti_blocks | 4 | uimsbf | NUMBER OF TI BLOCKS |
| L1D_plp_TI_num_fec_blocks_max | 12 | uimsbf | MAXIMUM NUMBER OF FEC BLOCKS |
| L1D_reserved | as needed | uimsbf | FUTURE EXTENSION |
| L1D_crc | 32 | uimsbf | PARITY OF ERROR DETECTION |
| } | | | |

FIG. 58

| Syntax(LDM-3a) | No. of Bits | Format | Semantics |
|---|---|---|---|
| L1_Detail_signaling_Layerk() { | | | |
|   L1D_version | 4 | uimsbf | VERSION INFORMATION OF L1-Detail |
|   if (L1B_time_info_flag) { | | | |
|       L1D_ntp_time | 64 | uimsbf | TIME INFORMATION |
|   } | | | |
|   if (P1_eas_wake_up) { | | | |
|     L1B_eas_code | 8 | uimsbf | EMERGENCY ALARM CODE INFORMATION |
|   } | | | |
|   L1D_num_ofdm_symbols | 10 | uimsbf | FRAME SIZE |
|   L1D_bs_present | 1 | uimsbf | |
|   if (L1D_bs_present) { | | | |
|       L1D_bs_null_cells | 13 | uimsbf | |
|   } | | | |
|   L1D_scattered_pilot_pattern | 5 | uimsbf | SPP |
|   L1D_scattered_pilot_boost | 3 | uimsbf | |
|   L1D_num_layers | 4 | uimsbf | NUMBER OF LAYERS |
|   L1D_layer_id | 4 | uimsbf | LAYER ID |
|   L1D_plp_lls_flag | 1 | uimsbf | FLAG INDICATING UPPER LAYER SIGNALING |
|   L1D_plp_mod | 4 | uimsbf | MODULATION SYSTEM |
|   L1D_plp_cod | 4 | uimsbf | ENCODING RATE |
|   L1D_plp_TI_num_ti_blocks | 4 | uimsbf | NUMBER OF TI BLOCKS |
|   L1D_plp_TI_num_fec_blocks_max | 12 | uimsbf | MAXIMUM NUMBER OF FEC BLOCKS |
|   L1D_reserved | as needed | uimsbf | FUTURE EXTENSION |
|   L1D_crc | 32 | uimsbf | PARITY OF ERROR DETECTION |
| } | | | |

*FIG. 59*

| Syntax(LDM-3b) | No. of Bits | Format | Semantics |
|---|---|---|---|
| L1_Detail_signaling_Layerk+1() { | | | |
|   L1D_version | 4 | uimsbf | VERSION INFORMATION OF L1-Detail |
|   if (L1B_time_info_flag) { | | | |
|         L1D_ntp_time | 64 | uimsbf | TIME INFORMATION |
|   } | | | |
|   if (P1_eas_wake_up) { | | | |
|       L1B_eas_code | 8 | uimsbf | EMERGENCY ALARM CODE INFORMATION |
|   } | | | |
|   L1D_num_ofdm_symbols | 10 | uimsbf | FRAME SIZE |
|   L1D_bs_present | 1 | uimsbf | |
|   if (L1D_bs_present) { | | | |
|         L1D_bs_null_cells | 13 | uimsbf | |
|   } | | | |
|   L1D_scattered_pilot_pattern | 5 | uimsbf | SPP |
|   L1D_scattered_pilot_boost | 3 | uimsbf | |
|   L1D_num_layers | 4 | uimsbf | NUMBER OF LAYERS |
|   L1D_layer_id | 4 | uimsbf | LAYER ID |
|   L1D_plp_lls_flag | 1 | uimsbf | FLAG INDICATING UPPER LAYER SIGNALING |
|   L1D_plp_mod | 4 | uimsbf | MODULATION SYSTEM |
|   L1D_plp_cod | 4 | uimsbf | ENCODING RATE |
|   L1D_plp_TI_num_ti_blocks | 4 | uimsbf | NUMBER OF TI BLOCKS |
|   L1D_plp_TI_num_fec_blocks_max | 12 | uimsbf | MAXIMUM NUMBER OF FEC BLOCKS |
|   L1D_reserved | as needed | uimsbf | FUTURE EXTENSION |
|   L1D_crc | 32 | uimsbf | PARITY OF ERROR DETECTION |
| } | | | |

TRANSMISSION APPARATUS, TRANSMISSION METHOD, RECEPTION APPARATUS, AND RECEPTION METHOD

TECHNICAL FIELD

The present technology relates to a transmission apparatus, a transmission method, a reception apparatus, and a reception method, and particularly to a transmission apparatus capable of more flexibly realizing a plurality of multiplexing systems in the same broadcasting system, a transmission method, a reception apparatus, and a reception method.

BACKGROUND ART

For example, a broadcasting signal multiplexing system of frequency division multiplexing (FDM) is employed in integrated services digital broadcasting-terrestrial (ISDB-T) employed in Japan and the like as a broadcasting system for terrestrial digital TV broadcasting (see Non-Patent Document 1, for example).

CITATION LIST

Non-Patent Document

Non-Patent Document 1: ARIB STD-B31 Version 2.2 Association of Radio Industries and Businesses

SUMMARY OF THE INVENTION

Problems to be Solved by the Invention

Incidentally, an improvement for the next-generation terrestrial digital TV broadcasting is being discussed. A plurality of broadcasting systems a using multiplexing system such as time division multiplexing (TDM) or layered division multiplexing (LDM) in addition to frequency division multiplexing (FDM) are being discussed for the next-generation terrestrial digital TV broadcasting.

At present, however, a technical system for realizing a plurality of multiplexing systems in the same broadcasting system is not established, and there is requested a proposal to more flexibly realize a plurality of multiplexing systems in the same broadcasting system.

The present technology has been made in terms of such a situation, and is directed to enabling a plurality of multiplexing systems to be more flexibly realized in the same broadcasting system.

Solutions to Problems

A transmission apparatus according to a first aspect of the present technology includes: a generation part configured to generate a physical layer frame multiplexed in a predetermined multiplexing system and including determination information capable of determining a multiplexing system; and a transmission part configured to transmit the physical layer frame as a broadcasting signal.

The transmission apparatus according to the first aspect of the present technology may be an independent apparatus or an internal block configuring one apparatus. Further, a transmission method according to the first aspect of the present technology is for the transmission apparatus according to the first aspect of the present technology.

In the transmission apparatus and the transmission method according to the first aspect of the present technology, a physical layer frame multiplexed in a predetermined multiplexing system and including determination information capable of determining a multiplexing system is generated, and the physical layer frame is transmitted as a broadcasting signal.

A reception apparatus according to the first aspect of the present technology includes: a reception part configured to receive a broadcasting signal; and a processing part configured to determine a multiplexing system of a physical layer frame multiplexed in a predetermined multiplexing system on the basis of determination information included in the physical layer frame acquired from the broadcasting signal, and to process the physical layer frame.

The reception apparatus according to the first aspect of the present technology may be an independent apparatus or an internal block configuring one apparatus. Further, a reception method according to the first aspect of the present technology is for the reception apparatus according to the first aspect of the present technology.

In the reception apparatus and the reception method according to the first aspect of the present technology, a broadcasting signal is received, a multiplexing system of a physical layer frame multiplexed in a predetermined multiplexing system is determined on the basis of determination information included in the physical layer frame acquired from the broadcasting signal, and the physical layer frame is processed.

A transmission apparatus according to a second aspect of the present technology includes: a generation part configured to generate a physical layer frame multiplexed in a predetermined multiplexing system, the physical layer frame with physical layer signaling intensively arranged at its head; and a transmission part configured to transmit the physical layer frame as a broadcasting signal.

The transmission apparatus according to the second aspect of the present technology may be an independent apparatus or an internal block configuring one apparatus. Further, a transmission method according to the second aspect of the present technology is for the transmission apparatus according to the second aspect of the present technology.

In the transmission apparatus and the transmission method according to the second aspect of the present technology, a physical layer frame multiplexed in a predetermined multiplexing system, the physical layer frame with physical layer signaling intensively arranged at its head, is generated, and the physical layer frame is transmitted as a broadcasting signal.

A reception apparatus according to the second aspect of the present technology includes: a reception part configured to receive a broadcasting signal; and a processing part configured to acquire physical layer signaling intensively arranged at the head of a physical layer frame acquired from the broadcasting signal, and to process the physical layer frame.

The reception apparatus according to the second aspect of the present technology may be an independent apparatus or an internal block configuring one apparatus. Further, a reception method according to the second aspect of the present technology is for the reception apparatus according to the second aspect of the present technology.

In the reception apparatus and the reception method according to the second aspect of the present technology, a broadcasting signal is received, physical layer signaling intensively arranged at the head of a physical layer frame acquired from the broadcasting signal is acquired, and the physical layer frame is processed.

A transmission apparatus according to a third aspect of the present technology includes: a generation part configured to generate a physical layer frame multiplexed in a predetermined multiplexing system, the physical layer frame with P2 signaling of a P2 symbol arranged per layer; and a transmission part configured to transmit the physical layer frame as a broadcasting signal.

The transmission apparatus according to the third aspect of the present technology may be an independent apparatus or an internal block configuring one apparatus. Further, a transmission method according to the third aspect of the present technology is for the transmission apparatus according to the third aspect of the present technology.

In the transmission apparatus and the transmission method according to the third aspect of the present technology, a physical layer frame multiplexed in a predetermined multiplexing system, the physical layer frame with P2 signaling of a P2 symbol arranged per layer, is generated, and the physical layer frame is transmitted as a broadcasting signal.

A reception apparatus according to the third aspect of the present technology includes: a reception part configured to receive a broadcasting signal; and a processing part configured to acquire P2 signaling of a P2 symbol arranged per layer of a physical layer frame acquired from the broadcasting signal, and to process the physical layer frame.

The reception apparatus according to the third aspect of the present technology may be an independent apparatus or an internal block configuring one apparatus. Further, a reception method according to the third aspect of the present technology is for the reception apparatus according to the third aspect of the present technology.

In the reception apparatus and the reception method according to the third aspect of the present technology, a broadcasting signal is received, P2 signaling of a P2 symbol arranged per layer of a physical layer frame acquired from the broadcasting signal is acquired, and the physical layer frame is processed.

Effects of the Invention

According to the first aspect to the third aspect of the present technology, a plurality of multiplexing systems can be more flexibly realized in the same broadcasting system.

Additionally, the effects described herein are not necessarily restrictive, and any effect described in the present disclosure may be obtained.

BRIEF DESCRIPTION OF DRAWINGS

FIG. 4 is a diagram for explaining a configuration concept of a physical layer frame according to the present technology.

FIG. 13 is a diagram illustrating relationships among value g, FFT size, samples, maximum transmission speed, and robust transmission speed.

FIG. 22 is a diagram illustrating relationships among FFT size, samples per symbol, maximum transmission speed, robust transmission speed, number of symbols, maximum number of bits, and total samples.

FIG. 28 is a diagram illustrating exemplary synchronization patterns of a frame synchronization symbol (FSS) FIG. 29 is a diagram illustrating exemplary syntaxes of P1 signaling in time division multiplexing (TDM).

FIG. 30 is a diagram illustrating examples of P1_P2_waveform_structure of FIG. 29.

FIG. 31 is a diagram illustrating exemplary syntaxes of P1 signaling in frequency division multiplexing (FDM).

FIG. 32 is a diagram illustrating examples of P1_P2_waveform_structure of FIG. 31.

FIG. 33 is a diagram illustrating exemplary syntaxes of P1 signaling in layered division multiplexing (LDM).

FIG. 34 is a diagram illustrating examples of P1_P2_waveform_structure of FIG. 33

FIG. 35 is a diagram illustrating exemplary combinations of FFT size and GI.

FIG. 36 is a diagram illustrating exemplary combinations of FFT size, GI, and pilot pattern.

FIG. 37 is a diagram illustrating exemplary syntaxes of P1 signaling in time division multiplexing (TDM).

FIG. 38 is a diagram illustrating examples of P1_Frame_Multiplexing of FIG. 37.

FIG. 39 is a diagram illustrating exemplary syntaxes of P1 signaling in frequency division multiplexing (FDM).

FIG. 40 is a diagram illustrating examples of P1_Frame_Multiplexing of FIG. 39.

FIG. 41 is a diagram illustrating exemplary syntaxes of P1 signaling in layered division multiplexing (LDM).

FIG. 42 is a diagram illustrating examples of P1_Frame_Multiplexing of FIG. 41.

FIG. 43 is a diagram illustrating exemplary syntaxes of L1B signaling in time division multiplexing (TDM).

FIG. 44 is a diagram illustrating exemplary syntaxes of L1B signaling in frequency division multiplexing (FDM).

FIG. 45 is a diagram illustrating exemplary syntaxes of L1B signaling in layered division multiplexing (LDM).

FIG. 46 is a diagram illustrating exemplary common syntaxes of P1 signaling.

FIG. 47 is a diagram illustrating exemplary common syntaxes of L1B signaling.

FIG. 48 is a diagram illustrating a first example of syntaxes of L1D signaling in time division multiplexing (TDM).

FIG. 49 is a diagram illustrating a second example of syntaxes of L1D signaling in time division multiplexing (TDM).

FIG. 50 is a diagram illustrating a first example of syntaxes of L1D signaling in frequency division multiplexing (FDM).

FIG. 51 is a diagram illustrating a second example (layer A) of syntaxes of L1D signaling in frequency division multiplexing (FDM).

FIG. 52 is a diagram illustrating a second example (layer B) of syntaxes of L1D signaling in frequency division multiplexing (FDM).

FIG. 53 is a diagram illustrating a third example (layer A) of syntaxes of L1D signaling in frequency division multiplexing (FDM).

FIG. 54 is a diagram illustrating a third example (layer B) of syntaxes of L1D signaling in frequency division multiplexing (FDM).

FIG. 55 is a diagram illustrating a first example of syntaxes of L1D signaling in layered division multiplexing (LDM).

FIG. 56 is a diagram illustrating a second example (layer k) of syntaxes of L1D signaling in layered division multiplexing (LDM).

FIG. 57 is a diagram illustrating a second example (layer k+1) of syntaxes of L1D signaling in layered division multiplexing (LDM).

FIG. 58 is a diagram illustrating a third example (layer k) of syntaxes of L1D signaling in layered division multiplexing (LDM).

FIG. 59 is a diagram illustrating a third example (layer k+1) of syntaxes of L1D signaling in layered division multiplexing (LDM).

MODE FOR CARRYING OUT THE INVENTION

Figure 1:
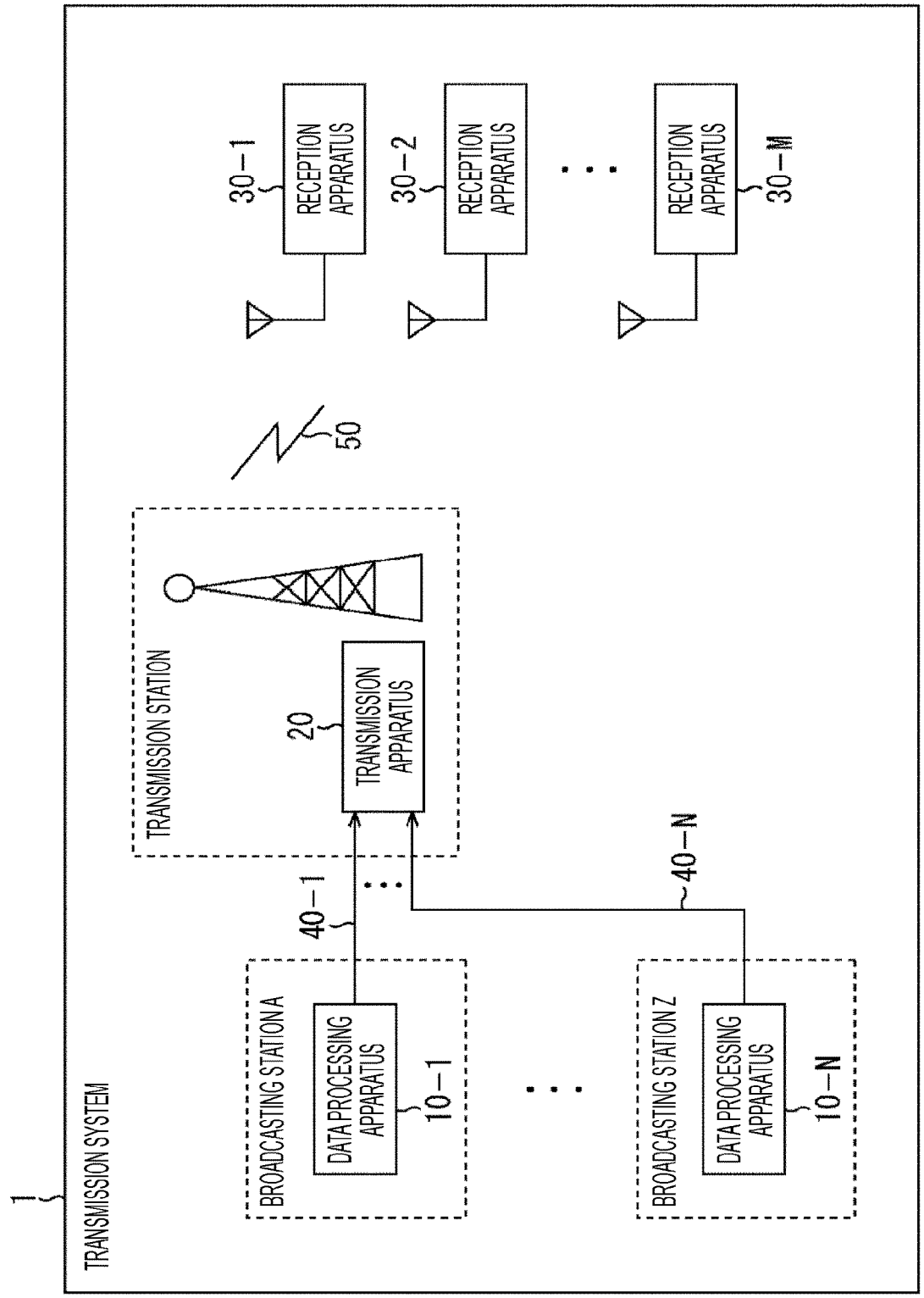
FIG. 1 is a block diagram illustrating a configuration of one embodiment of a transmission system according to the present technology.

Embodiments of the present technology will be described below with reference to the drawings. Additionally, the description will be made in the following order.
1. Configuration of system
2. Outline of present technology
3. Frame configuration
4. First solving method: method for determining multiplexing system (FDM, TDM, LDM)
(1) Synchronization pattern solving method
(2) P1 signaling solving method
5. Configuration of P2 signaling
(1) Configuration of L1B signaling
(2) Configuration of L1D signaling
6. Second solving method: method for reducing time for frame synchronization
7. Third solving method: method for making preamble in FDM or TDM
8. Operations of reception apparatus
9. Flows of processings in solving methods
10. Variants
11. Configuration of computer

1. Configuration of System (Exemplary Configuration of Transmission System)

FIG. 1 is a block diagram illustrating a configuration of one embodiment of a transmission system according to the present technology. Additionally, a system is a logical collection of a plurality of apparatuses.

In FIG. 1, a transmission system 1 is configured of data processing apparatuses 10-1 to 10-N (N is an integer of 1 or more) installed in facilities associated with respective broadcasting stations, a transmission apparatus 20 installed in a transmission station, and reception apparatuses 30-1 to 30-M (M is an integer of 1 or more) owned by end users.

Further, in the transmission system 1, the data processing apparatuses 10-1 to 10-N and the transmission apparatus 20 are connected via communication lines 40-1 to 40-N. Additionally, the communication lines 40-1 to 40-N can be assumed as dedicated lines, for example.

The data processing apparatus 10-1 processes contents of broadcasting program or the like produced by a broadcasting station A, and transmits the resultant transmission data to the transmission apparatus 20 via the communication line 40-1.

Similarly to the data processing apparatus 10-1, the data processing apparatuses 10-2 to 10-N process contents of broadcasting program or the like produced by the respective broadcasting stations such as broadcasting station B and broadcasting station Z, and transmit the resultant transmission data to the transmission apparatus 20 via the communication lines 40-2 to 40-N, respectively.

The transmission apparatus 20 receives the transmission data transmitted from the data processing apparatuses 10-1 to 10-N on broadcasting station side via the communication lines 40-1 to 40-N. The transmission apparatus 20 processes the transmission data from the data processing apparatuses 10-1 to 10-N, and transmits the resultant broadcasting signals from a transmission antenna installed in the transmission station.

Thereby, the broadcasting signals from the transmission apparatus 20 in the transmission station are transmitted to the reception apparatuses 30-1 to 30-M via a broadcasting transmission path 50.

The reception apparatuses 30-1 to 30-M are fixed receivers such as TV receiver or set top box (STB), recorder, game machine, and network storage, or mobile receivers such as Smartphone, cell phone, and tablet computer. Further, the reception apparatuses 30-1 to 30-M may be vehicle-mounted devices such as vehicle-mounted TV, wearable computers such as head mounted display (HMD), or the like.

The reception apparatus 30-1 receives and processes the broadcasting signal transmitted from the transmission apparatus 20 via the broadcasting transmission path 50 thereby to reproduce the contents of broadcasting program or the like in response to a tuning operation by the end user.

The reception apparatuses 30-2 to 30-M process the broadcasting signal from the transmission apparatus 20 similarly to the reception apparatus 30-1 thereby to reproduce the contents in response to a tuning operation by an end user.

Additionally, the broadcasting transmission path 50 in the transmission system 1 may be satellite broadcasting using broadcasting satellite (BS) or communications satellite (CS), common antenna television (CATV) using a cable, or the like in addition to terrestrial broadcasting.

Further, in the following description, in a case where the data processing apparatuses 10-1 to 10-N on broadcasting station side do not need to be particularly discriminated, they will be denoted as data processing apparatus 10. Further, in a case where the reception apparatuses 30-1 to 30-M do not need to be particularly discriminated, they will be denoted as reception apparatus 30.

(Configurations of Transmission-Side Apparatuses)

Figure 2:
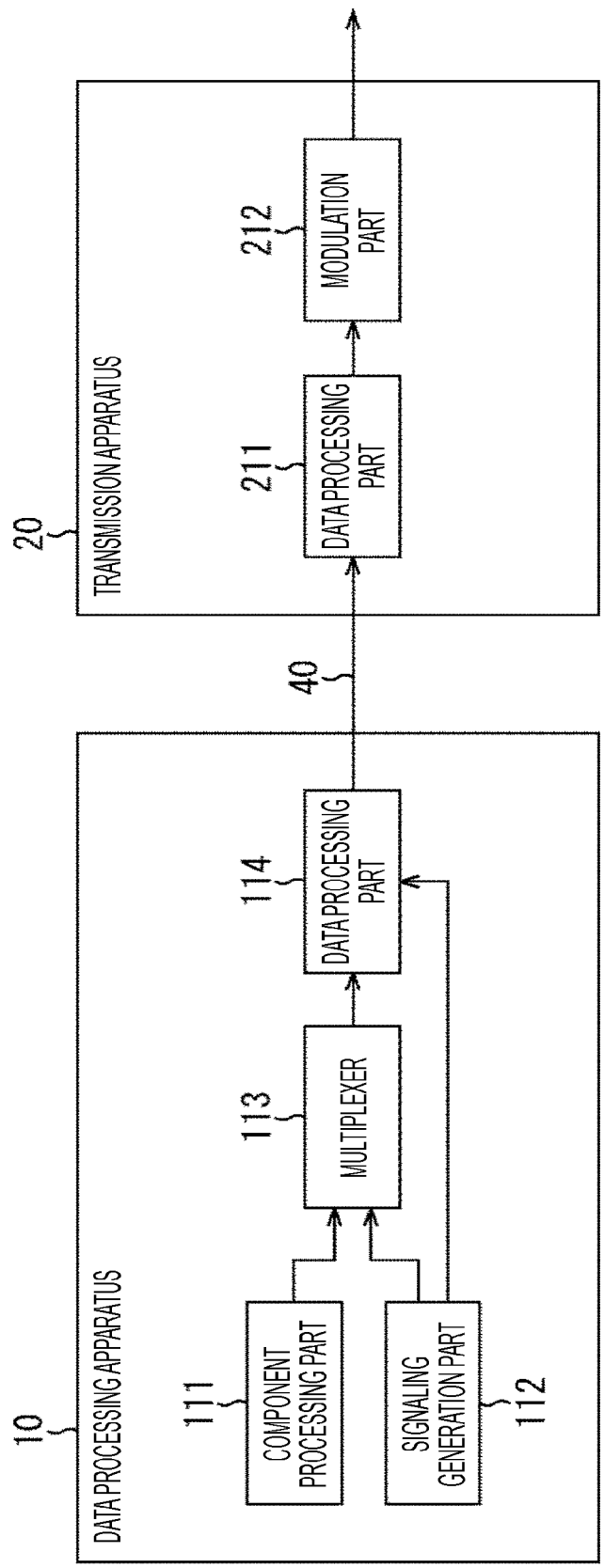
FIG. 2 is a block diagram illustrating an exemplary configuration of a data processing apparatus and a transmission apparatus of FIG. 1.

FIG. 2 is a block diagram illustrating an exemplary configuration of the data processing apparatus 10 and the transmission apparatus 20 of FIG. 1.

In FIG. 2, the data processing apparatus 10 is configured of a component processing part 111, a signaling generation part 112, a multiplexer 113, and a data processing part 114.

The component processing part 111 processes component data configuring contents of broadcasting program or the like, and supplies the resultant component stream to the multiplexer 113. Here, the component data is data of video, audio, subtitle, or the like, for example, and a processing such as encoding processing conforming to a predetermined encoding system, for example, is performed on the data.

The signaling generation part 112 generates signaling used for processings in upper layers for selecting or reproducing contents, or the like, and supplies it to the multiplexer 113. Further, the signaling generation part 112 generates signaling used for processings in a physical layer, and supplies it to the data processing part 114.

Additionally, signaling is also denoted as control information. Further, in the following description, the signaling used for processings in a physical layer is denoted as physical layer signaling (L1 signaling) and the signaling used for processings in upper layers than the physical layer is collectively denoted as upper layer signaling so that the signaling are discriminated.

The multiplexer 113 multiplexes the component stream supplied from the component processing part 111 and the upper layer signaling stream supplied from the signaling generation part 112, and supplies the resultant stream to the data processing part 114. Additionally, other stream such as application or time information may be multiplexed here.

The data processing part 114 processes the stream supplied from the multiplexer 113 and generates a packet (frame) in a predetermined format. Further, the data processing part 114 processes the packet in the predetermined format and the physical layer signaling from the signaling generation part 112, and generates and transmits transmission data to the transmission apparatus 20 via the communication line 40.

In FIG. 2, the transmission apparatus 20 is configured of a data processing part 211 and a modulation part 212.

The data processing part 211 receives and processes the transmission data transmitted from the data processing apparatus 10 via the communication line 40, and extracts the resultant information indicating the packet (frame) in the predetermined format and the physical layer signaling.

The data processing part 211 processes the information indicating the packet (frame) in the predetermined format and the physical layer signaling, and thus generates and supplies a physical layer frame conforming to a predetermined broadcasting system to the modulation part 212.

The modulation part 212 performs a necessary processing (modulation processing) on the physical layer frame supplied from the data processing part 211, and transmits the resultant broadcasting signal from the transmission antenna installed in the transmission station.

The data processing apparatus 10 and the transmission apparatus 20 are configured as described above.

(Configuration of Reception-Side Apparatus)

Figure 3:
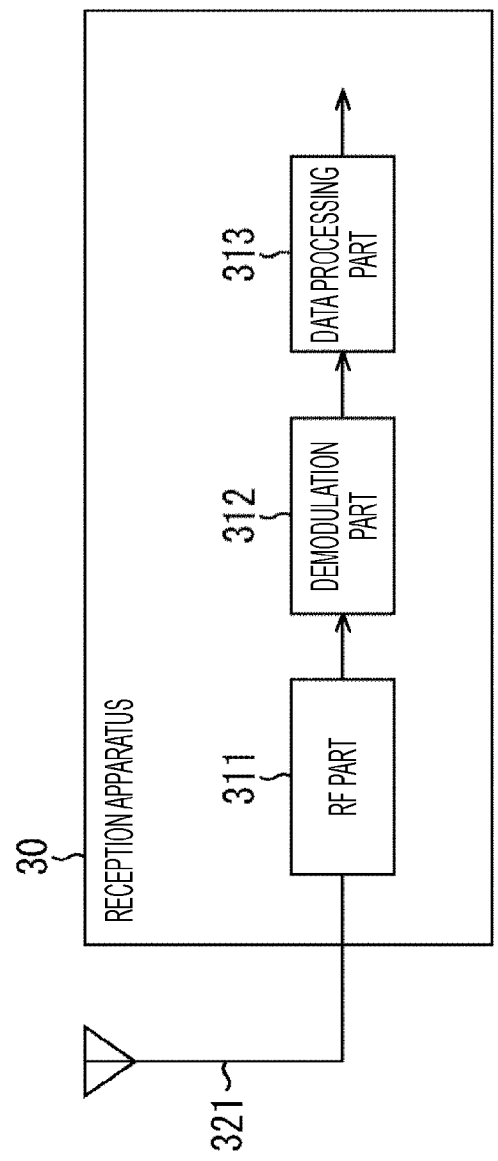
FIG. 3 is a block diagram illustrating an exemplary configuration of a reception apparatus of FIG. 1.

FIG. 3 is a block diagram illustrating an exemplary configuration of the reception apparatus 30 of FIG. 1.

In FIG. 3, the reception apparatus 30 is configured of a RF part 311, a demodulation part 312, and a data processing part 313.

The RF part 311 is configured of a tuner or the like, for example. The RF part 311 performs a necessary processing on a broadcasting signal received via an antenna 321, and supplies the resultant signal to the demodulation part 312.

The demodulation part 312 is configured of demodulation large scale integration (LSI) or the like, for example. The demodulation part 312 performs the demodulation processing on the signal supplied from the RF part 311. In the demodulation processing, the physical layer frame is processed according to the physical layer signaling thereby to acquire a packet in a predetermined format, for example. The packet acquired in the demodulation processing is supplied to the data processing part 313.

The data processing part 313 is configured of a main system on chip (SoC) or the like, for example. The data processing part 313 performs a predetermined processing on the packet supplied from the demodulation part 312. Here, a stream decoding processing, a stream reproduction processing, and the like are performed on the basis of the upper layer signaling included in the packet, for example.

The data of video, audio, subtitle, or the like acquired in the processing in the data processing part 313 is output to a subsequent circuit. Thereby, the contents of broadcasting program or the like are reproduced and their video or audio is output in the reception apparatus 30.

The reception apparatus 30 is configured as described above.

2. Outline of Present Technology

As described above, ISDB-T is employed as a broadcasting system for terrestrial digital TV broadcasting in Japan (see Non-Patent Document 1, for example).

ISDB-T defines high-definition broadcasting using 12 segments mainly for fixed receivers and "one-segment partial reception service for cell phones and mobile terminals" (one-segment broadcasting) using one segment mainly for mobile receivers.

On the other hand, an improvement for the next-generation terrestrial digital TV broadcasting starts being discussed in Japan. Current ISDB-T employs a broadcasting signal multiplexing system of frequency division multiplexing (FDM).

A plurality of broadcasting systems using a multiplexing system such as time division multiplexing (TDM) or layered division multiplexing (LDM) in addition to frequency division multiplexing (FDM) are being discussed for the next-generation terrestrial digital TV broadcasting.

At present, however, a technical system for realizing a plurality of multiplexing systems in the same broadcasting system is not established, and there is requested a proposal to more flexibly realize a plurality of multiplexing systems in the same broadcasting system.

The present technology proposes the following three solving methods in order to meet the request.

First, there is a problem in which a multiplexing system cannot be determined in a case where a plurality of multiplexing systems (FDM, TDM, and LDM) are realized in the same broadcasting system, but the problem is to be solved in the first solving method.

That is, in order to determine a multiplexing system in the first solving method, the physical layer frame uses a common frame synchronization symbol (FSS) and a different synchronization pattern, or the physical layer frame uses a common frame synchronization symbol (FSS), the same synchronization pattern, and preamble 1 symbol (P1) signaling information of P1 symbol.

Additionally, the former in the first solving method will be denoted as synchronization pattern solving method, and the latter will be denoted as P1 signaling solving method.

Second, in a case where frequency division multiplexing (FDM) such as current ISDB-T is employed, L1 signaling such as transmission multiplexing configuration control (TMCC) information is scattered and arranged in the physical layer frame, and there is a problem in which the reception apparatus 30 always needs one frame for synchronization, but the problem is to be solved in the second solving method.

That is, in the second solving method, L1 signaling is intensively arranged at the head of the physical layer frame, and thus the reception apparatus 30 can rapidly acquire the L1 signaling and reduce a time for synchronization.

Third, the current technologies have a problem in which the payload of the physical layer frame can apply frequency division multiplexing (FDM) or layered division multiplexing (LDM) to be in FDM or LDM, while the frame synchronization symbol (FSS) or the preamble cannot be in FDM or LDM, but the problem is to be solved in the third solving method.

That is, in the third solving method, preamble 2 symbol (P2) is arranged per layer in frequency division multiplexing (FDM) or layered division multiplexing (LDM) thereby to make the preamble in FDM or LDM.

Additionally, for example, the payload of the physical layer frame can be in FDM or LDM in advanced television systems committee (ATSC) 3.0 as a broadcasting system for the next-generation terrestrial digital TV broadcasting.

In this way, according to the present technology, a plurality of multiplexing systems (FDM, TDM, and LDM) can be more flexibly realized in the same broadcasting system in the above three solving methods (technical characteristics).

The solving methods (technical characteristics) according to the present technology will be described below with reference to specific embodiments. In the following description, however, a configuration of the physical layer frame will be first described, and then the three solving methods will be described.

3. Frame Configuration (Concept of frame configuration)

FIG. 4 is a diagram for explaining a configuration concept of the physical layer frame according to the present technology.

The physical layer frame according to the present technology is configured of one frame synchronization symbol (FSS), one or more preamble 1 symbols (P1), one or more preamble 2 symbols (P2), and one or more items of data.

The frame synchronization symbol (FSS) is inserted at the head of the physical layer frame. Additionally, the frame synchronization symbol (FSS) can be configured to be robust.

The P1 symbol (P1) is preamble 1. Further, the P2 symbol (P2) is preamble 2.

Here, for example, the frame synchronization symbol (FSS) and the P1 symbol (P1) correspond to bootstrap configuring the physical layer frame defined in ATSC3.0, and the P2 symbol (P2) corresponds to preamble (see Non-Patent Document 2, for example)

Non-Patent Document 2: ATSC Standard: A/321, System Discovery and Signaling

The P1 symbol (P1) and the P2 symbol (P2) include physical layer signaling (L1 signaling). Here, the signaling of the P1 symbol (P1) is denoted as P1 signaling. Further, the signaling of the P2 symbol (P2) is denoted as P2 signaling.

Further, the P2 signaling can be divided into a fixed-length part L1-Basic (denoted as L1B signaling below) and a variable-length part L1-Detail (denoted as L1D signaling below). Additionally, the P1 signaling and the P2 signaling will be described below in detail.

The data is configured of a plurality of data symbols. Additionally, a boundary symbol (BS) indicating a boundary between frames is arranged in the data as needed.

The physical layer frame according to the present technology can be configured as described above.

Additionally, in the physical layer frame illustrated in FIG. 4, for example, the frame synchronization symbol (FSS) and the P1 symbols (P1) can be assumed as (symbols similar to) the symbols disclosed in Non-Patent Document 2, and the P2 symbols (P2) and the data (data symbols) can be assumed as OFDM symbols. Here, a large number of orthogonal subcarriers are provided in a transmission band to perform digital modulation in orthogonal frequency division multiplexing (OFDM).

Further, the configuration concept of the physical layer frame illustrated in FIG. 4 is similar as in any of multiplexing systems such as time division multiplexing (TDM), frequency division multiplexing (FDM), and layered division multiplexing (LDM). A configuration of the physical layer frame will be described below in detail for each of the multiplexing systems.

(1) Configuration of Physical Layer Frame in Time Division Multiplexing (TDM)

First Exemplary Configuration

Figure 5:
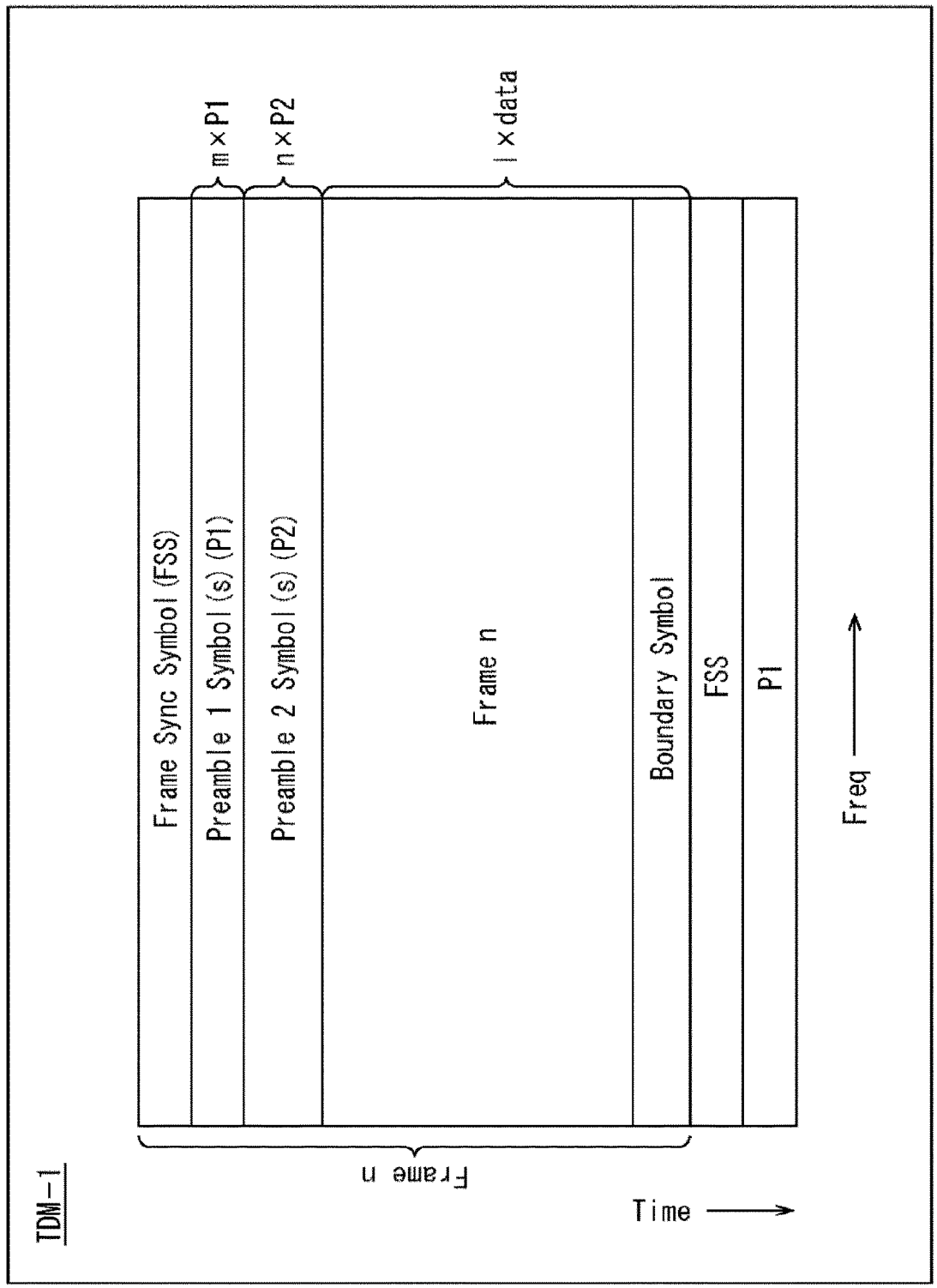
FIG. 5 is a diagram illustrating a first exemplary configuration of the physical layer frame in time division multiplexing (TDM).

FIG. 5 is a diagram illustrating a first exemplary configuration of the physical layer frame in time division multiplexing (TDM).

Time division multiplexing (TDM) is a multiplexing system capable of temporally arranging a plurality of broadcasting signals and transmitting them in one transmission path.

FIG. 5 illustrates a configuration of the physical layer frame in time division multiplexing (TDM) assuming a direction from the left side toward the right side in the Figure as a frequency (Freq) direction and a direction from the upper side toward the lower side in the Figure as a time (Time) direction.

In FIG. 5, the physical layer frames are transmitted in time series, and the frame synchronization symbol (FSS) is inserted at the head of each physical layer frame. Here, a configuration of the physical layer frame n among a plurality of physical layer frames transmitted in time series will be described by way of example.

The physical layer frame n of FIG. 5 is configured of a frame synchronization symbol (FSS), a P1 symbol (P1), a P2 symbol (P2), a frame, and a boundary symbol (BS). (The L1 signaling of) the P1 symbol and the P2 symbol in the physical layer frame n are acquired, and then the frame subsequent to them can be acquired.

Further, the frame as data symbol and the boundary symbol (BS) in the physical layer frame n of FIG. 5 correspond to the data. Here, the boundary symbol indicates a symbol to be inserted at the end of the frame.

Additionally, FIG. 5 illustrates a configuration of the physical layer frame n among a plurality of physical layer frames, but other physical layer frames such as physical layer frame n+1 are similarly configured and transmitted in time series.

Second Exemplary Configuration

Figure 6:
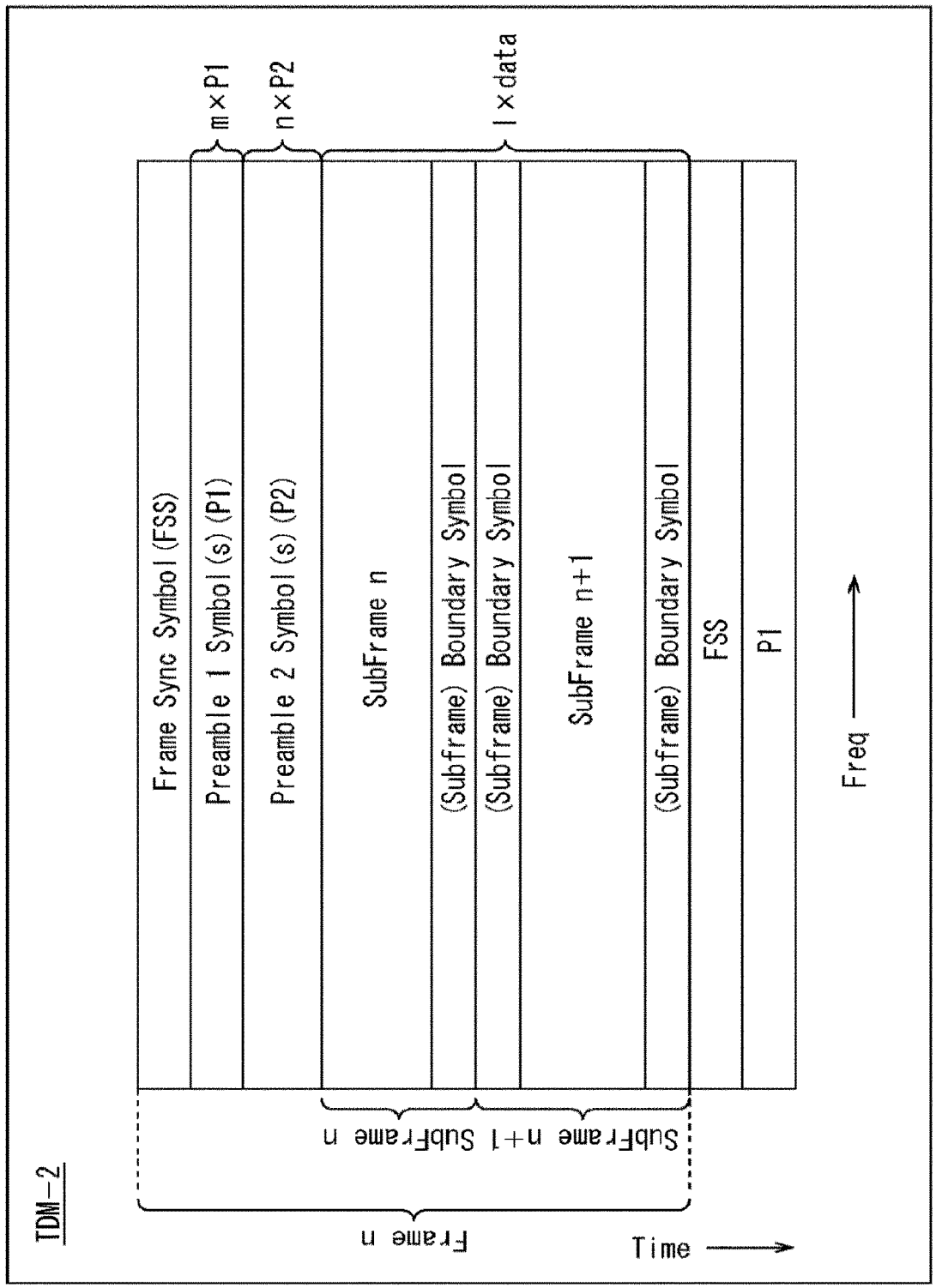
FIG. 6 is a diagram illustrating a second exemplary configuration of the physical layer frame in time division multiplexing (TDM).

FIG. 6 is a diagram illustrating a second exemplary configuration of the physical layer frame in time division multiplexing (TDM).

The physical layer frame n of FIG. 6 is different from the physical layer frame n of FIG. 5 in that one or more subframes are arranged instead of one frame. Two subframes of subframe n and subframe n+1 are arranged in the physical layer frame n of FIG. 6.

(The L1 signaling of) the P1 symbol and the P2 symbol in the physical layer frame n of FIG. 6 are acquired, and then the subframe n and the subframe n+1 subsequent thereto can be acquired.

Here, in a case where two or more subframes are arranged in the physical layer frame n of FIG. 6, the modulation parameters such as FFT size, guard interval length, and pilot pattern can be changed per subframe.

Further, the subframe boundary symbols indicating the symbols to be inserted at the start and the end of a subframe are inserted into each subframe. Then in the physical layer frame n, the subframes as data symbols, and the subframe boundary symbols correspond to the data.

The physical layer frame in time division multiplexing (TDM) can be configured as described above.

(2) Configuration of Physical Layer Frame in Frequency Division Multiplexing (FDM)

Exemplary Frame Configuration

Figure 7:
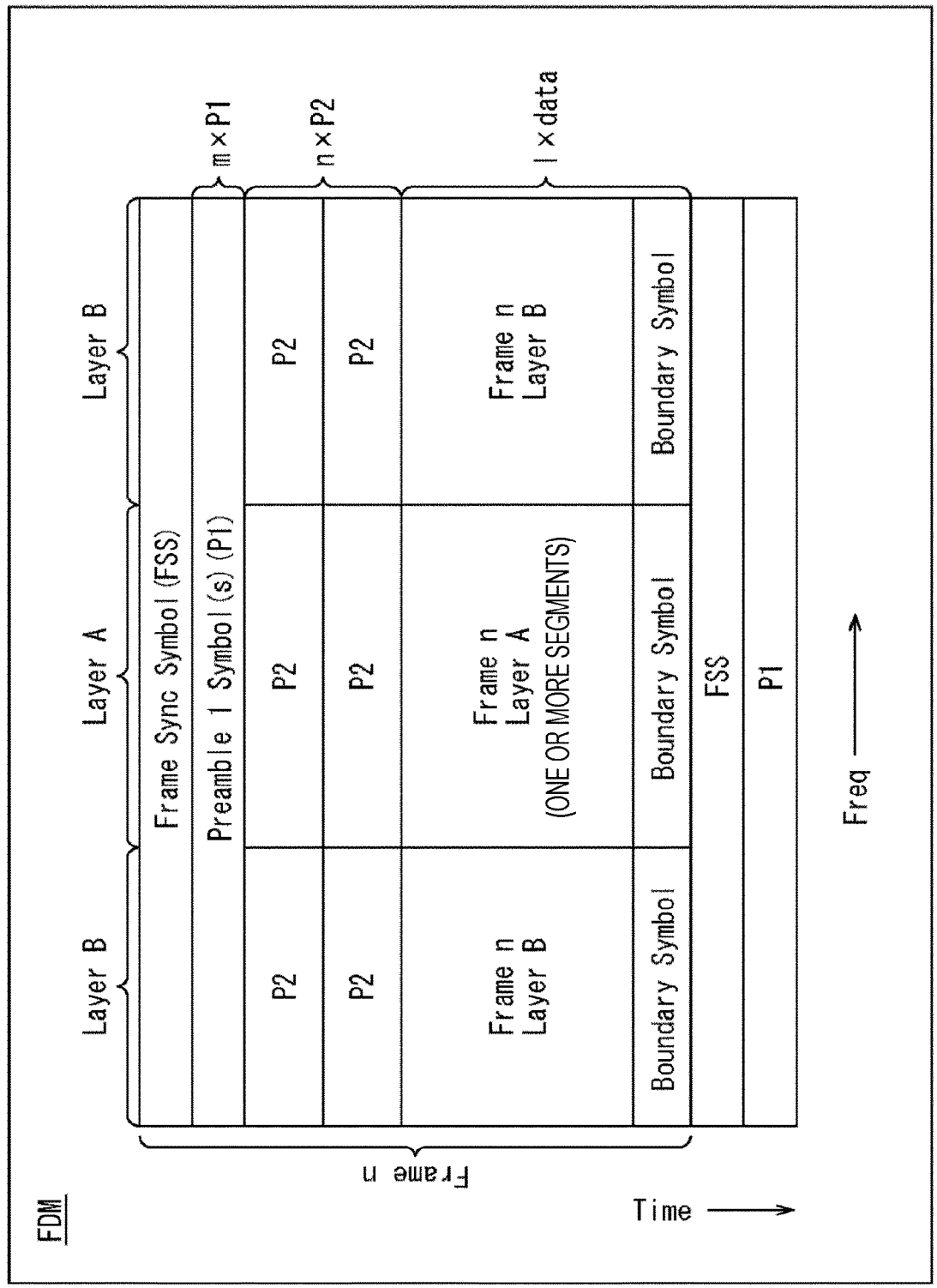
FIG. 7 is a diagram illustrating an exemplary configuration of the physical layer frame in frequency division multiplexing (FDM).

FIG. 7 is a diagram illustrating an exemplary configuration of the physical layer frame in frequency division multiplexing (FDM).

Frequency division multiplexing (FDM) is a multiplexing system capable of dividing a frequency band for transmitting a plurality of broadcasting signals, and transmitting them in one transmission path.

FIG. 7 illustrates a configuration of the physical layer frame in frequency division multiplexing (FDM) assuming a direction from the left side toward the right side in the Figure as a frequency (Freq) direction and a direction from the upper side toward the lower side in the Figure as a time (Time) direction.

In FIG. 7, the physical layer frames are transmitted in time series, and the frame synchronization symbol (FSS) is inserted at the head of each physical layer frame, and further the P1 symbol (P1) is subsequently inserted.

Further, a predetermined frequency band (6 MHz, for example) is divided into a plurality of segments in frequency division multiplexing (FDM). One or more segments are then put together thereby to configure layers. For example, in FIG. 7, a frequency is divided into 35 segments, where nine center segments of the Figure configure a layer A and the remaining right and left segments configure layers B.

In the physical layer frame n of FIG. 7, the P2 symbols (P2), the frame as data symbol, and the boundary symbol (BS) are arranged for each of the layer A and the layers B.

Figure 8:
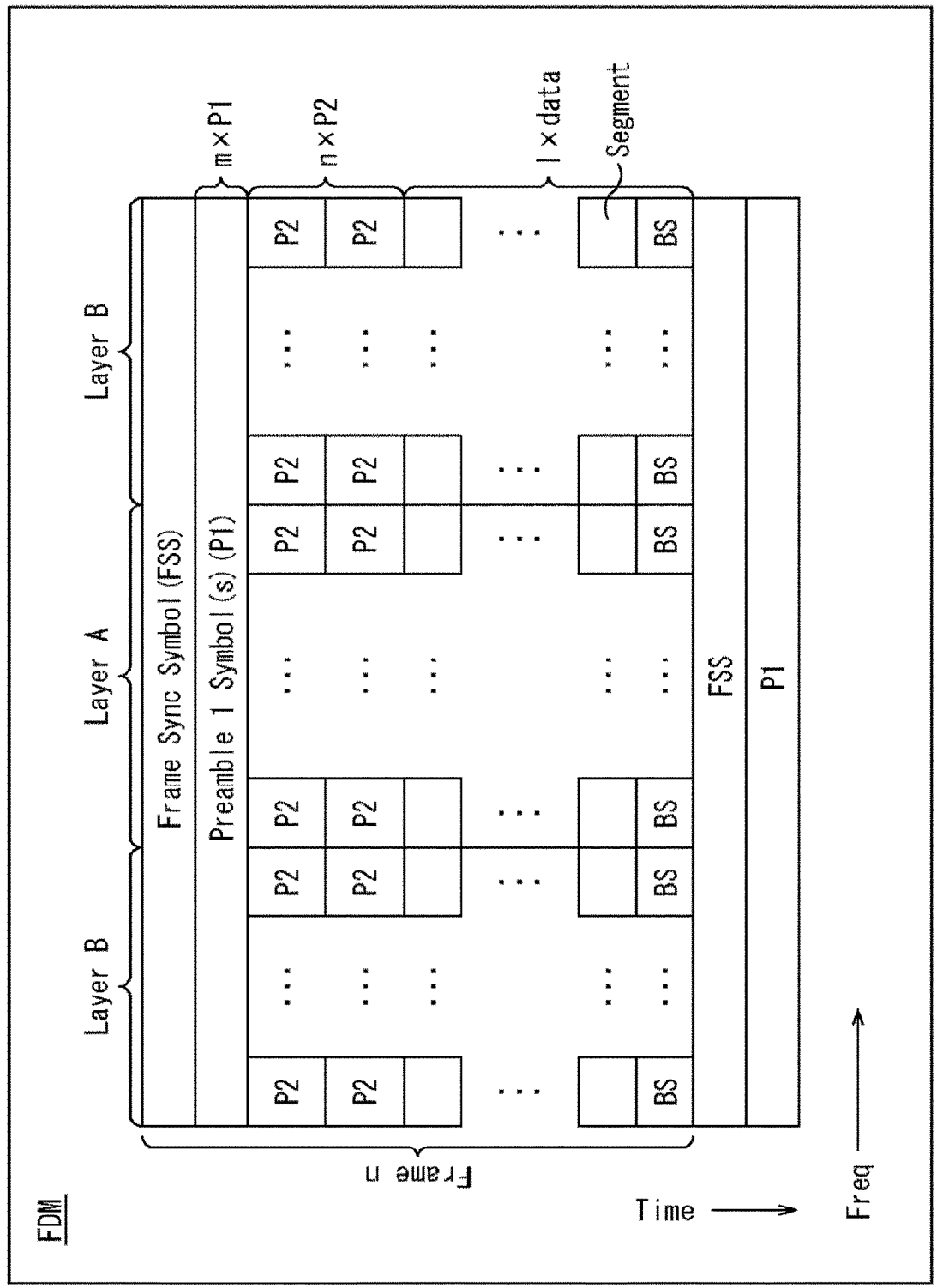
FIG. 8 is a diagram illustrating a detailed configuration of the physical layer frame in frequency division multiplexing (FDM).

Here, FIG. 8 illustrates a detailed configuration of the physical layer frame of FIG. 7. FIG. 8 illustrates the P2 symbols, the data symbol, and the boundary symbol for each of the layer A and the layers B in units of segment in square.

That is, in FIG. 8, in a case where a frequency is divided into 35 segments, for example, in frequency division multiplexing (FDM), the center layer A is configured of nine segments and the right and left layers B are configured of the remaining 26 segments. Additionally, each segment in square in the Figure includes the same number of subcarriers.

The physical layer frame in frequency division multiplexing (FDM) can be configured as described above.

(3) Configuration of Physical Layer Frame in Layered Division Multiplexing (LDM)

Exemplary Frame Configuration

Figure 9:
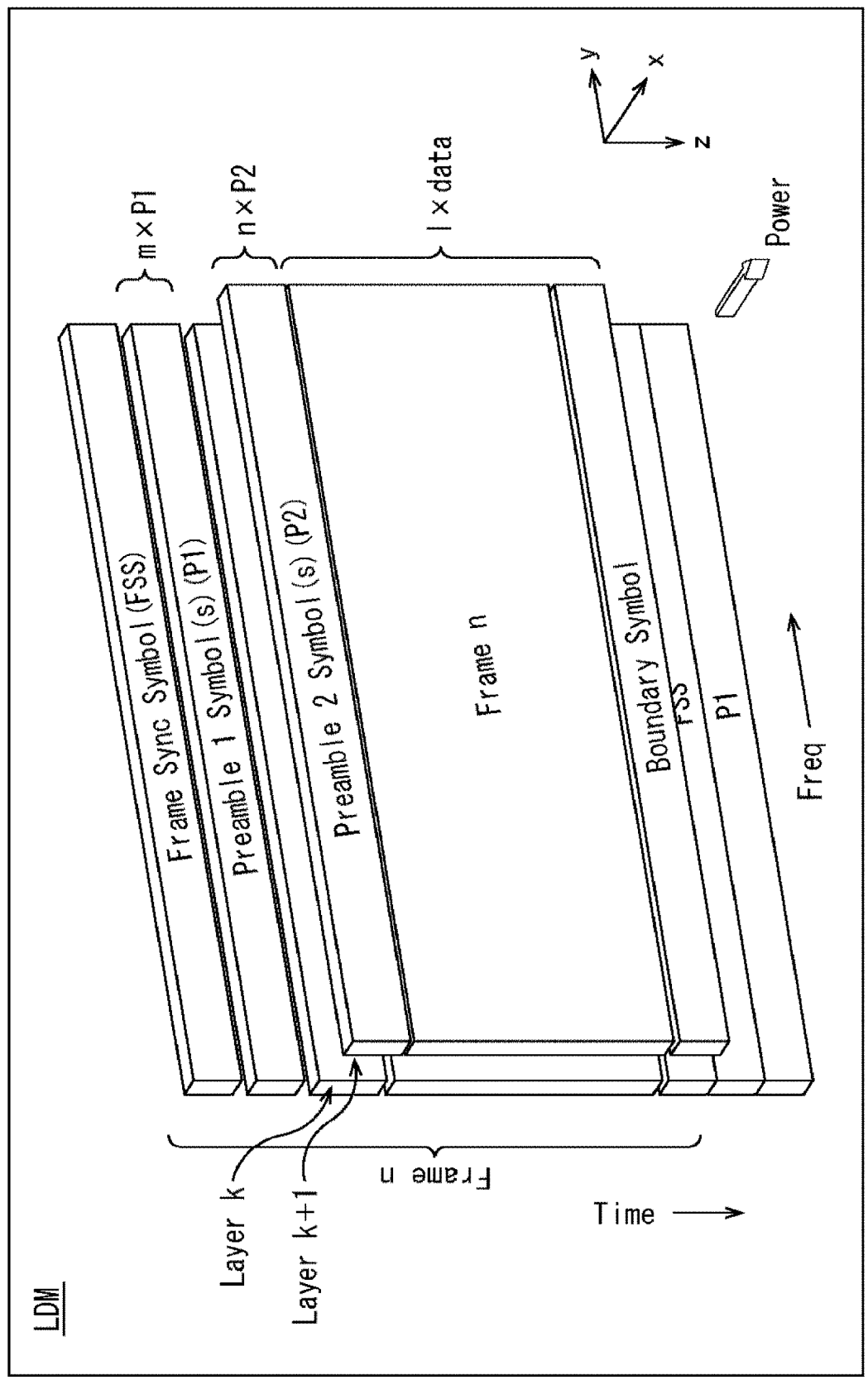
FIG. 9 is a diagram illustrating an exemplary configuration of the physical layer frame in layered division multiplexing (LDM).

FIG. 9 is a diagram illustrating an exemplary configuration of the physical layer frame in layered division multiplexing (LDM).

Layered division multiplexing (LDM) is a multiplexing system capable of dividing a plurality of broadcasting signals with different layer power and transmitting them in one transmission path.

FIG. 9 illustrates a configuration of the physical layer frame in layered division multiplexing (LDM) in three-dimension of xyz. However, FIG. 9 assumes that the x direction is a power (Power) direction, the y direction is a frequency (Freq) direction, and the z direction is a time (Time) direction.

In FIG. 9, the physical layer frames are transmitted in time series, but the frame synchronization symbol (FSS) is inserted at the head of each physical layer frame, and further the P1 symbol (P1) is subsequently inserted.

Further, the P2 symbol (P2), the frame as data symbol, and the boundary symbol (BS) are arranged per layer with different transmission power in layered division multiplexing (LDM). For example, the P2 symbols, the data symbols, and the boundary symbols are arranged, respectively, for the two layers of a layer k and a layer k+1 in the physical layer frame n of FIG. 9.

The physical layer frame in layered division multiplexing (LDM) can be configured as described above.

Additionally, the same term "layer" is used in frequency division multiplexing (FDM) and layered division multiplexing (LDM) in the description of the present specification, but the meanings of "layer" are technically different. Here, in a case where the multiplexing system of a layer is clear in the description of the present specification, the layers are not particularly discriminated, and the term "layer" is used. On the other hand, in a case where the term "layer" needs to be particularly discriminated, the layer in frequency division multiplexing (FDM) is described as "FDM layer" and the layer in layered division multiplexing (LDM) is described as "LDM layer".

(4) Configuration of Frame Synchronization Symbol (FSS) and P1 Symbol (P1)

A configuration of the frame synchronization symbol (FSS) and the P1 symbols (P1) in the physical layer frame will be described below with reference to FIG. 10 to FIG. 22.

(Current Configuration of FSS and P1)

Figure 10:
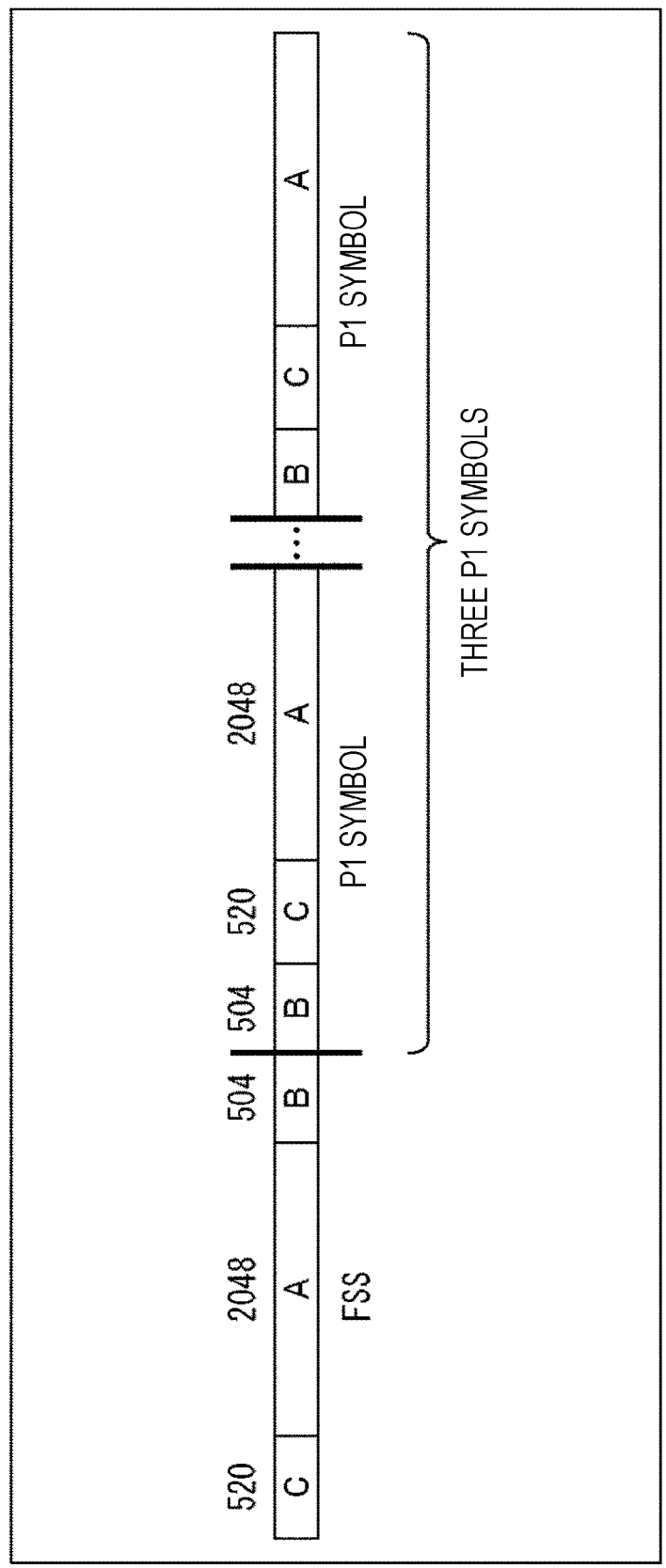
FIG. 10 is a diagram illustrating a current configuration of a frame synchronization symbol (FSS) and P1 symbols (P1)

FIG. 10 is a diagram illustrating a current configuration of the frame synchronization symbol (FSS) and the P1 symbols (P1).

The CAB structure and the BCA structure illustrated in FIG. 10 correspond to a configuration of bootstrap defined in ATSC3.0 (see Non-Patent Document 2, for example). It is assumed herein that the frame synchronization symbol (FSS) is in the CAB structure and the P1 symbol (P1) is in the BCA structure. That is, ATSC3.0 defines that one physical layer frame includes one frame synchronization symbol (FSS) and three P1 symbols (P1).

However, it is assumed that sample C is 520, sample A is 2048, and sample B is 504 in the CAB structure of the frame synchronization symbol (FSS) of FIG. 10. Similarly, it is assumed that sample B is 504, sample C is 520, and sample A is 2048 in the BCA structure of the P1 symbol (P1) of FIG. 10.

(Configuration of FSS and P1 According to Present Technology)

Figure 11:
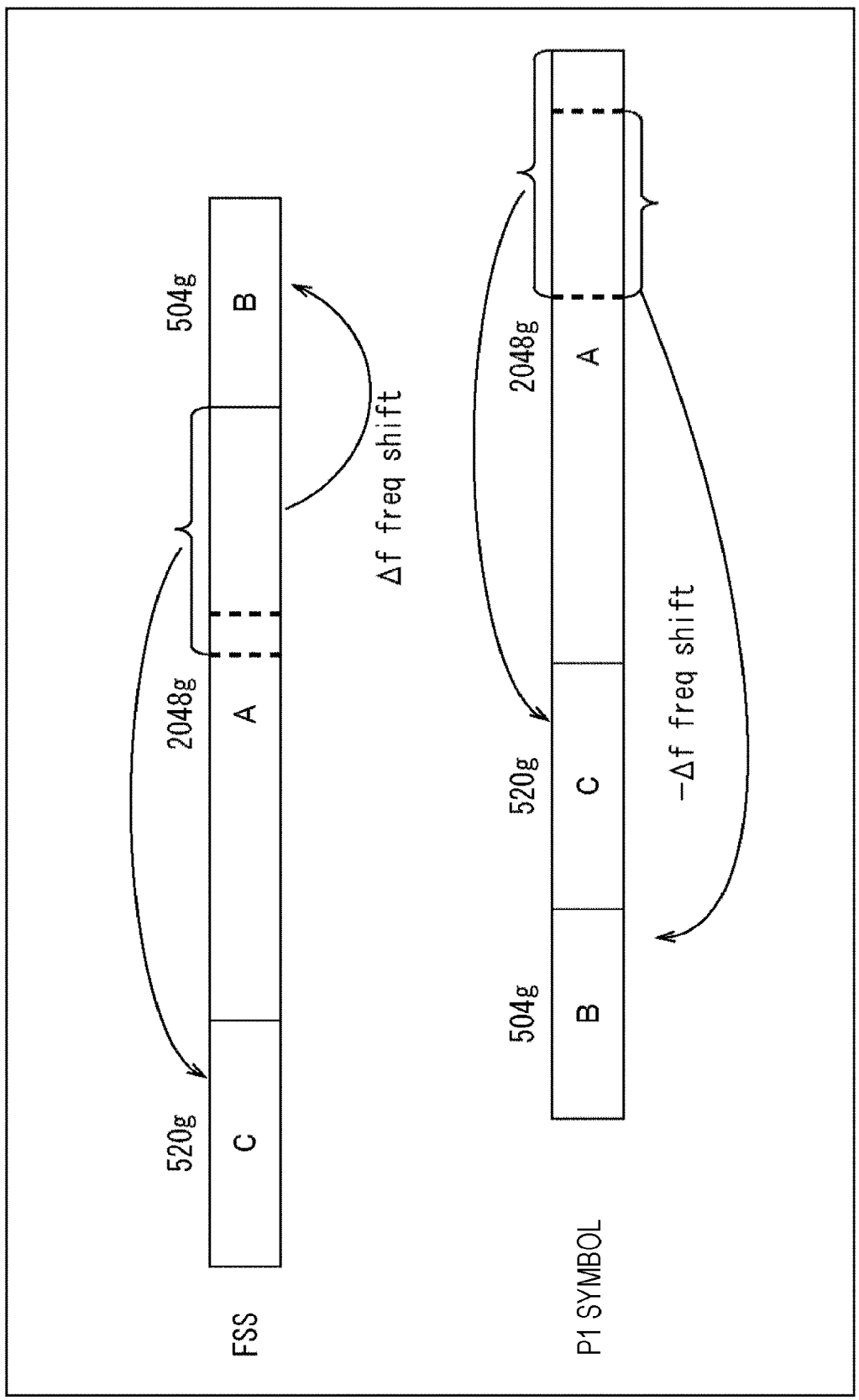
FIG. 11 is a diagram illustrating an outline of a configuration of a frame synchronization symbol (FSS) and a P1 symbol (P1) according to the present technology.

FIG. 11 is a diagram illustrating an outline of a configuration of the frame synchronization symbol (FSS) and the P1 symbol (P1) according to the present technology.

In FIG. 11, in a case where samples C, A, and B are 520 g, 2048 g, and 504 g, respectively, in the CAB structure of the frame synchronization symbol (FSS), g=0.5 is mainly assumed in the configuration of the present technology. On the other hand, in a case where samples B, C, and A are 504 g, 520 g, and 2048 g, respectively, also in the BCA structure of the P1 symbol (P1), g=0.5 is mainly assumed in the configuration of the present technology.

That is, the lengths of the frame synchronization symbol (FSS) and the P1 symbol (P1) can be halved at g=0.5, thereby realizing high efficiency in the physical layer frame.

Specifically, sample C, sample A, and sample B can be assumed at 260, 1024, and 252, respectively, in the CAB structure of the frame synchronization symbol (FSS).

Similarly, sample B, sample C, and sample A can be assumed at 252, 260, and 1024, respectively, in the BCA structure of the P1 symbol (P1).

Further, in the configuration of the present technology, unlike the ATSC3.0 configuration, the number of P1 symbols is reduced from 3 to 2 so that one physical layer frame includes one frame synchronization symbol (FSS) and two P1 symbols (P1). That is, the efficiency is ¾ lower in the configuration of the present technology than in the ATSC3.0 configuration.

Figure 12:
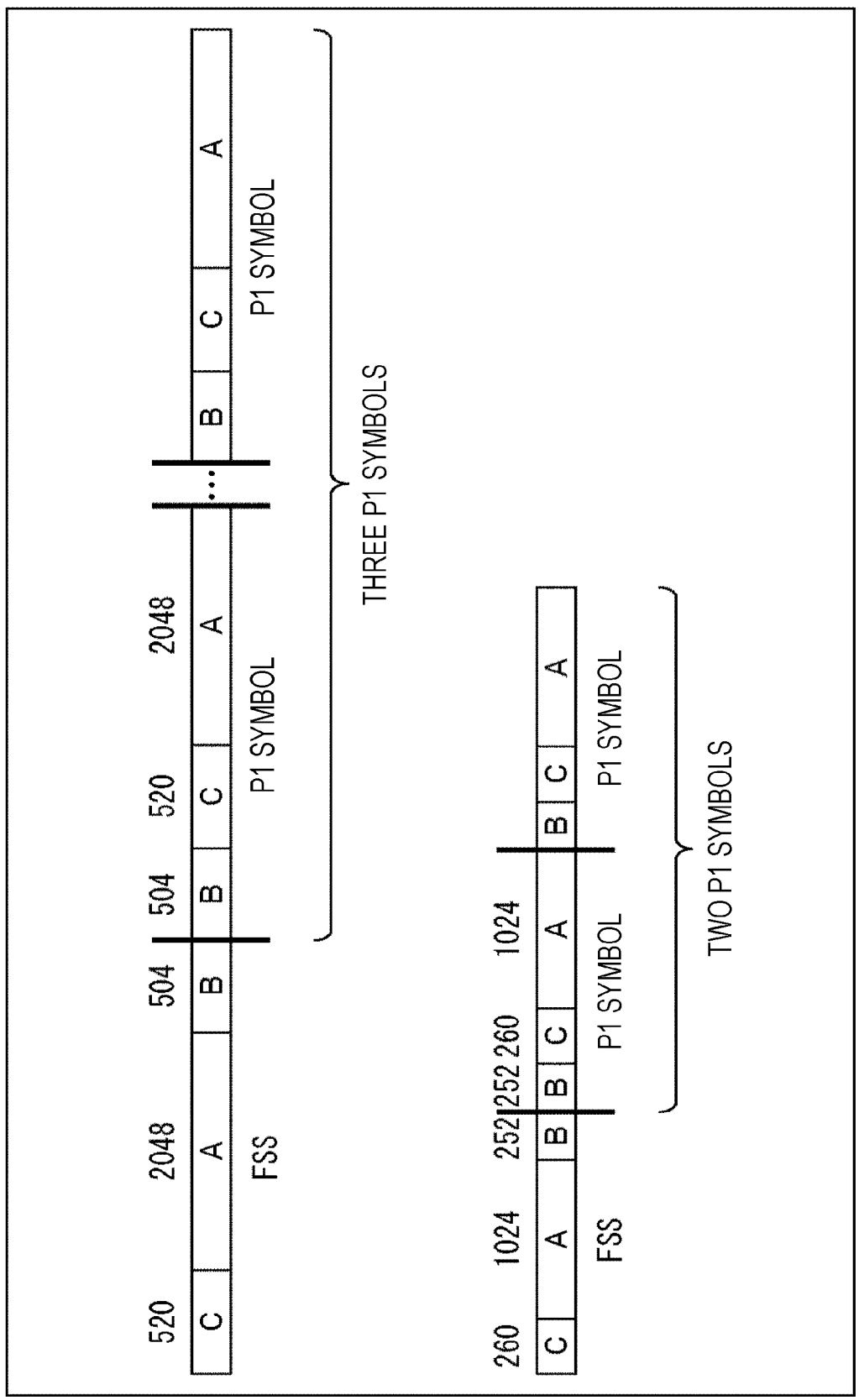
FIG. 12 is a diagram illustrating a comparison between the current configuration and the configuration of the present technology.

FIG. 12 illustrates the ATSC3.0 configuration in the upper part and the configuration of the present technology in the lower part for a configuration of the frame synchronization symbol (FSS) and the P1 symbols (P1).

In FIG. 12, the lengths of the frame synchronization symbol (FSS) and the P1 symbol (P1) are halved and further the number of P1 symbols is reduced from 3 to 2 in the configuration of the present technology in the lower part unlike in the ATSC3.0 configuration in the upper part. Thus, the transmission time can be further reduced to ⅜ (½×¾) in the configuration of the present technology in the lower part than in the ATSC3.0 configuration in the upper part.

Here, FIG. 13 illustrates relationships among value g, FFT size, samples, maximum transmission speed (Max bps), and robust transmission speed (Robust bps).

In FIG. 13, the values of FFT size, samples, maximum transmission speed, and robust transmission speed increase or decrease depending on value g. As described above, FTT size=1024, samples=1536, maximum transmission speed=10 bps, and robust transmission speed=6 bps or 7 bps at g=0.5 are assumed in the configuration of the present technology, thereby achieving higher efficiency than in the ATSC3.0 configuration (g=1.0).

Additionally, robust transmission speed can be logically up to 10 bps, but a sufficient correlation cannot be achieved due to noise in a channel or the like, and thus robust transmission speed is actually 3 bps or 4 bps with back-off. Additionally, robust transmission speed is logically up to 11 bps in the ATSC3.0 configuration, but is actually 8 bps. On the other hand, robust transmission speed can be 6 bps, for example, though it is logically up to 10 bps in the configuration of the present technology.

Further, the inventors of the present technology simulate symbol to noise ratio (SNR) per FFT size illustrated in FIG. 13 in order to demonstrate that g=0.5 is preferable. The simulation results are illustrated in FIG. 14 to FIG. 18.

Additionally, the simulations assume that the reception apparatus 30 receives the entire frequency band (6 MHz, for example) assigned to channels. Further, the horizontal axis indicates symbol to noise ratio (SNR) and the vertical axis indicates block error rate (BLER) in FIG. 14 to FIG. 18.

Further in FIG. 14 to FIG. 18, a in [a, b, c] indicated as the simulation results in different lines indicates the number of bits of the frame synchronization symbol (FSS), and b and c other than a indicate the number of bits of the P1 symbol (P1). The frame synchronization symbol (FSS) has no information, and is indicated as 0 bit. Further, the number of bits of the P1 symbol (P1) is assumed at 2 to 12, or the like.

Figure 14:
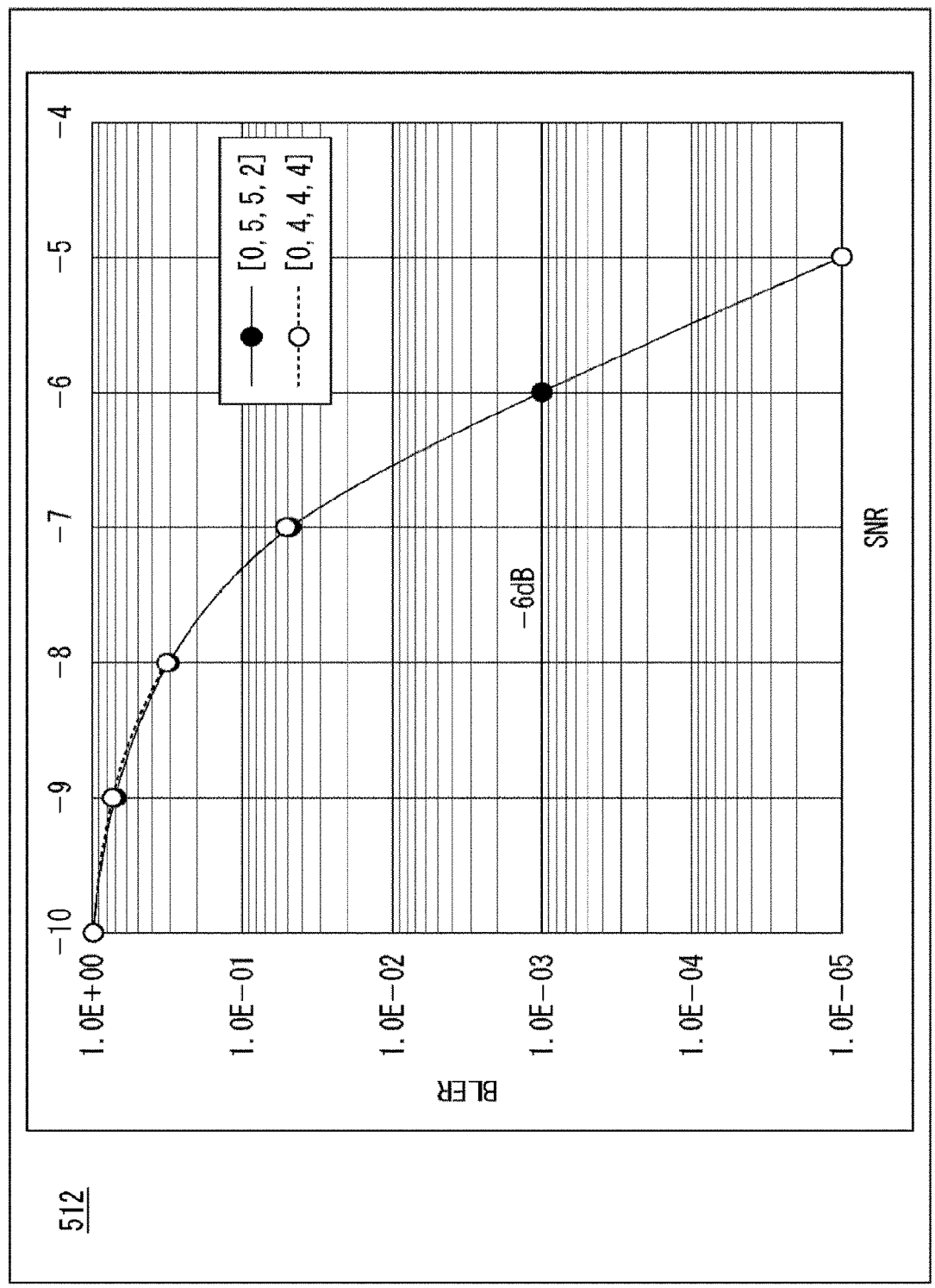
FIG. 14 is a diagram illustrating a relationship between BLER and SNR at FFT=512.

FIG. 14 illustrates a simulation result at FFT size=512. In the simulation result of FIG. 14, SNR=−6 dB is assumed at BLER=$1.0×10^{-3}$ (1.0E-03).

Figure 15:
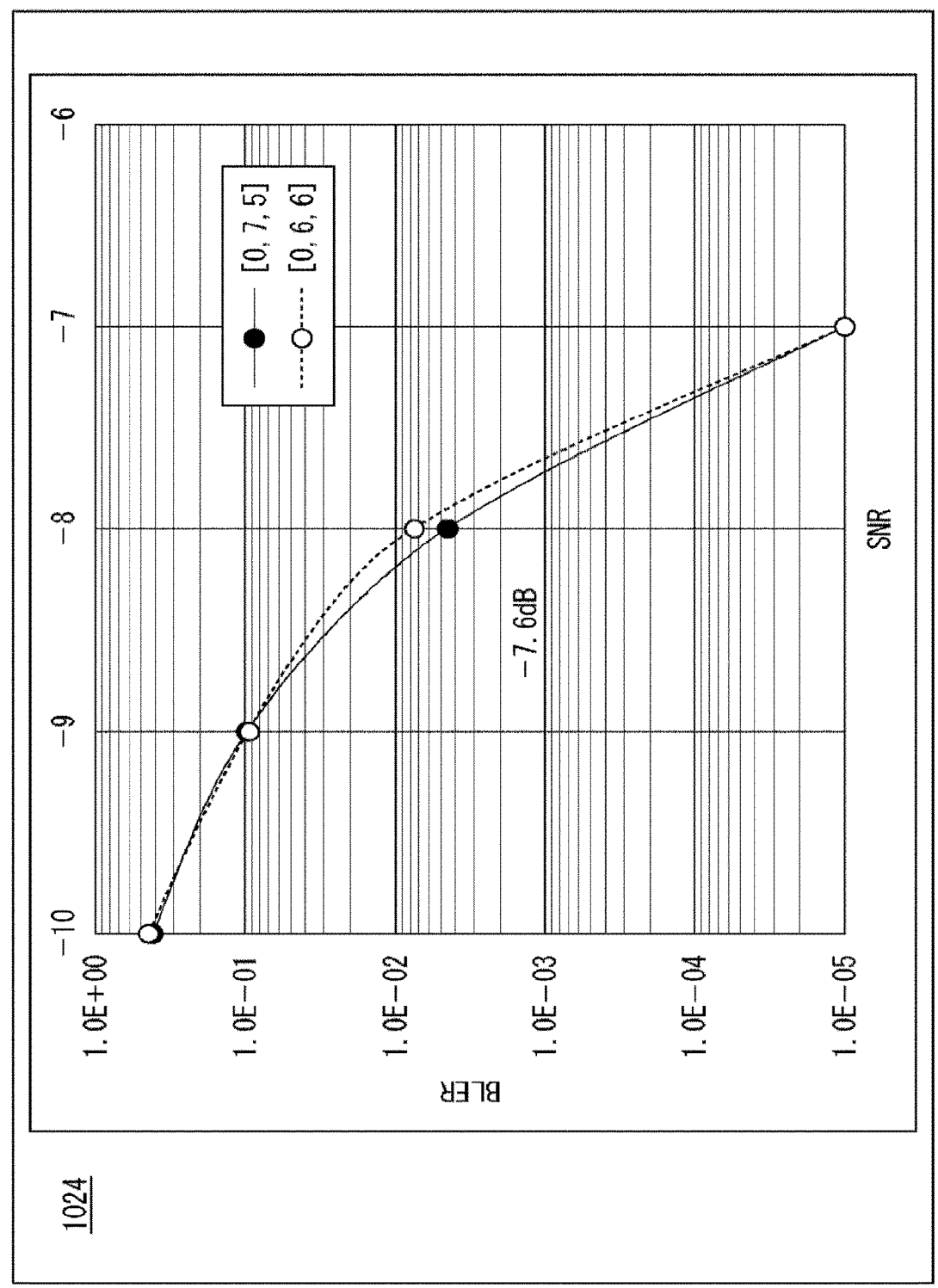
FIG. 15 is a diagram illustrating a relationship between BLER and SNR at FFT=1024.

FIG. 15 illustrates a simulation result at FFT size=1024. In the simulation result of FIG. 15, SNR=−7.6 dB is assumed at BLER=$1.0×10^{-3}$ (1.0E-03).

Figure 16:
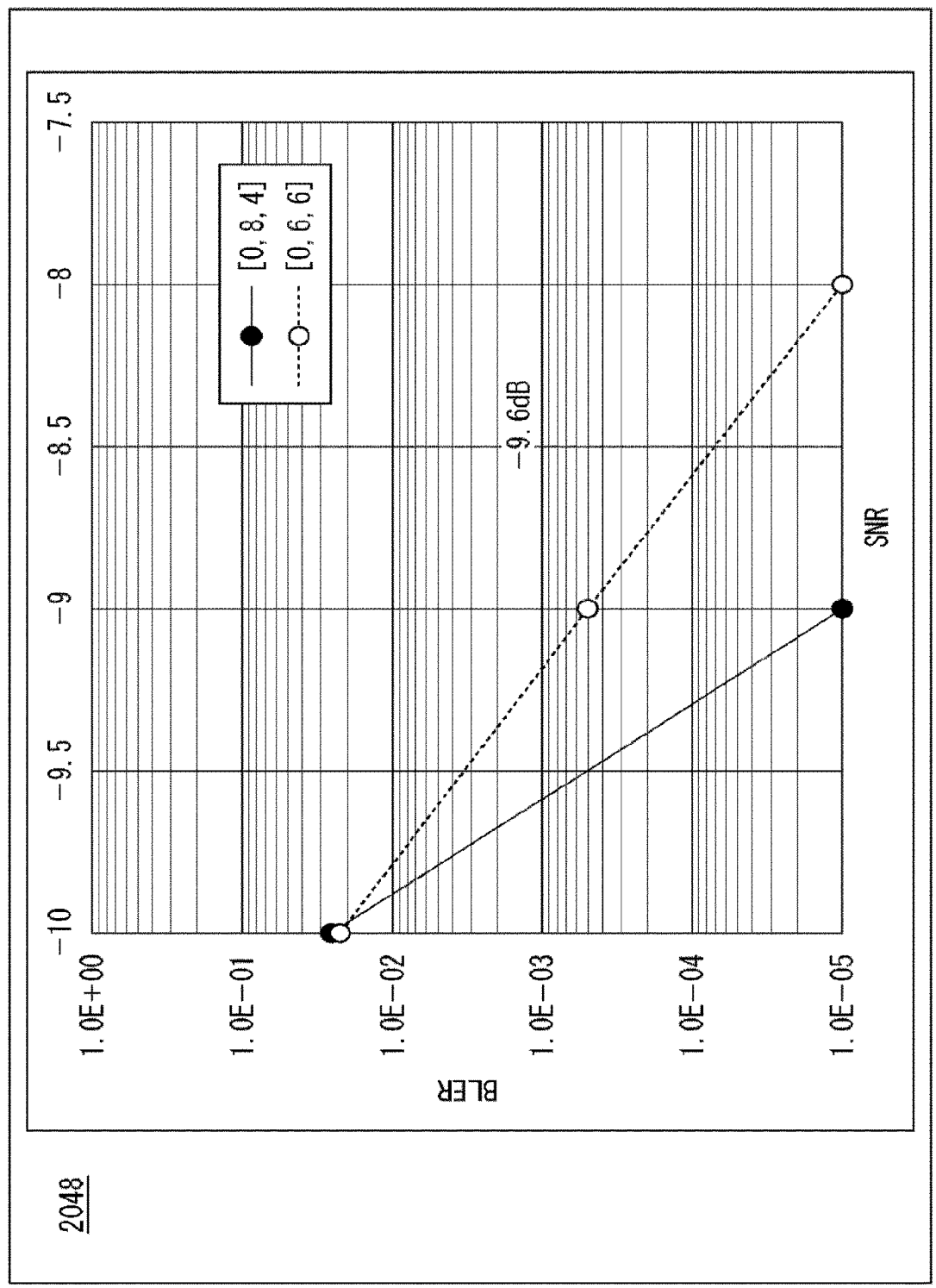
FIG. 16 is a diagram illustrating a relationship between BLER and SNR at FFT=2048.

FIG. 16 illustrates a simulation result at FFT size=2048. In the simulation result of FIG. 16, SNR=−9.6 dB is assumed at BLER=$1.0×10^{-3}$ (1.0E-03).

Figure 17:
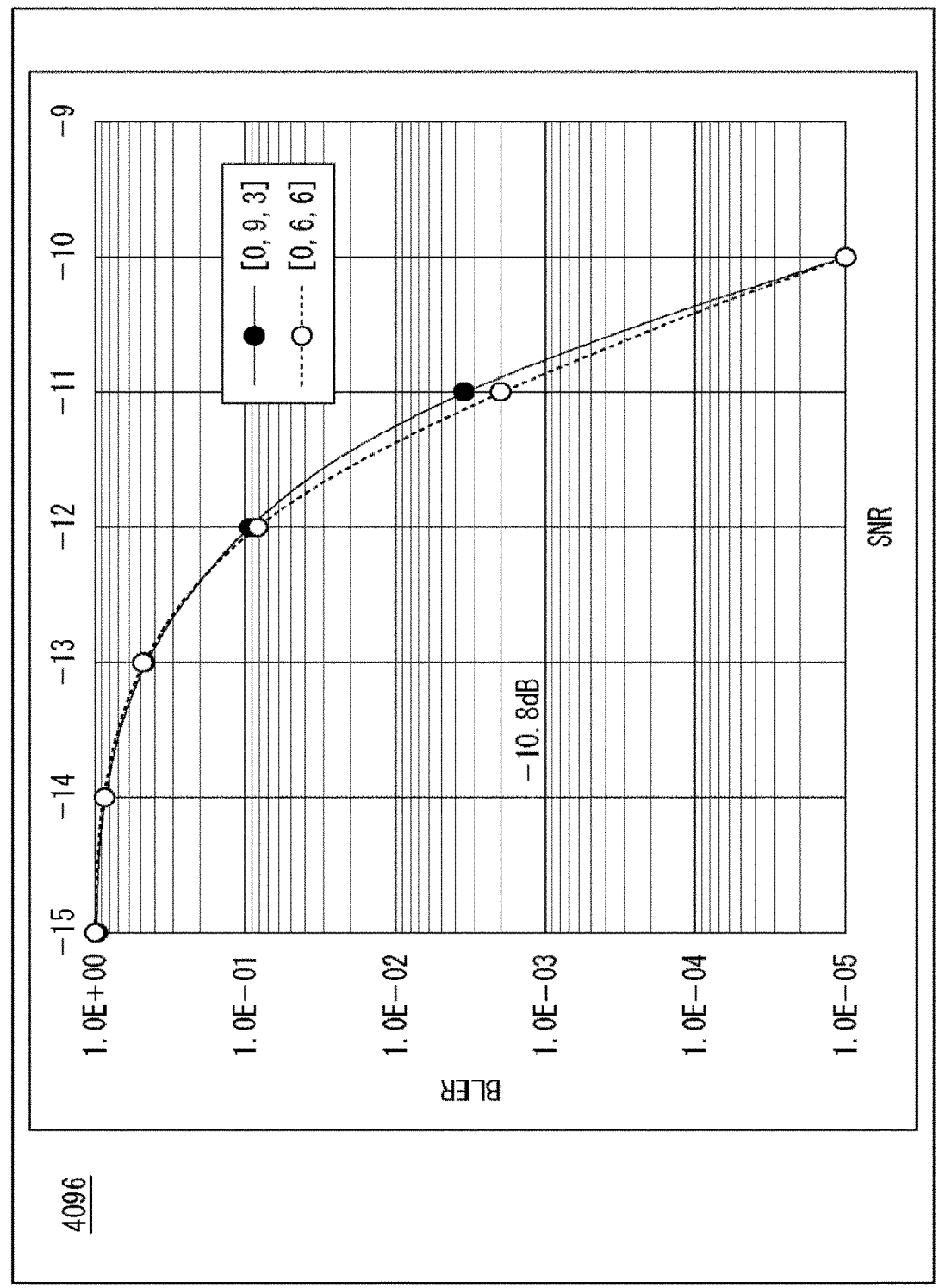
FIG. 17 is a diagram illustrating a relationship between BLER and SNR at FFT=4096.

FIG. 17 illustrates a simulation result at FFT size=4096. In the simulation result of FIG. 17, SNR=−10.8 dB is assumed at BLER=$1.0×10^{-3}$ (1.0E-03).

Figure 18:
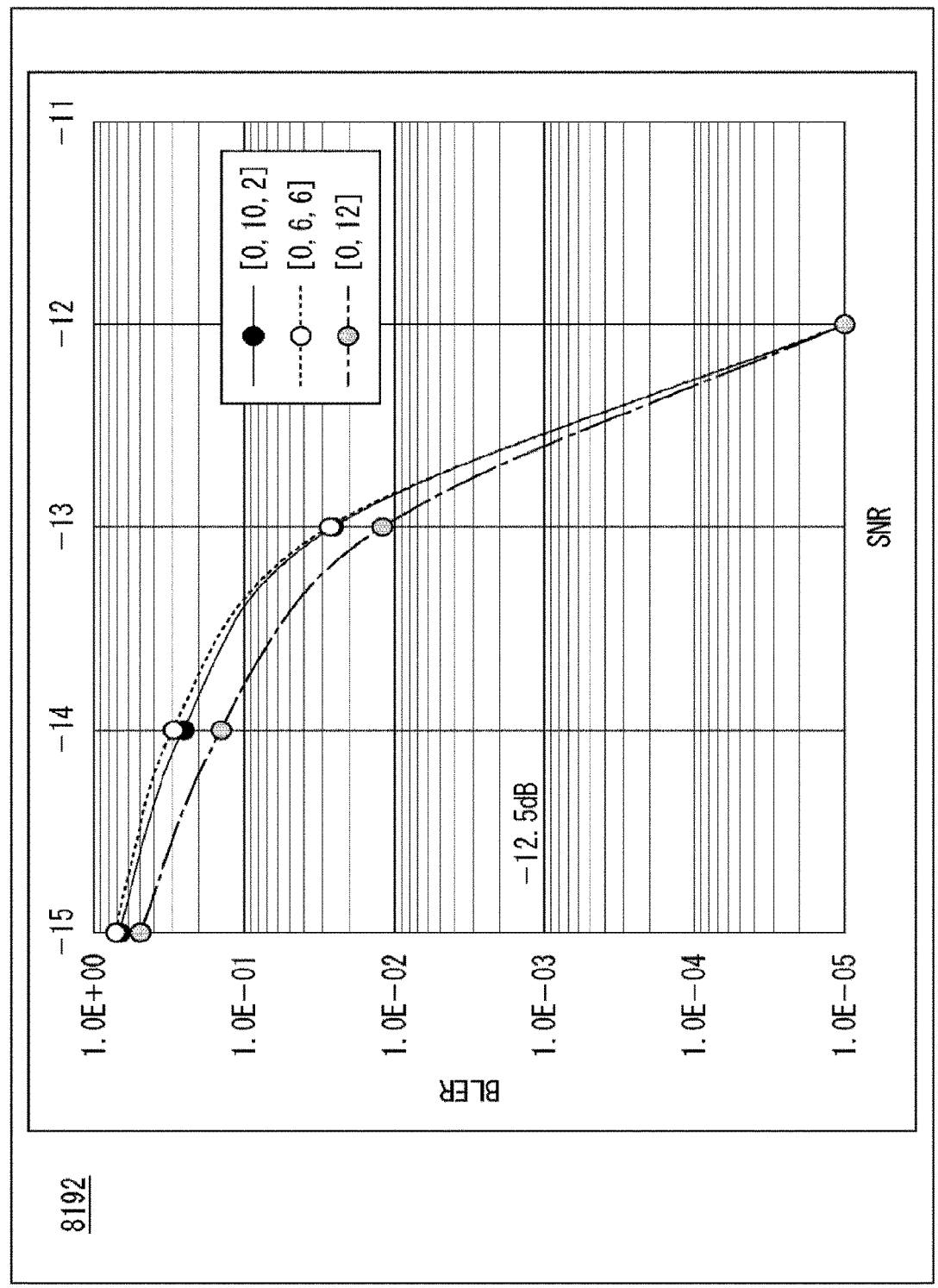
FIG. 18 is a diagram illustrating a relationship between BLER and SNR at FFT=8192.

FIG. 18 illustrates a simulation result at FFT size=8192. In the simulation result of FIG. 18, SNR=−12.5 dB is assumed at BLER=$1.0×10^{-3}$ (1.0E-03).

Here, the ATSC3.0 configuration corresponds to the simulation result (FIG. 16) at g=1.0 or FFT size=2048, and thus SNR=−9.6 dB is assumed. On the other hand, the configuration of the present technology corresponds to the simulation result (FIG. 15) at g=0.5 or FFT size=1024, and thus SNR=−7.6 dB is assumed.

Then, SNR of around −7.6 dB is generally sufficient, and SNR of −9.6 dB is not required. In other words, g=1.0 used in the ATSC3.0 configuration is excessive, and sufficient performance can be achieved at g=0.5. Thus, g=0.5 is preferable in the configuration of the present technology.

However, the description has been made assuming that g=0.5 is preferable in terms of a reduction in transmission time, but the value g may take other values such as 0.25, 1.00, 2.00, and 4.00 in addition to 0.5 in the configuration of the physical layer frame according to the present technology.

Further, in a case where a multiplexing system of frequency division multiplexing (FDM) is employed, the reception apparatus 30 receives the frame synchronization symbol (FSS) and the P1 symbols (P1) in a partial band. For example, as illustrated in FIG. 19, a predetermined frequency band (6 MHz, for example) assigned to channels is divided into a plurality of segments in frequency division multiplexing (FDM).

Figure 19:
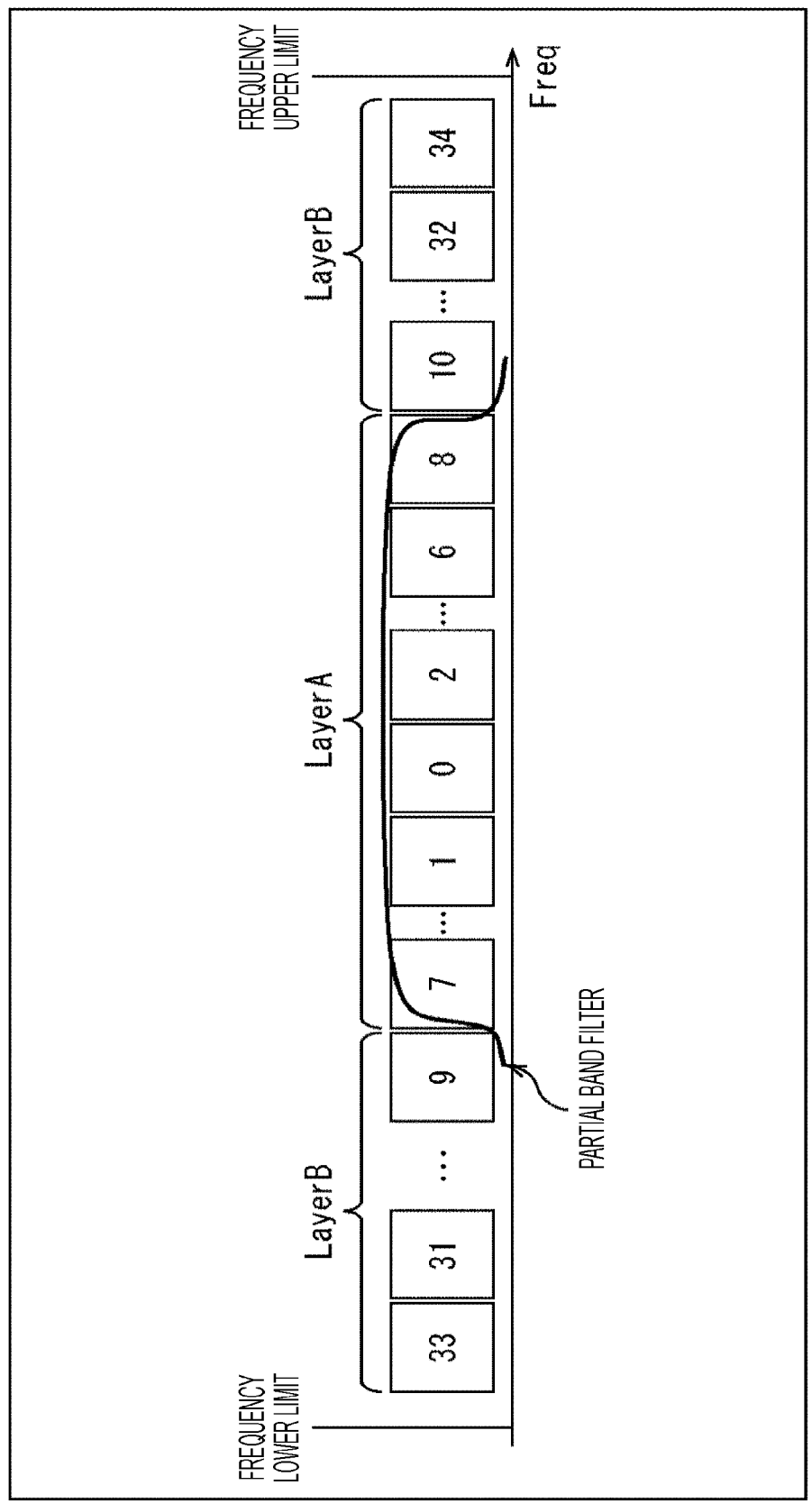
FIG. 19 is a diagram illustrating a configuration of layers in a case where reception in a partial band is performed in frequency division multiplexing (FDM).

The example of FIG. 19 illustrates that a layer (FDM layer) is configured of segments in squares in the frequency band (6 MHz, for example) between the upper limit frequency and the lower limit frequency assuming the horizontal direction as frequency. In FIG. 19, the frequency band is divided into 35 segments.

Here, if one center segment among the 35 segments is assumed as segment #0 and its left and right segments are assumed as segments #1 and #2, respectively, their left and right segments are assumed as segments #3 and #4, respectively, and the numbering is repeatedly performed, the leftmost (lower limit frequency) segment in the Figure is assumed as segment #33 and the rightmost (upper limit frequency) segment in the Figure is assumed as segment #34.

Further, one or more segments are put together thereby to configure a layer. In FIG. 19, the layer A is configured of the nine segments #0 to #8. Further, the layers B are configured of a total of 26 segments of the 13 segments #10, #12, . . . , #32, and #34 and the 13 segments #9, #11, . . . , #31, and #33, respectively.

In this way, a layer is configured of one or more segments, and data of a different broadcasting service can be transmitted per layer, for example. For example, in a case where the reception apparatus 30 receives data of a broadcasting service transmitted in the layer A, it receives only the frequency band of the layer A due to a partial band filter (FIG. 19).

That is, the reception apparatus 30 receives only the partial band corresponding to the layer A in the entire frequency band assigned to channels, and receives the frame synchronization symbol (FSS) and the P1 symbols (P1) in the partial band. That is, the partial band corresponding to the layer A relative to the entire frequency band is assumed as 9/35.

Here, the inventors of the present technology simulate SNR at FFT size=1024 in order to demonstrate that g=0.5 is preferable in a case where the partial band corresponding to the layer A is assumed at 9/35 (around ¼) relative to the entire band. The simulation result is illustrated in FIG. 20.

Figure 20:
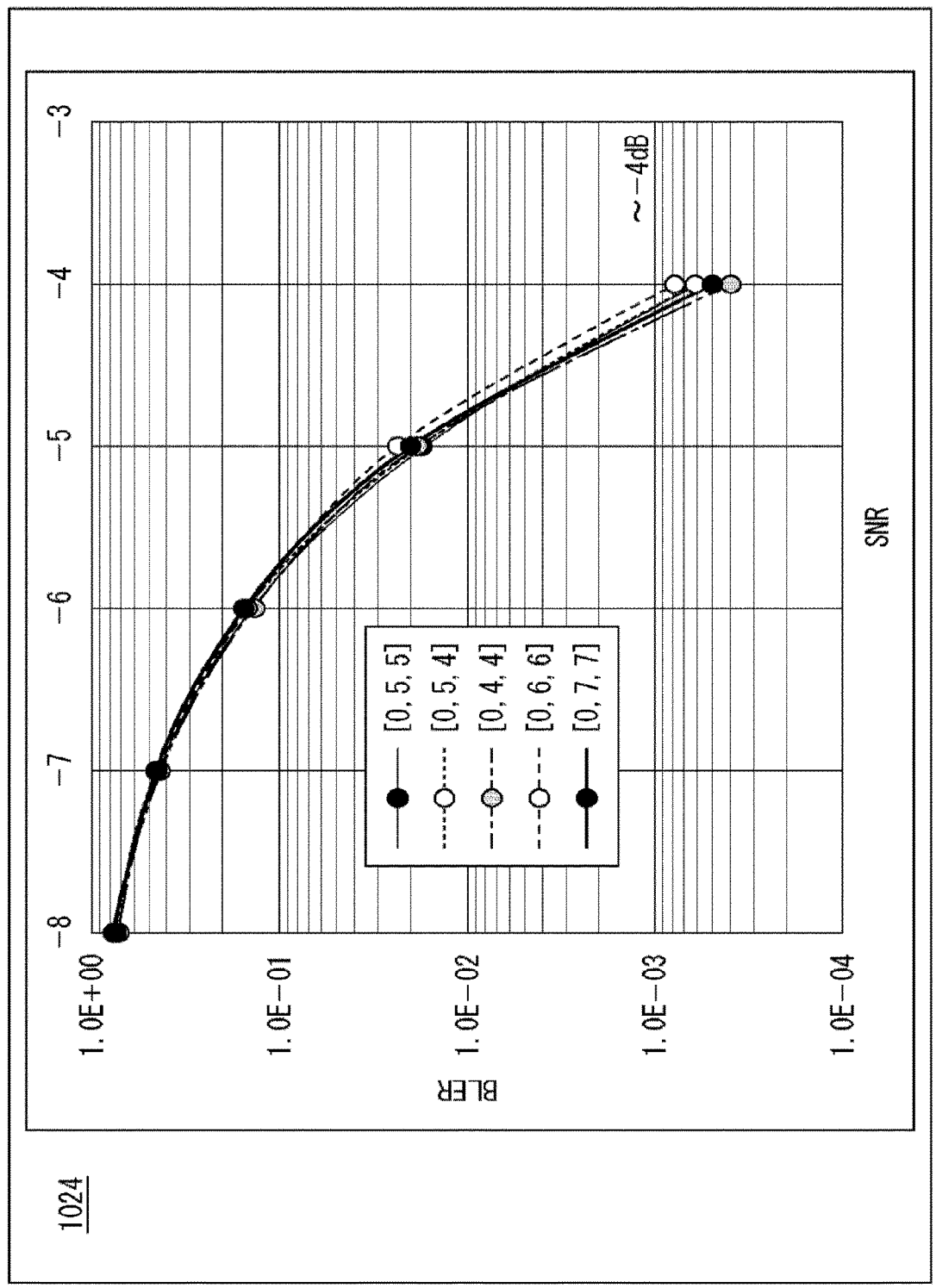
FIG. 20 is a diagram illustrating a relationship between BLER and SNR at FFT=1024 in a case where reception in a partial band is performed in frequency division multiplexing (FDM).

Additionally, the horizontal axis indicates SNR and the vertical axis indicates BLER in FIG. 20 similarly as in FIG. 14 to FIG. 18. Further, FIG. 20 illustrates five simulation results. That is, a, b, and c in [a, b, c] indicated in different lines indicate the number of bits of the frame synchronization symbol (FSS), the number of bits of the first P1 symbol (P1), and the number of bits of the second P1 symbol (P1), respectively.

The frame synchronization symbol (FSS) has no information, and is assumed as 0 bits. Further, the number of bits of the P1 symbol (P1) is assumed as 4 to 7. That is, for example, [0, 5, 5] is assumed as information with a total of 10 bits including 0-bit FSS, 5-bit P1, and 5-bit P1. Similarly, [0, 5, 4], [0, 4, 4], [0, 6, 6], and [0, 7, 7] are assumed as 9-bit information, 8-bit information, 12-bit information, and 14-bit information, respectively.

In each simulation result of FIG. 20, SNR of around −4 dB is obtained at BLER=$1.0×10^{-3}$ (1.0E-03). That is, when the simulation result (FIG. 20) for the partial band (9/35) is compared with the simulation result (FIG. 15) for the entire band at g=0.5, SNR reduces from −7.6 dB to around −4 dB at BLER=$1.0×10^{-3}$ (1.0E-03).

However, SNR of around −4 dB is generally within the permitted range, and achieves sufficient performance. Thus, even in a case where the partial band for the layer A relative to the entire band is assumed at 9/35, g=0.5 can be preferable.

Further, one 6-bit symbol can be assumed in consideration of the robust property on the basis of various simulation results described above. However, 4-bit back-off actually enables 6-bit symbol assuming up to 10-bit symbol.

Figure 21:
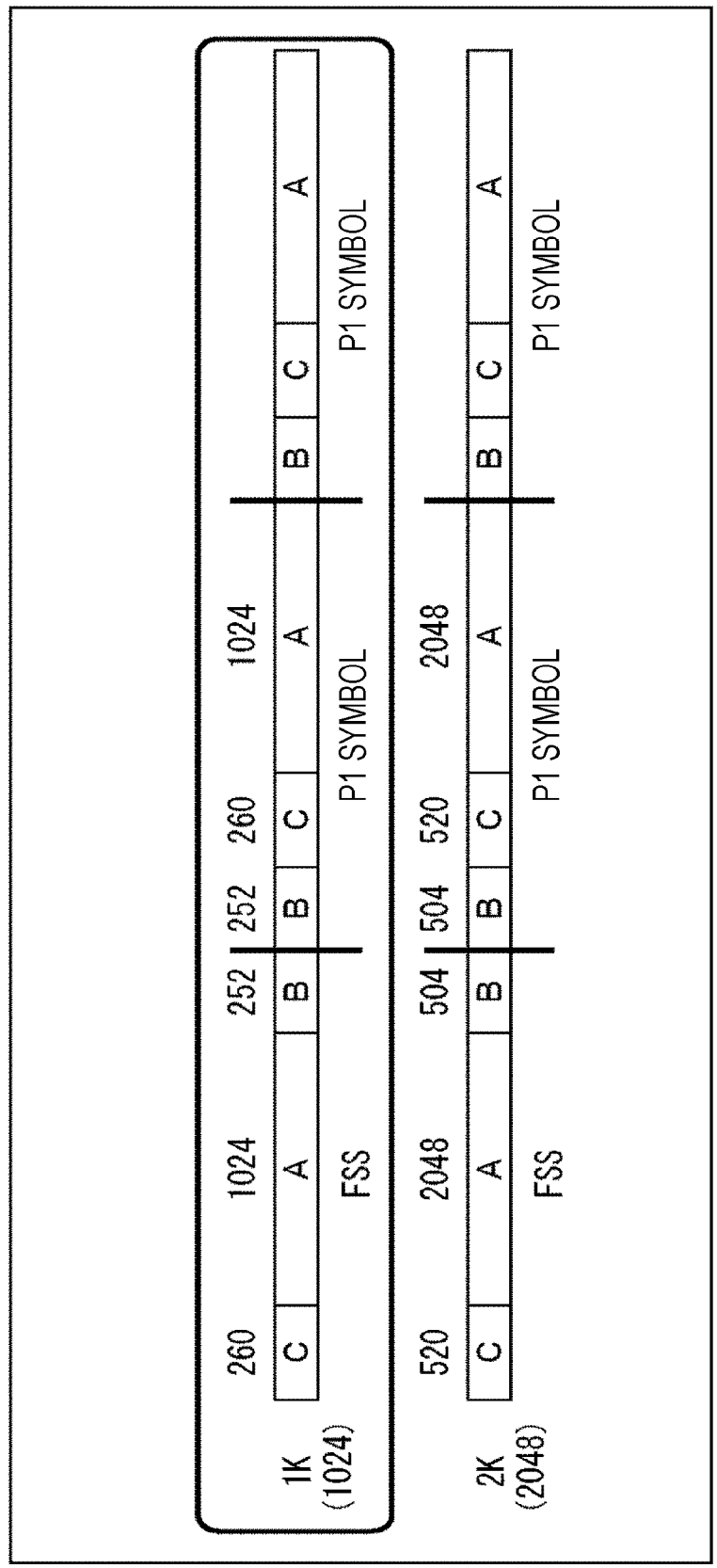
FIG. 21 is a diagram illustrating the configurations of a frame synchronization symbol (FSS) and P1 symbols (P1) according to the present technology.

On the other hand, 6-bit symbol is insufficient and two P1 symbols are required in consideration of information to be transmitted from the transmission apparatus 20 on transmission side to the reception apparatus 30 on reception side. Thereby, information can be sent by 12-bit (6 bits×2) P1 symbols. FIG. 21 illustrates a configuration of such P1 symbols.

That is, one physical layer frame in FIG. 21 is configured of one frame synchronization symbol (FSS) and two P1 symbols. In this way, it can be seen that two P1 symbols are preferably employed not only in terms of efficiency but also in terms of the number of bits per symbol. Additionally, FIG. 21 illustrates a configuration with FFT size=1024 (1K) and a configuration with FFT size=2048 (2K), but sufficient performance can be achieved in the configuration with FFT size=1024 as described above.

The above can be illustrated in FIG. 22. FIG. 22 illustrates relationships among FFT size, samples per symbol (Samples Per sym), maximum transmission speed (Max bps), robust transmission speed (Robust bps), number of symbols (#Syms), maximum number of bits (Maxbits), and total samples.

That is, assuming a preferable value g of 0.5, the configuration of the present technology can take FFT size=1024, samples per symbol=1536, maximum transmission speed=10 bps, robust transmission speed=6 bps, number of symbols=3, maximum number of bits=12 (6 bits×2), and total samples=4608 (1536×3).

Additionally, the lengths of the frame synchronization symbol (FSS) and the P1 symbol (P1) are halved at g=0.5 as illustrated in FIG. 12 and the like, and thus samples per symbol is 1536. Further, one physical layer frame is configured of one frame synchronization symbol (FSS) and two P1 symbols (P1) as illustrated in FIG. 12 and the like, and thus the number of symbols is 3. Further, the maximum number of bits is 12 because the two P1 symbols take 12 bits in consideration of information to be sent from the transmissions side to the reception side assuming one symbol of 6 bits.

Further, time per symbol is 0.222 ms here at FFT size=1024 (1K) assuming a sampling frequency of 6.912 MHz, and thus time per symbol is 0.666 ms for three symbols. On the other hand, time per symbol is 1.33 ms at a sampling frequency of 6.912 MHz assuming FFT size=2048 (1K). Additionally, a sampling frequency of 6.912 MHz is employed here, but other sampling frequency may be employed.

(5) Configuration of P2 Symbol (P2)

A configuration of P2 symbols in the physical layer frame will be described below with reference to FIG. 23 to FIG. 27. Additionally, a configuration of P2 symbols is different per multiplexing system, and thus the configurations of P2 symbols in time division multiplexing (TDM), frequency division multiplexing (FDM), and layered division multiplexing (LDM) will be described below in this order.
(Exemplary Configuration in TDM)

Figure 23:
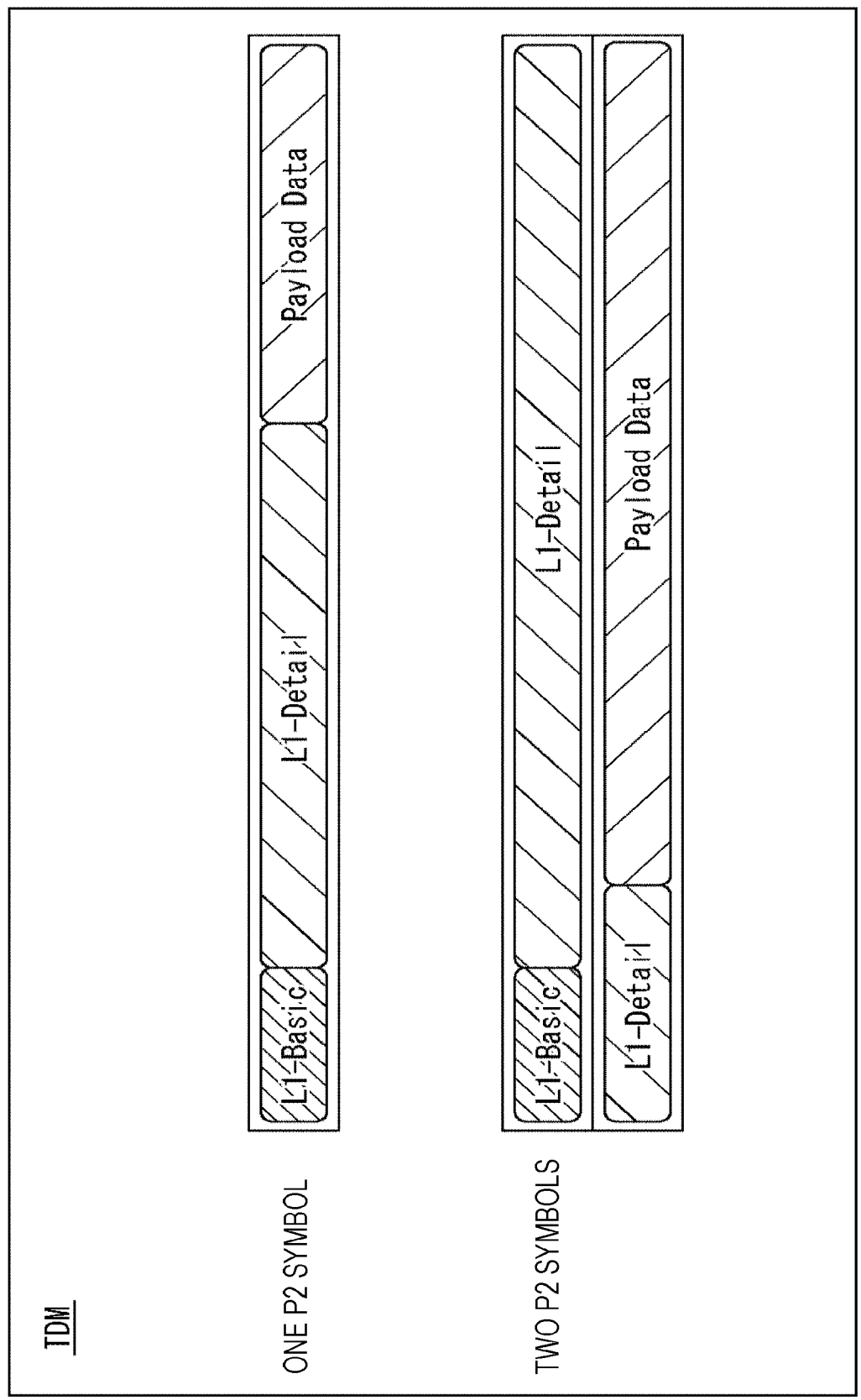
FIG. 23 is a diagram illustrating exemplary configurations of P2 symbols in time division multiplexing (TDM).

FIG. 23 is a diagram illustrating an exemplary configuration of P2 symbols in time division multiplexing (TDM).

The P2 symbol is an OFDM symbol, and includes L1B signaling and L1D signaling. Here, FIG. 23 illustrates a case in which one P2 symbol is arranged in one physical layer frame and a case where two P2 symbols are arranged therein.

In a case where one P2 symbol is arranged, the fixed-length L1B signaling (L1-Basic) is arranged at the head of the P2 symbol, and the variable-length L1D signaling (L1-Detail) is subsequently arranged. Further, data (Payload data) is arranged in the rest of the P2 symbol.

On the other hand, in a case where two P2 symbols are arranged, the fixed-length L1B signaling (L1-Basic) is arranged at the head of the first P2 symbol, and the variable-length L1D signaling (L1-Detail) is subsequently arranged. Here, the variable-length L1D signaling is not within the first P2 symbol, and thus the rest of the L1D signaling is arranged in the second P2 symbol. Further, the data (Payload data) is arranged in the rest of the second P2 symbol.

Additionally, in a case where one or more subframes are arranged in the physical layer frame as illustrated in FIG. 6, all the L1 signaling (including the L1B signaling and the L1D signaling) are arranged before the head subframe.

First Exemplary Configuration in FDM

Figure 24:
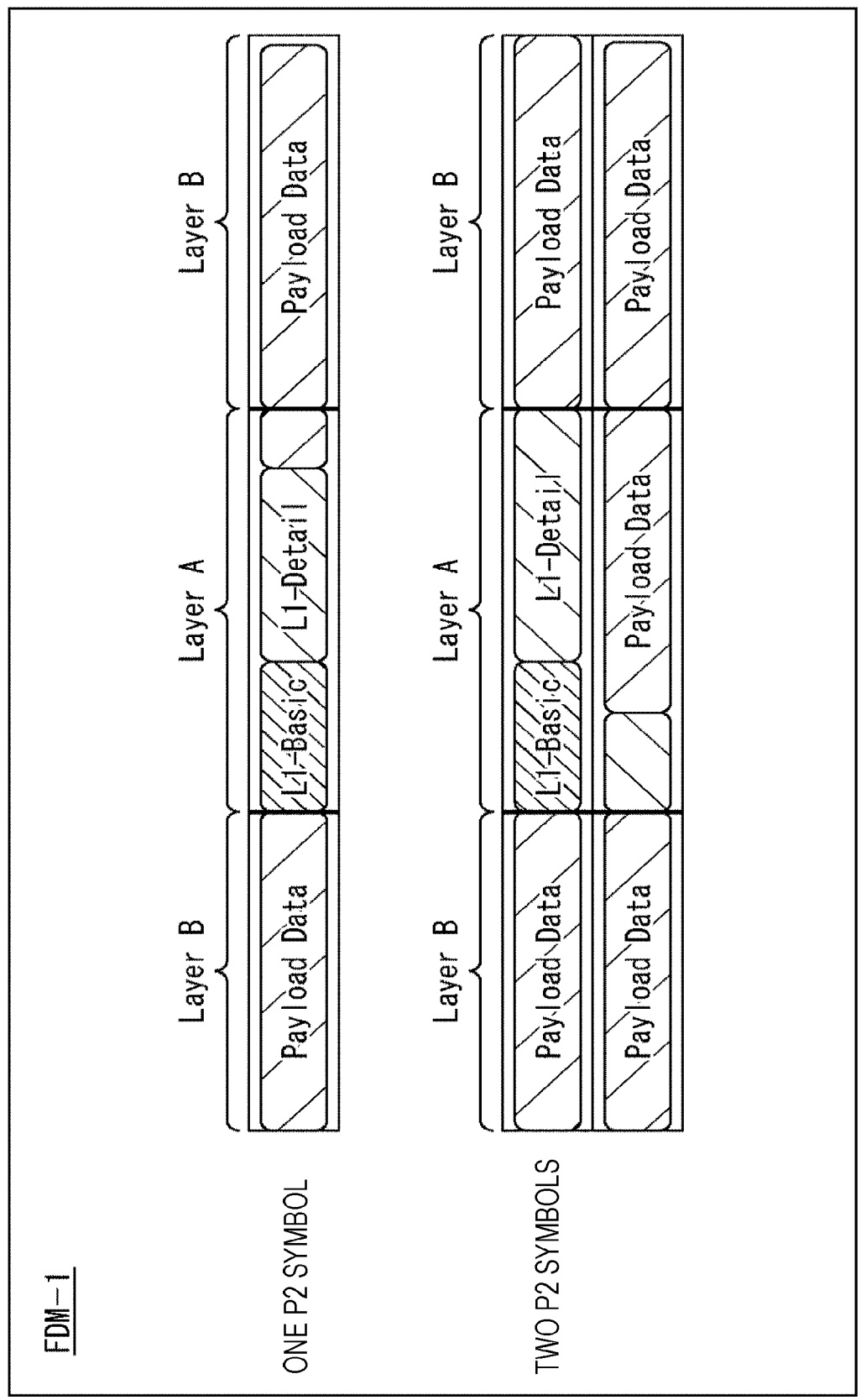
FIG. 24 is a diagram illustrating a first exemplary configuration of P2 symbols in frequency division multiplexing (FDM).

FIG. 24 is a diagram illustrating a first exemplary configuration of P2 symbols in frequency division multiplexing (FDM).

Here, FIG. 24 illustrates a case where one P2 symbol is arranged in one physical layer frame and a case where two P2 symbols are arranged therein when the layer A and the layers B are configured by use of frequency division multiplexing (FDM).

In a case where one P2 symbol is arranged, the fixed-length L1B signaling (L1-Basic) is arranged at the head of the part corresponding to the layer A in the P2 symbol, and the variable-length L1D signaling (L1-Detail) is subsequently arranged. Further, the data (Payload data) is arranged in the rest of the part corresponding to the layer A in the P2 symbol.

That is, when one P2 symbol is arranged and configured of a plurality of layers, the L1B signaling and the L1D signaling are included only in the layer A including the center segment. Additionally, only the data (Payload data) is arranged in the right and left layers B in the P2 symbol.

On the other hand, in a case where two P2 symbols are arranged, the fixed-length L1B signaling (L1-Basic) is arranged at the head of the part corresponding to the layer A in the first P2 symbol, and the variable-length L1D signaling (L1-Detail) is subsequently arranged.

Here, the variable-length L1D signaling is not within the part corresponding to the layer A in the first P2 symbol, and thus the rest of the L1D signaling is arranged in the part corresponding to the layer A in the second P2 symbol. Further, the data (Payload data) is arranged in the rest of the part corresponding to the layer A in the second P2 symbol.

That is, when two P2 symbols are arranged and configured of a plurality of layers, respectively, the L1B signaling and the L1D signaling are arranged only in the layer A including the center segment. Additionally, only the data (Payload data) is arranged in the right and left layers B in the two P2 symbols.

In a case where a plurality of layers are configured in frequency division multiplexing (FDM) in this way, the L1B signaling is arranged in the part corresponding to the layer A in a P2 symbol, and the L1D signaling is arranged in the rest of the part corresponding to the layer A. At this time, in a case where the L1D signaling is not within the part corresponding to the layer A in the first P2 symbol, the rest of the L1D signaling is arranged in the part corresponding to the layer A in the second P2 symbol.

Thereby, all the L1 signaling (including the L1B signaling and the L1D signaling) are included in the P2 symbols in the layer A including the center segment, and thus the reception apparatus 30 can acquire the L1 signaling not only in a case where the entire frequency band (6 MHz, for example) assigned to channels is received but also in a case where only the partial band (%s relative to the entire band, for example) corresponding to the layer A is received.

Second Exemplary Configuration in FDM

Figure 25:
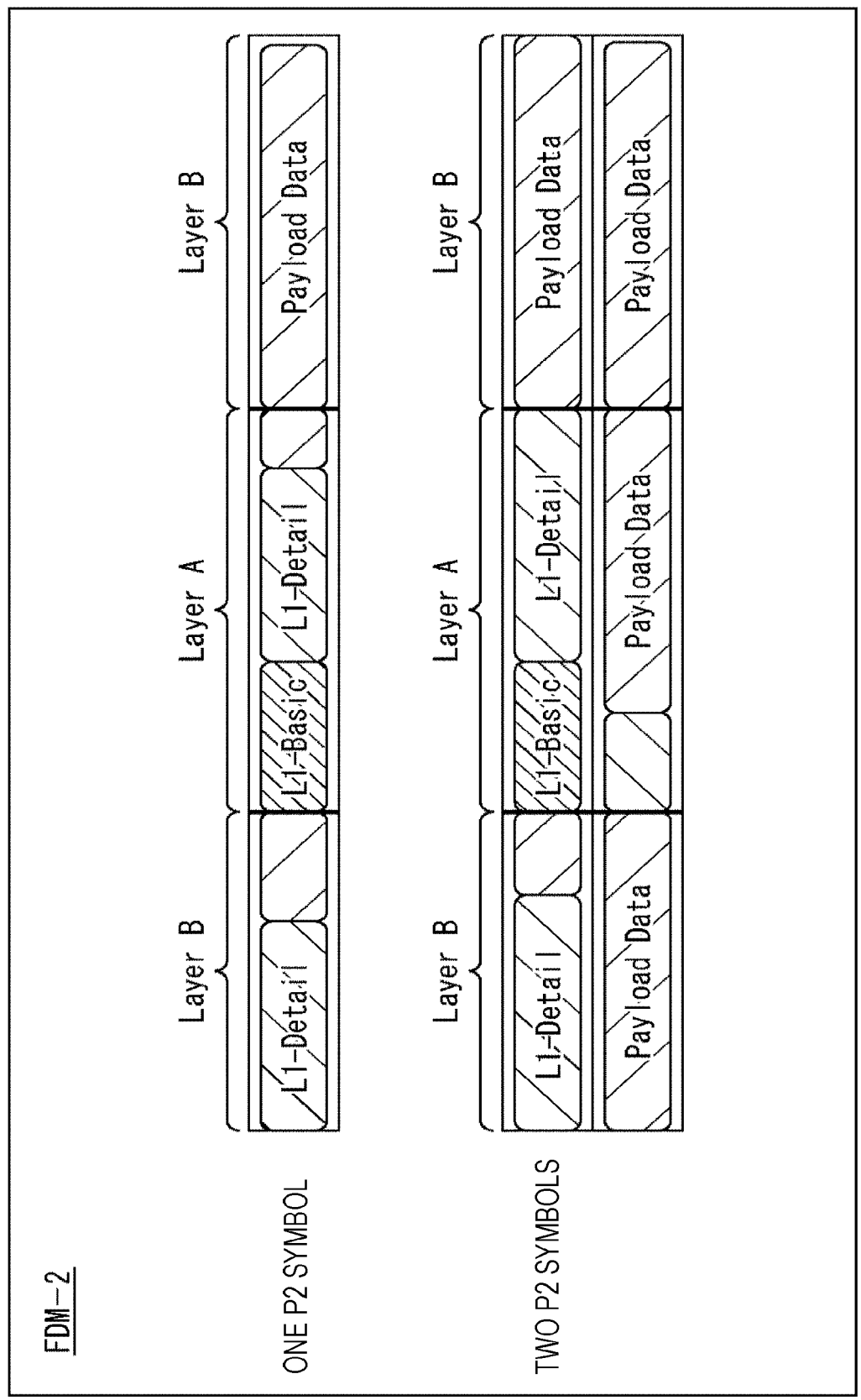
FIG. 25 is a diagram illustrating a second exemplary configuration of P2 symbols in frequency division multiplexing (FDM).

FIG. 25 is a diagram illustrating a second exemplary configuration of P2 symbols in frequency division multiplexing (FDM).

FIG. 25 illustrates a case where one P2 symbol is arranged in one physical layer frame and a case where two P2 symbols are arranged therein when the layer A and the layers B are configured similarly as in FIG. 24.

In a case where one P2 symbol is arranged, the fixed-length L1B signaling (L1-Basic) is arranged at the head of the part corresponding to the layer A in the P2 symbol, and the variable-length L1D signaling (L1-Detail) is subsequently arranged. Further, the data (Payload data) is arranged in the rest of the part corresponding to the layer A in the P2 symbol.

Further, the variable-length L1D signaling (L1-Detail) is arranged at the head of the part corresponding to one layer B (the left layer B) in the P2 symbol, and the data (Payload data) is subsequently arranged. However, the L1D signaling includes only the information associated with the layers B. Additionally, only the data (Payload data) is arranged in the part corresponding to the other layer B (the right layer B) in the P2 symbol.

On the other hand, in a case where two P2 symbols are arranged, the fixed-length L1B signaling (L1-Basic) is arranged at the head of the part corresponding to the layer A in the first P2 symbol, and the variable-length L1D signaling (L1-Detail) is subsequently arranged.

Here, the variable-length L1D signaling is not within the part corresponding to the layer A in the first P2 symbol, and thus the rest of the L1D signaling is arranged in the part corresponding to the layer A in the second P2 symbol. Further, the data (Payload data) is arranged in the rest of the part corresponding to the layer A in the second P2 symbol.

Further, the variable-length L1D signaling (L1-Detail) is arranged at the head of the part corresponding to one layer B (the left layer B) and the data (Payload data) is subsequently arranged in the first P2 symbol. However, the L1D signaling includes only the information associated with the layers B. Additionally, only the data (Payload data) is arranged in the part corresponding to the other layer B (the right layer B) in the first P2 symbol.

In a case where a plurality of layers are arranged in frequency division multiplexing (FDM) in this way, the L1B signaling is arranged in the part corresponding to the layer A in the P2 symbol, and the L1D signaling is arranged in the rest of the part corresponding to the layer A. At this time, in a case where the L1D signaling is not within the part corresponding to the layer A in the first P2 symbol, the rest of the L1D signaling is arranged in the part corresponding to the layer A in the second P2 symbol. Further, the information associated with the layers B in the L1D signaling is arranged in a part corresponding to a layer B in the P2 symbol.

Additionally, FIG. 25 illustrates the case where one P2 symbol is arranged and the case where two P2 symbols are arranged, but it is basically assumed that one P2 symbol is arranged in many cases. That is, the information associated with the layers B in the L1D signaling is arranged in a part corresponding to a layer B in the P2 symbol so that the information indicating the L1D signaling arranged in the part corresponding to the layer A in the P2 symbol can be reduced. Thus, this is because one P2 symbol is arranged so that the region for arranging all the information indicating the L1D signaling therein can be secured.

Then in a case where the reception apparatus 30 acquires the L1 signaling from the two P2 symbols because it basically processes in units of symbol, the reception apparatus 30 needs to buffer and hold the earlier P2 symbol until it processes the later P2 symbol. On the other hand, in a case where the L1 signaling can be acquired from one P2 symbol as in the configuration illustrated in the upper part of FIG. 25, the P2 symbol does not need to be buffered and the L1 signaling can be rapidly acquired.

First Exemplary Configuration in LDM

Figure 26:
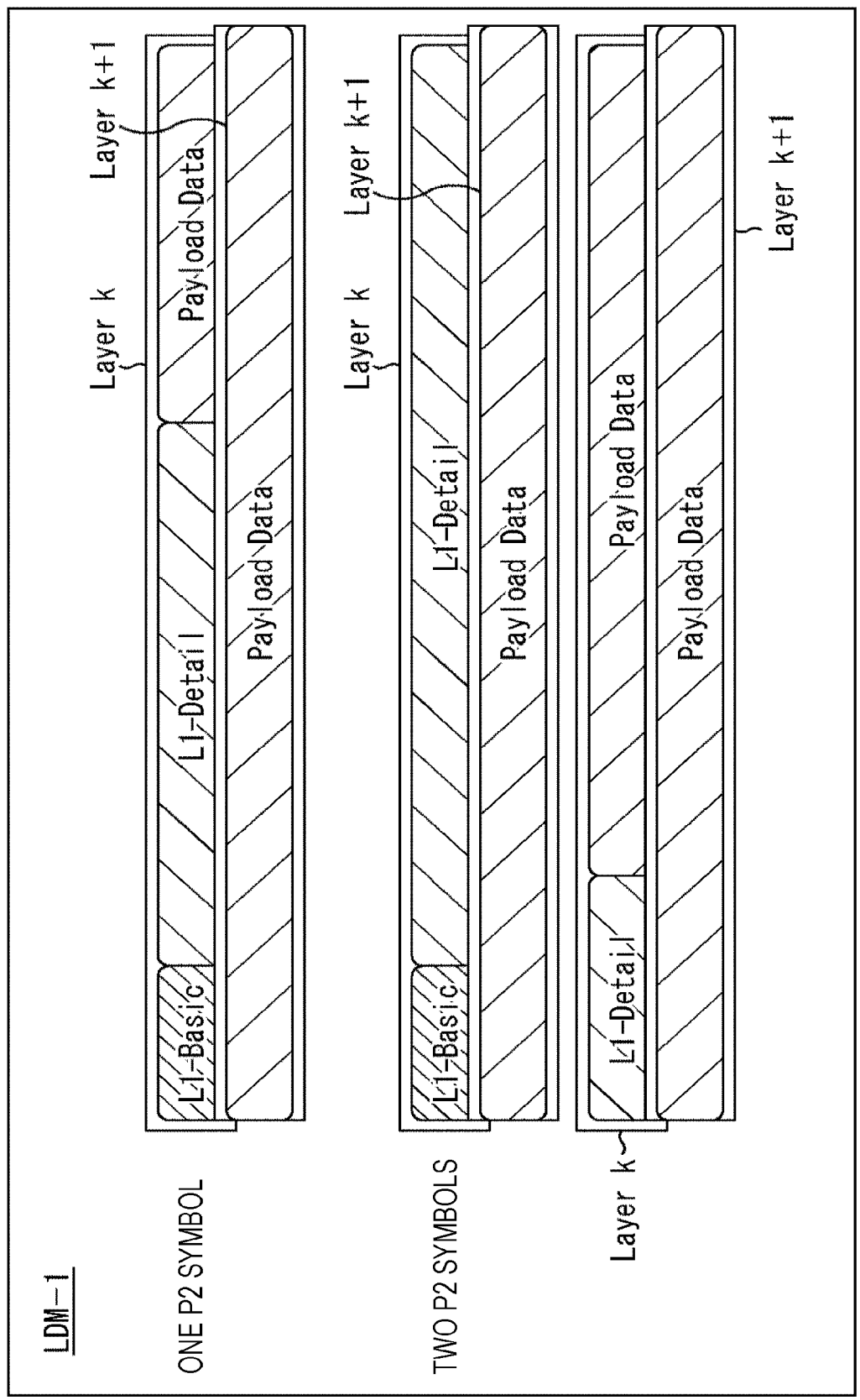
FIG. 26 is a diagram illustrating a first exemplary configuration of P2 symbols in layered division multiplexing (LDM).

FIG. 26 is a diagram illustrating a first exemplary configuration of P2 symbols in layered division multiplexing (LDM).

Here, FIG. 26 illustrates a case where one P2 symbol is arranged in one physical layer frame and a case where two P2 symbols are arranged therein when a layer k and a layer k+1 are configured in layered division multiplexing (LDM).

In a case where one P2 symbol is arranged, the fixed-length L1B signaling (L1-Basic) is arranged at the head of the P2 symbol in the layer k, and the variable-length L1D signaling (L1-Detail) is subsequently arranged. Further, the data (Payload data) is arranged in the rest of the P2 symbol in the layer k. Additionally, only the data (Payload data) is arranged in the P2 symbol in the layer k+1.

On the other hand, in a case where two P2 symbols are arranged, the fixed-length L1B signaling (L1-Basic) is arranged at the head of the first P2 symbol in the layer k, and the variable-length L1D signaling (L1-Detail) is subsequently arranged.

Here, the variable-length L1D signaling is not within the first P2 symbol in the layer k, and thus is arranged in the second P2 symbol. Further, the data (Payload data) is arranged in the rest of the second P2 symbol in the layer k.

Further, only the data (Payload data) is arranged in the first P2 symbol and the second P2 symbol in the layer k+1.

In a case where a plurality of layers are configured in layered division multiplexing (LDM) in this way, the L1B signaling is arranged in the P2 symbol in the layer k, and the L1D signaling is arranged in the rest of the P2 symbol in the layer k. At this time, in a case where the L1D signaling is not within the first P2 symbol in the layer k, the rest of the L1D signaling is arranged in the second P2 symbol.

Second Exemplary Configuration in LDM

Figure 27:
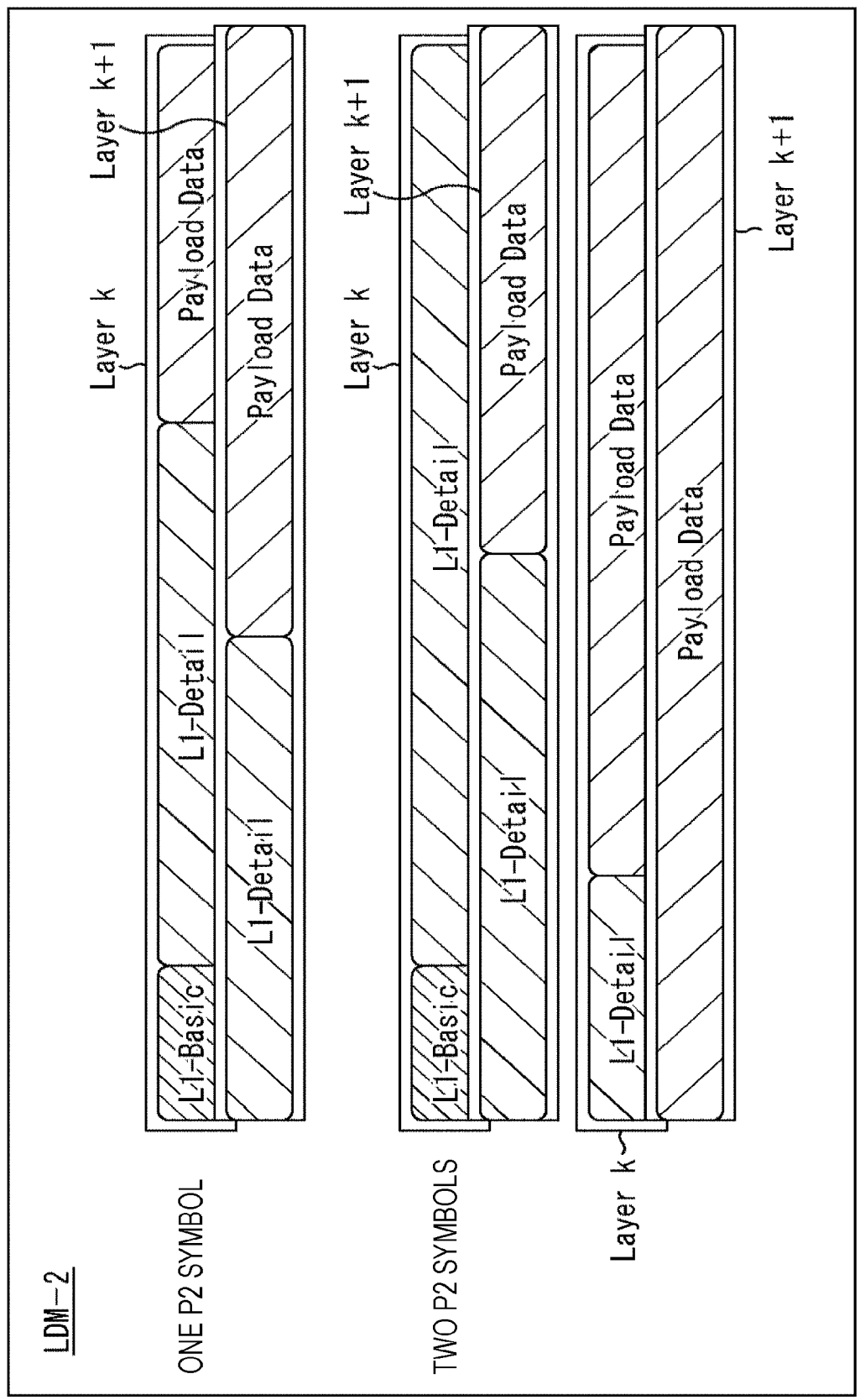
FIG. 27 is a diagram illustrating a second exemplary configuration of P2 symbols in layered division multiplexing (LDM).

FIG. 27 is a diagram illustrating a second exemplary configuration of P2 symbols in layered division multiplexing (LDM).

FIG. 27 illustrates a case where one P2 symbol is arranged in one physical layer frame and a case where two P2 symbols are arranged therein when a layer k and a layer k+1 are configured similarly as in FIG. 26.

In a case where one P2 symbol is arranged, the fixed-length L1B signaling (L1-Basic) is arranged at the head of the P2 symbol in the layer k, and the variable-length L1D signaling (L1-Detail) is subsequently arranged. Further, the data (Payload data) is arranged in the rest of the P2 symbol in the layer k.

Further, the variable-length LID signaling (L1-Detail) is arranged at the head of the P2 symbol in the layer k+1, and the data (Payload data) is subsequently arranged. However, the L1D signaling includes only the information associated with the layer k+1.

On the other hand, in a case where two P2 symbols are arranged, the fixed-length L1B signaling (L1-Basic) is arranged at the head of the first P2 symbol in the layer k, and the variable-length L1D signaling (L1-Detail) is subsequently arranged.

Here, the variable-length L1D signaling is not within the first P2 symbol in the layer k, and thus is arranged in the second P2 symbol. Further, the data (Payload data) is arranged in the rest of the second P2 symbol in the layer k.

Further, the variable-length LiD signaling (L1-Detail) is arranged at the head of the first P2 symbol and the data (Payload data) is subsequently arranged in the layer k+1.

However, the L1D signaling includes only the information associated with the layer k+1. Additionally, only the data (Payload data) is arranged in the second P2 symbol in the layer k+1.

In a case where a plurality of layers are configured in layered division multiplexing (LDM) in this way, the L1B signaling is arranged in the P2 symbol in the layer k, and the L1D signaling is arranged in the rest of the P2 symbol in the layer k. At this time, in a case where the L1D signaling is not within the first P2 symbol in the layer k, the rest of the L1D signaling is arranged in the second P2 symbol. Further, the information associated with the layer k+1 in the L1D signaling is arranged in the P2 symbol in the layer k+1.

The configurations of the physical layer frame according to the present technology have been described above.

4. First Solving Method

As described above, there is a problem at present in which a multiplexing system cannot be determined in a case where a plurality of multiplexing systems (FDM, TDM, and LDM) are realized in the same broadcasting system, but the problem is solved in the first solving method according to the present technology.

However, the first solving method includes a synchronization pattern solving method and a P1 signaling solving method, and thus the two methods will be described in this order.

(1) Synchronization Pattern Solving Method

The synchronization pattern solving method will be first described with reference to FIG. 28 to FIG. 36.

The synchronization pattern solving method is a method for determining a plurality of multiplexing systems (FDM, TDM, and LDM) by use of different synchronization patterns for a common frame synchronization symbol (FSS).

(Exemplary Synchronization Patterns)

FIG. 28 is a diagram illustrating exemplary synchronization patterns for the frame synchronization symbol (FSS).

FIG. 28 illustrates that a synchronization pattern of "0x019D" for the frame synchronization symbol (FSS) is used in a multiplexing system of frequency division multiplexing (FDM). Further, it illustrates that a synchronization pattern of "0x00ED" for the frame synchronization symbol (FSS) is used in a multiplexing system of time division multiplexing (TDM) and a synchronization pattern of "0x01E8" for the frame synchronization symbol (FSS) is used in a multiplexing system of layered division multiplexing (LDM) In other words, the synchronization patterns are multiplexing system determination information.

A synchronization pattern for the frame synchronization symbol (FSS) is different per multiplexing system in the physical layer frame, and thus the reception apparatus 30 can determine the multiplexing systems such as frequency division multiplexing (FDM), time division multiplexing (TDM), and layered division multiplexing (LDM) on the basis of the synchronization patterns ("0x019D", "0x00ED", and "0x01E8").

Further, the synchronization patterns for the frame synchronization symbol (FSS) are illustrated here assuming a Zadoff-Chu sequence root q of 137, but the value q may take other value such as q=400. In a case where the value q takes other value, however, synchronization patterns for the frame synchronization symbol (FSS) are different from the synchronization patterns illustrated in FIG. 28.

Additionally, the Zadoff-Chu sequence root q is described in Non-Patent Document 2 and the like.

The synchronization patterns for the frame synchronization symbol (FSS) are prepared for the multiplexing systems, respectively, in the synchronization pattern solving method in this way, and thus a large number of multiplexing systems can be coped with. Additionally, other multiplexing systems such as layered time division multiplexing (LDM_TDM) or layered frequency division multiplexing (LDM_FDM) may be employed. Further, the synchronization pattern solving method is advantageous in that the bits of the P1 symbol do not need to be used.

A configuration of the P1 signaling in the synchronization pattern solving method will be described below. Additionally, a configuration of the P1 signaling is different per multiplexing system, and the configurations of the P1 signaling in time division multiplexing (TDM), frequency division multiplexing (FDM), and layered division multiplexing (LDM) will be described below in this order.

(1a) Time Division Multiplexing (TDM)

(Examples of P1 Signaling)

FIG. 29 is a diagram illustrating exemplary syntaxes of the P1 signaling in time division multiplexing (TDM).

In FIG. 29, the P1 signaling includes P1_P2_waveform_structure, P1_eas_wake_up, P1_band_width, and P1_Reserved.

7-bit P1_P2_waveform_structure indicates a structure of P1 and P2 symbols. P1_P2_waveform_structure includes combination information of FFT size, guard interval (GI), forward error correction (FEC) type, and pilot pattern (SPP: SP pattern).

1-bit P1_eas_wake_up indicates an emergency alarm flag.

2-bit P1_band_width indicates a band width of a broadcasting signal.

2-bit P1_Reserved indicates a future extension region.

Additionally, in a case where a format of unsigned integer most significant bit first (uimsbf) is designated, the designation indicates that bit operation is performed and handled as an integer. The format is similar in other syntaxes described below (Examples of P1_P2_waveform_structure)

FIG. 30 is a diagram illustrating examples of P1_P2_waveform_structure of FIG. 29.

In a case where a value of "0000000" is designated for P1_P2_waveform_structure, FFT size=8K, GI=256, FEC type=1, and pilot pattern=16_2 are assumed.

In a case where a value of "0000001" is designated for P1_P2_waveform_structure, FFT size=8K, GI=256, FEC type=1, and pilot pattern=16_4 are assumed.

In a case where a value of "0000010" is designated for P1_P2_waveform_structure, FFT size=8K, GI=512, FEC type=1, and pilot pattern=12_2 are assumed.

Additionally, all the values of P1_P2_waveform_structure are not indicated in the examples of FIG. 30, but the combinations of FFT size, GI, FEC type, and pilot pattern are similarly assigned to other values of P1_P2_waveform_structure. For example, in a case where a value of 1000010" is designated for P1_P2_waveform_structure, FFT size=32K, GI=2048, FEC type=2, and pilot pattern=6_2 are assumed.

However, all the combinations for P1_P2_waveform_structure do not need to be indicated, and only the combinations used for actual operation may be defined. For example, 34 combinations of FFT size, GI, and pilot pattern are assumed in the examples of FIG. 30 as described below, but do not need to be combined with all the FEC types.

Further, almost one FEC type is employed for FFT size, GI, and pilot pattern. However, both FEC types of FEC type 1 (FEC type=1) and FEC type 2 (FEC type=2) may be prepared for a small number of parameters.

(1b) Frequency Division Multiplexing (FDM)
(Examples of P1 Signaling)

FIG. 31 is a diagram illustrating exemplary syntaxes of the P1 signaling in frequency division multiplexing (FDM).

In FIG. 31, the P1 signaling includes P1_P2_waveform_structure, P1_eas_wake_up, P1_band_width, and P1_Reserved.

7-bit P1_P2_waveform_structure includes combination information of FFT size, GI, FEC type, pilot pattern, and number of segments of layer A as a structure of P1 and P2 symbols. Additionally, the layer A includes the center segment as illustrated in FIG. 7 or FIG. 8.

Additionally, P1_eas_wake_up, P1_band_width, and P1_Reserved in FIG. 31 are similar to the contents illustrated in FIG. 29, and thus the description thereof will be omitted.

(Examples of P1_P2_Waveform_Structure)

FIG. 32 is a diagram illustrating examples of P1_P2_waveform_structure of FIG. 31.

In a case where a value of "0000000" is designated for P1_P2_waveform_structure, FFT size=8K, GI=256, FEC type=1, pilot pattern=16_2, and number of segments of layer A=9 are assumed.

In a case where a value of "0000001" is designated for P1_P2_waveform_structure, FFT size=8K, GI=256, FEC type=1, pilot pattern=16_2, and number of segments of layer A=7 are assumed.

In a case where a value of 0000010" is designated for P1_P2_waveform_structure, FFT size=8K, GI=256, FEC type=1, pilot pattern=16_2, and number of segments of layer A=3 are assumed.

In a case where a value of "0000011" is designated for P1_P2_waveform_structure, FFT size=8K, GI=256, FEC type=1, pilot pattern=16_2, and number of segments of layer A=1 are assumed.

In a case where a value of "0000100" is designated for P1_P2_waveform_structure, FFT size=8K, GI=256, FEC type=1, pilot pattern=16_4, and number of segments of layer A=9 are assumed.

Additionally, all the values of P1_P2_waveform_structure are not indicated in the examples of FIG. 32, but the combinations of FFT size, GI, FEC type, pilot pattern, and number of segments of layer A are similarly assigned to other values of P1_P2_waveform_structure.

For example, in a case where a value of "0010010" is designated for P1_P2_waveform_structure, FFT size=16K, GI=1024, FEC type=1, pilot pattern=12_2, and number of segments of layer A=3 are assumed. Further, for example, in a case where a value of "0010011" is designated for P1_P2_waveform_structure, FFT size=16K, GI=1024, FEC type=1, pilot pattern=12_2, and number of segments of layer A=9 are assumed.

Further, for example, in a case where a value of "1000010" is designated for P1_P2_waveform_structure, FFT size=32K, GI=2048, FEC type=2, pilot pattern=6_2, and number of segments of layer A=9 are assumed.

However, all the combinations for P1_P2_waveform_structure do not need to be indicated, and only the combinations used for actual operation may be defined. For example, 34 combinations of FFT size, GI, and pilot pattern are assumed in the examples of FIG. 32 as described below, but do not need to be combined with all the FEC types and all the numbers of segments of layer A. For example, if the numbers of segments of layer A of 9 and 3 are mainly employed, only the combinations for nine segments and three segments may be defined.

(1c) Layered Division Multiplexing (LDM)

FIG. 33 is a diagram illustrating exemplary syntaxes of the P1 signaling in layered division multiplexing (LDM).

In FIG. 33, the P1 signaling includes P1_P2_waveform_structure, P1_eas_wake_up, P1_band_width, and P1_Reserved.

7-bit P1_P2_waveform_structure includes combination information of FFT size, GI, FEC type, and pilot pattern as a structure of P1 and P2 symbols.

Additionally, P1_eas_wake_up, P1_band_width, and P1_Reserved in FIG. 33 are similar to the contents illustrated in FIG. 29, and thus the description thereof will be omitted.

(Examples of P1_P2_Waveform_Structure)

FIG. 34 is a diagram illustrating examples of P1_P2_waveform_structure of FIG. 33

In a case where a value of "0000000" is designated for P1_P2_waveform_structure, FFT size=8K, GI=256, FEC type=1, and pilot pattern=16_2 are assumed.

In a case where a value of "0000001" is designated for P1_P2_waveform_structure, FFT size=8K, GI=256, FEC type=1, and pilot pattern=16_4 are assumed.

In a case where a value of "0000010" is designated for P1_P2_waveform_structure, FFT size=8K, GI=512, FEC type=1, and pilot pattern=12_2 are assumed.

Additionally, all the values of P1_P2_waveform_structure are not indicated in the examples of FIG. 34, but the combinations of FFT size, GI, FEC type, and pilot pattern are similarly assigned to other values of P1_P2_waveform_structure. For example, in a case where a value of "1000010" is designated for P1_P2_waveform_structure, FFT size=32K, GI=2048, FEC type=2, and pilot pattern=6_2 are assumed.

However, all the combinations do not need to be indicated for P1_P2_waveform_structure, and only the combinations used for actual operation may be defined. For example, 34 combinations of FFT size, GI, and pilot pattern are assumed in the examples of FIG. 34 as described below, but do not need to be combined for all the FEC types.

Further, almost one FEC type may be assumed for FFT size, GI, and pilot pattern. However, both FEC types of FEC type 1 (FEC type=1) and FEC type 2 (FEC type=2) can be prepared for a small number of parameters.

(1d) Combinations of FFT, GI, and PP, and Examples of FEC Type
(Exemplary Combinations of FFT, GI, and PP)

Combinations of FFT size, GI, and pilot pattern for P1_P2_waveform_structure will be described herein in detail.

FIG. 35 is a diagram illustrating exemplary combinations of FFT size and GI.

FIG. 35 indicates the numbers of GI samples at FFT size of 8K, 16K, and 32K and GI of 1/128, 1/64, 1/32, 1/16, 1/8, and 1/4. That is, the numbers of GI samples are 256, 512, 1024, and 2048.

FIG. 36 is a diagram illustrating exemplary combinations of FFT size, GI, and pilot pattern.

In FIG. 36, pilot patterns corresponding to FFT sizes of 8K, 16K, and 32K are associated with GI pattern depending on the number of GI samples.

That is, seven pilot patterns of SP16_2 and SP16_4 for 8K FFT, SP32_2, SP32_4, SP16_2, and SP16_4 for 16K FFT, and SP32_2 for 32K FFT correspond to GI_256. Further, nine pilot patterns of SP12_2, SP12_4, SP6_2, and SP6_4 for 8KFFT, SP24_2, SP24_4, SP12_2, and SP12_4 for 16K FFT, and SP24_2 for 32K FFT correspond to GI3_512.

Further, 10 pilot patterns of SP6_2, SP6_4, SP3_2, and SP3_4 for 8K FFT, SP12_2, SP12_4, SP6_2, and SP6_4 for 16K FFT, and SP24_2 and SP12_2 for 32K FFT correspond to GI5_1024.

Further, eight pilot patterns of SP3_2 and SP3_4 for 8K FFT, SP6_2, SP6_4, SP3_2, and SP3_4 for 16K FFT, and SP12_2 and SP6_2 for 32K FFT correspond to GI7_2048.

As described above, a total of 34 combinations of FFT size, GI, and pilot pattern are assumed as illustrated in FIG. 35 and FIG. 36.

(Examples of FEC type) Further, FEC types of FEC type 1 (FEC type=1) and FEC type 2 (FEC type=2) can be employed.

FEC type 1 is very robust FEC. A modulation system of QPSK+CR=3/15 can be used here, for example. Additionally, FEC type 1 corresponds to "L1-BasicMode 2" in ATSC3.0. Further, required carrier to noise ratio (C/N) is assumed at around −2.0 dB.

FEC type 2 is used for efficiency first. A modulation system of 64QAM+CR=3/15 can be used here, for example. Additionally, FEC type 2 corresponds to "L1-Basic Mode 5" in ATSC3.0. Further, required C/N is assumed at around 10 dB.

Additionally, FEC type 1 and FEC type 2 are described as exemplary FEC types, but other FEC types may be employed.

(2) P1 Signaling Solving Method

The P1 signaling solving method will be described below with reference to FIG. 37 to FIG. 42.

The P1 signaling solving method is a method for determining a plurality of multiplexing systems (FDM, TDM, and LDM) by use of the same synchronization pattern for a common frame synchronization symbol (FSS), and the P1 signaling information of P1 symbol.

That is, the P1 signaling solving method does not use different synchronization patterns for frame synchronization symbols (FSS) but completely communize the frame synchronization symbols (FSS) by use of the same synchronization pattern unlike the synchronization pattern solving method.

On the other hand, any of frequency division multiplexing (FDM), time division multiplexing (TDM), and layered division multiplexing (LDM) is clearly described as determination information for determining a multiplexing system in the P1 signaling. The determination information can be defined such that "00" indicates frequency division multiplexing (FDM), "01" indicates time division multiplexing (TDM), and "10" indicates layered division multiplexing (LDM).

The reception apparatus 30 can determine a multiplexing system such as frequency division multiplexing (FDM), time division multiplexing (TDM), or layered division multiplexing (LDM) on the basis of the P1 signaling determination information ("00", "01", and "10").

In this way, the P1 signaling solving method determines a multiplexing system on the basis of the P1 signaling determination information, thereby reducing a search time.

A configuration of the P1 signaling in the P1 signaling solving method will be described below. Additionally, a configuration of the P1 signaling is different per multiplexing system, and thus the configurations of the P1 signaling in time division multiplexing (TDM), frequency division multiplexing (FDM), and layered division multiplexing (LDM) will be described below in this order.

(2a) Time Division Multiplexing (TDM)
(Examples of P1 Signaling)

FIG. 37 is a diagram illustrating exemplary syntaxes of the P1 signaling in time division multiplexing (TDM).

In FIG. 37, the P1 signaling includes P1_P2_waveform_structure, P1_eas_wake_up, P1_band_width, and P1_Frame_Multiplexing.

7-bit P1_P2_waveform_structure includes combination information of FFT size, GI, FEC type, and pilot pattern as a structure of P1 and P2 symbols. Additionally, the combination information illustrated in FIG. 30 can be defined for P1_P2_waveform_structure, for example.

1-bit P1_eas_wake_up indicates an emergency alarm flag.

2-bit P1_band_width indicates a band width of a broadcasting signal.

2-bit P1_Frame_Multiplexing indicates information for determining a multiplexing system such as frequency division multiplexing (FDM), time division multiplexing (TDM), or layered division multiplexing (LDM).

(Examples of P1_Frame_Multiplexing)

FIG. 38 is a diagram illustrating examples of P1_Frame_Multiplexing of FIG. 37.

In a case where a value of "00" is designated for P1_Frame_Multiplexing, the designation means a multiplexing system of frequency division multiplexing (FDM).

In a case where a value of "01" is designated for P1_Frame_Multiplexing, the designation means a multiplexing system of time division multiplexing (TDM).

In a case where a value of "10" is designated for P1_Frame_Multiplexing, the designation means a multiplexing system of layered division multiplexing (LDM).

Additionally, a value of "11" for P1_Frame_Multiplexing means a future extension region.

(2b) Frequency Division Multiplexing (FDM)
(Examples of P1 Signaling)

FIG. 39 is a diagram illustrating exemplary syntaxes of the P1 signaling in frequency division multiplexing (FDM).

In FIG. 39, the P1 signaling includes P1_P2_waveform_structure, P1_eas_wake_up, P1_band_width, and P1_Frame_Multiplexing.

7-bit P1_P2_waveform_structure includes combination information of FFT size, GI, FEC type, pilot pattern, total number of segments, and number of segments of layer A as a structure of P1 and P2 symbols. Additionally, the combination information illustrated in FIG. 32 can be defined for P1_P2_waveform_structure, for example.

Additionally, P1_eas_wake_up, P1_band_width, and P1_Frame_Multiplexing in FIG. 39 are similar to the contents illustrated in FIG. 37. That is, P1_Frame_Multiplexing indicates information for determining a multiplexing system.

(Examples of P1_Frame_Multiplexing)

FIG. 40 is a diagram illustrating examples of P1_Frame_Multiplexing of FIG. 39.

Similarly as in FIG. 38, "00" is designated for P1_Frame_Multiplexing in frequency division multiplexing (FDM), "01" is designated in time division multiplexing (TDM), and "10" is designated in layered division multiplexing (LDM) in FIG. 40.

(2c) Layered Division Multiplexing (LDM)
(Examples of P1 Signaling)

FIG. 41 is a diagram illustrating exemplary syntaxes of the P1 signaling in layered division multiplexing (LDM)

In FIG. 41, the P1 signaling includes P1_P2_waveform_structure, P1_eas_wake_up, P1_band_width, and P1_Frame_Multiplexing.

7-bit P1_P2_waveform_structure includes combination information of FFT size, GI, FEC type, and pilot pattern as a structure of P1 and P2 symbols. Additionally, the combination information illustrated in FIG. 34 can be defined for P1_P2_waveform_structure, for example.

Additionally, P1_eas_wake_up, P1_band_width, and P1_Frame_Multiplexing in FIG. 41 are similar to the contents illustrated in FIG. 37. That is, P1_Frame_Multiplexing indicates information for determining a multiplexing system.

(Examples of P1_Frame_Multiplexing)

FIG. 42 is a diagram illustrating examples of P1_Frame_Multiplexing of FIG. 41.

Similarly as in FIG. 38, "00" is designated for P1_Frame_Multiplexing in frequency division multiplexing (FDM), "01" is designated in time division multiplexing (TDM), and "10" is designated in layered division multiplexing (LDM) in FIG. 42.

The first solving method has been described above.

5. Configuration of P2 Signaling

The L1B signaling (L1-Basic) and the L1D signaling (L1-Detail) for the P2 signaling of P2 symbol will be described below with reference to FIG. 43 to FIG. 59.

The following differences lie between the L1B signaling and the L1D signaling, for example. That is, a difference is that the L1B signaling has a fixed length while the L1D signaling has a variable length. Thus, the L1B signaling is different from the L1D signaling in their sizes. The size of the L1D signaling is generally larger than the size of the L1B signaling.

Further, the L1B signaling and the L1D signaling are read in this order, and thus the L1B signaling is earlier read than the L1D signaling. Further, the L1B signaling is different from the L1D signaling in that it can transmit in a more robust manner (robustness).

(1) Configuration of L1B Signaling

Configurations of the L1B signaling will be first described with reference to FIG. 43 to FIG. 47. Additionally, a configuration of the L1B signaling is different per multiplexing system, and thus the configurations of the L1B signaling in time division multiplexing (TDM), frequency division multiplexing (FDM), and layered division multiplexing (LDM) will be described below in this order.

(1a) Time Division Multiplexing (TDM)
(Examples of L1B Signaling)

FIG. 43 is a diagram illustrating exemplary syntaxes of the L1B signaling in time division multiplexing (TDM).

In FIG. 43, the L1B signaling includes L1B_version, L1B_eas-wake_up, L1B_lls_flag, L1B_time_info_flag, L1B_L1_Detail_size_bytes, L1B_L1_Detail_fec_type, L1B_reserved, and L1B_crc.

3-bit L1B_version indicates a version of the L1B signaling.

1-bit L1B_eas-wake_up indicates an emergency alarm flag.

1-bit L1B_lls_flag indicates a flag indicating the presence of upper layer signaling. For example, in a case where low level signaling (LLS) is defined as upper layer signaling, the flag indicates whether or not LLS is present.

1-bit L1B_time_info_flag indicates a flag of time information.

8-bit L1B_L1_Detail_size_bytes indicates a size of the L1D signaling.

2-bit L1B_L1_Detail_fec_type indicates a FEC type of the L1D signaling.

80-bit L1B_reserved indicates a future extension region.

32-bit L1B_crc indicates a parity of error detection.

(1b) Frequency Division Multiplexing (FDM)
(Examples of L1B Signaling)

FIG. 44 is a diagram illustrating exemplary syntaxes of the L1B signaling in frequency division multiplexing (FDM)

In FIG. 44, the L1B signaling includes L1B_version, L1B_eas-wake_up, L1B_lls_flag, L1B_time_info_flag, L1B_num_layers, L1B_L1_Detail_size_bytes, L1B_L1_Detail_fec_type, L1B_reserved, and L1B_crc.

L1B_version, L1B_eas-wake_up, L1B_lls_flag, L1B_time_info_flag, L1B_L1_Detail_size_bytes, L1B_L1_Detail_fec_type, L1B_reserved, and L1B_crc in FIG. 44 are similar to the contents illustrated in FIG. 43. That is, the L1B signaling of FIG. 44 is different from that of FIG. 43 in that it is added with L1B_num_layers.

2-bit L1B_num_layers indicates the number of layers (FDM layers).

Additionally, the number of bits of L1B_reserved is 78 in FIG. 44.

(1c) Layered Division Multiplexing (LDM)
(Examples of L1B Signaling)

FIG. 45 is a diagram illustrating exemplary syntaxes of the L1B signaling in layered division multiplexing (LDM)

In FIG. 45, the L1B signaling includes L1B_version, L1B_eas-wake_up, L1B_lls_flag, L1B_time_info_flag, L1B_num_layers, L1B_L1_Detail_size_bytes, L1B_L1_Detail_fec_type, L1B_reserved, and L1B_crc.

L1B_version, L1B_eas-wake_up, L1B_lls_flag, L1B_time_info_flag, L1B_L1_Detail_size_bytes, L1B_L1_Detail_fec_type, L1B_reserved, and L1B_crc in FIG. 45 are similar to the contents illustrated in FIG. 43. That is, the L1B signaling of FIG. 45 is different from that of FIG. 43 in that it is added with L1B_num_layers.

2-bit L1B_num_layers indicates the number of layers (LDM layers).

(1d) Examples Common in TDM, FDM, and LDM

It is clear herein from the exemplary syntaxes of the P1 signaling and the L1B signaling that the P1 signaling in TDM, FDM, and LDM illustrated in FIG. 37 to FIG. 42 and the L1B signaling in TDM, FDM, and LDM illustrated in FIG. 43 to FIG. 45 can be almost similarly configured in each multiplexing system of TDM, FDM, and LDM.

That is, the information associated with layers is not necessarily essential in time division multiplexing (TDM), but if the information associated with layers can be added to the signaling in time division multiplexing (TDM), it can be shared in frequency division multiplexing (FDM) and layered division multiplexing (LDM). Additionally, if subframes are not used in time division multiplexing (TDM), num_layers can be used as it is.

(Examples of P1 Signaling)

FIG. 46 is a diagram illustrating exemplary syntaxes of the P1 signaling common in TDM, FDM, and LDM.

In FIG. 46, the P1 signaling includes P1_P2_waveform_structure, P1_eas_wake_up, P1_band_width, and P1_Frame_Multiplexing.

7-bit P1_P2_waveform_structure has a different meaning per multiplexing system such as frequency division multiplexing (FDM), time division multiplexing (TDM), or layered division multiplexing (LDM).

That is, P1_P2_waveform_structure includes combination information of FFT size, GI, FEC type, and pilot pattern in time division multiplexing (TDM).

Further, P1_P2_waveform_structure includes combination information of FFT size, GI, FEC type, pilot pattern, total number of segments, and number of segments of layer A in frequency division multiplexing (FDM). Further, P1_P2_waveform_structure includes combination information of FFT size, GI, FEC type, and pilot pattern in layered division multiplexing (LDM).

The multiplexing systems (FDM, TDM, and LDM) can be determined by a value of P1_Frame_Multiplexing. Additionally, the values of P1_Frame_Multiplexing are assumed to be similar to those illustrated in FIG. 38 and the like.

(Examples of L1B Signaling)

FIG. 47 is a diagram illustrating exemplary syntaxes of the L1B signaling common in TDM, FDM, and LDM.

In FIG. 47, the L1B signaling includes L1B_version, L1B_eas-wake_up, L1B_lls_flag, L1B_time_info_flag, L1B_num_layers, L1B_L1_Detail_size_bytes, L1B_L1_Detail_fec_type, L1B_reserved, and L1B_crc.

L1B_version, L1B_eas-wake_up, L1B_lls_flag, L1B_time_info_flag, L1B_L1_Detail_size_bytes, L1B_L1_Detail_fec_type, L1B_reserved, and L1B_crc in FIG. 47 are similar to the contents illustrated in FIG. 43. That is, the L1B signaling of FIG. 47 is different from that of FIG. 43 in that it is added with L1B_num_layers.

2-bit L1B_num_layers indicates the number of layers.

However, L1B_num_layers indicates the number of layers (FDM layers) in frequency division multiplexing (FDM). Further, LIB_num_layers indicates the number of layers (LDM layers) in layered division multiplexing (LDM). Additionally, L1B_num_layers is not necessarily essential information in time division multiplexing (TDM), and is not used when it is not required.

(2) Configurations of L1D Signaling

Configurations of the L1D signaling will be described below with reference to FIG. 48 to FIG. 59. Additionally, a configuration of the L1D signaling is different per multiplexing system, and the configurations of the L1D signaling in time division multiplexing (TDM), frequency division multiplexing (FDM), and layered division multiplexing (LDM) will be described below in this order.

(2a) Time Division Multiplexing (TDM)

(First Example of L1D Signaling)

FIG. 48 is a diagram illustrating a first example of syntaxes of the L1D signaling in time division multiplexing (TDM).

The L1D signaling of FIG. 48 corresponds to the P2 signaling of the P2 symbol in the physical layer frame corresponding to the subframes illustrated in FIG. 6.

4-bit L1D_version indicates a version of the L1D signaling.

In a case where L1B_time_info_flag of the L1B signaling indicates the presence of time information, 64-bit L1D_ntp_time is described. L1D_ntp_time indicates time information.

Here, in a case where MPEG media transport (MMT) is used as an upper layer transport protocol, for example, time information in a network time protocol (NTP) format can be used for the time information. Additionally, a format of the time information is not limited to the NTP format, and may use other format such as precision time protocol (PTP).

In a case where P1_eas_wake_up of the P1 signaling indicates the presence of an emergency alarm, 8-bit L1B_eas_code is described. L1B_eas_code indicates emergency alarm code information.

2-bit L1D_num_subframes indicates the number of subframes. L1D_fft_size, L1D_guard_interval, L1D_scattered_pilot_pattern, L1D_pilot_pattern_boost, L1D_num_ofdm_symbols, L1D_bs_first, L1D_bs_last, and L1D_fcs_null_cells are described in the subframe loop depending on the number indicated by L1D_num_subframes.

The parameters can be designated per subframe, and thus the modulation parameters can be changed per subframe.

2-bit L1D_fft_size among the parameters, for example, indicates a FFT size of a subframe of interest. Further, 2-bit L1D_guard_interval and 5-bit L1D_scattered_pilot_pattern indicate a guard interval and a pilot pattern of the subframe of interest, respectively, for example.

2-bit L1D_num_layers_plp indicates the number of layers of physical layer pipe (PLP). L1D_plp_id, L1D_plp_lls_flag, L1D_plp_start, L1D_plp_size, L1D_plp_mod, L1D_plp_cod, L1D_plp_type, L1D_plp_TI_num_ti_blocks, and L1D_plp_TI_num_fec_blocks_max are described in the PLP loop depending on the number indicated by L1D_num_layers_plp.

The parameters can be designated per PLP of each subframe, and thus the modulation parameters can be changed per PLP in a subframe.

4-bit L1D_plp_id among the parameters, for example, indicates the ID of PLP of interest. Further, 4-bit L1D_plp_mod, 4-bit L1D_plp_cod, and 1-bit L1D_plp_type indicate a modulation system, an encoding rate, and a type of the PLP of interest, respectively, for example.

L1D_reserved and L1D_crc are described after the PLP loop and the subframe loop. L1D_reserved indicates a future extension region. 32-bit L1D_crc indicates a parity of error detection.

(Second Example of L1D Signaling)

FIG. 49 is a diagram illustrating a second example of syntaxes of the L1D signaling in time division multiplexing (TDM).

The L1D signaling of FIG. 49 corresponds to the P2 signaling of the P2 symbol in the physical layer frame not for a subframe illustrated in FIG. 5. Thus, the L1D signaling of FIG. 49 is different from the L1D signaling of FIG. 48 in that the description of the subframe loop is deleted.

That is, the following parameters are described in a layer loop depending on the number indicated by L1B_num_layers of the L1B signaling in the L1D signaling of FIG. 49.

That is, L1D_fft_size, L1D_guard_interval, L1D_scattered_pilot_pattern, L1D_pilot_pattern_boost, L1D_num_ofdm_symbols, L1D_bs_first, L1D_bs_last, L1D_fcs_null_cells, L1D_plp_id, L1D_plp_lls_flag, L1D_plp_start, L1D_plp_size, L1D_plp_mod, L1D_plp_cod, L1D_plp_type, L1D_plp_TI_num_ti_blocks, and L1D_plp_TI_num_fec_blocks_max are descried in the layer loop.

The parameters are the same as the parameters of the L1D signaling of FIG. 48, and thus the description thereof will be omitted herein.

(2b) Frequency Division Multiplexing (FDM)
(First Example of L1D Signaling)

The first example assumes that single L1D signaling includes information specific to each layer (FDM layer) of the layer A and the layer B and information common in the layers (FDM layers) of the layer A and the layer B.

FIG. 50 is a diagram illustrating the first example of syntaxes of the L1D signaling in frequency division multiplexing (FDM).

L1D_version, L1D_ntp_time, L1B_eas_code, L1D_num_ofdm_symbols, L1D_bs_present, L1D_bs_null_cells, L1D_scattered_pilot_pattern, L1D_scattered_pilot_boost, and L1D_num_layers are described as information common in the layer A and the layer B in the L1D signaling of FIG. 50.

Further, the following parameters are described in the layer loop depending on the number indicated by L1B_num_layers of the L1B signaling in the L1D signaling of FIG. 50.

That is, L1D_numsegs, L1D_layer_id, L1D_plp_lls_flag, L1D_plp_mod, L1D_plp_cod, L1D_plp_TI_num_ti_blocks, and L1D_plp_TI_num_fec_blocks_max are described in the layer loop. The parameters in the layer loop are then described as information specific to each layer of the layer A and the layer B. Additionally, 6-bit L1D_numsegs indicates the number of segments of each layer.

Both the information specific to each of the layer A and the layer B and the information common in the layer A and the layer B are described in the L1D signaling of FIG. 50 in this way.

(Second Example of L1D Signaling)

In the second example, L1D signaling is prepared per layer (FDM layer) in the layer A and the layer B, and the information specific to each layer is described. At this time, the information common in the layer A and the layer B is included in the L1D signaling in any layer, and is not included in the L1D signaling in the other layer. That is, in the second example, the information common in the layer A and the layer B is included only in the L1D signaling of the layer A.

FIG. 51 is a diagram illustrating the second example (layer A) of syntaxes of the L1D signaling in frequency division multiplexing (FDM).

The information specific to the layer A is described in the L1D signaling of FIG. 51, and thus the description of the layer loop is deleted unlike the L1D signaling of FIG. 50, and the parameters not for all the layers but for the layer A are described.

The information specific to the layer A is described in L1D_numsegs, L1D_layer_id, L1D_plp_lls_flag, L1D_plp_mod, L1D_plp_cod, L1D_plp_TI_num_ti_blocks, and L1D_plp_TI_num_fec_blocks_max in the L1D signaling of FIG. 51.

Further, the information common in the layer A and the layer B is described in the L1D signaling of FIG. 51. That is, the information common in the layer A and the layer B such as L1D_version, L1D_ntp_time, L1B_eas_code, L1D_num_ofdm_symbols, L1D_bs_present, L1D_bs_null_cells, L1D_scattered_pilot_pattern, L1D_scattered_pilot_boost, and L1D_num_layers is described in the L1D signaling of FIG. 51.

Both the information specific to the layer A and the information common in the layer A and the layer B are described in the L1D signaling of FIG. 51 in this way.

FIG. 52 is a diagram illustrating the second example (layer B) of syntaxes of the L1D signaling in frequency division multiplexing (FDM).

The information specific to the layer B is described in L1D_numsegs, L1D_layer_id, L1D_plp_lls_flag, L1D_plp_mod, L1D_plp_cod, L1D_plp_TI_num_ti_blocks, and L1D_plp_TI_num_fec_blocks_max in the L1D signaling of FIG. 52.

Additionally, the information common in the layer A and the layer B is described in the L1D signaling (FIG. 51) of the layer A as described above, and thus does not need to be described in the L1D signaling (FIG. 52) of the layer B.

Only the information specific to the layer B is described in the L1D signaling of FIG. 52 in this way.

(Third Example of L1D Signaling)

In the third example, L1D signaling is prepared for each (FDM layer) of the layer A and the layer B, and describes information specific to each layer therein. At this time, the information common in the layer A, the layer B, and the like is included in the L1D signaling of all the layers. That is, the information common in the layer A and the layer B is included in both the L1D signaling of the layer A and the L1D signaling of the layer B in the third example.

FIG. 53 is a diagram illustrating the third example (layer A) of syntaxes of the L1D signaling in frequency division multiplexing (FDM).

The information specific to the layer A is described in L1D_numsegs, L1D_layer_id, L1D_plp_lls_flag, L1D_plp_mod, L1D_plp_cod, L1D_plp_TI_num_ti_blocks, and L1D_plp_TI_num_fec_blocks_max in the L1D signaling of FIG. 53.

Further, the information common in the layer A and the layer B such as L1D_version, L1D_ntp_time, L1B_eas_code, L1D_num_ofdm_symbols, L1D_bs_present, L1D_bs_null_cells, L1D_scattered_pilot_pattern, L1D_scattered_pilot_boost, and L1D_num_layers is described in the L1D signaling of FIG. 53.

Both the information specific to the layer A and the information common in the layer A and the layer B are described in the L1D signaling of FIG. 53 in this way.

FIG. 54 is a diagram illustrating the third example (layer B) of syntaxes of the L1D signaling in frequency division multiplexing (FDM).

The information specific to the layer B is described in L1D_numsegs, L1D_layer_id, L1D_plp_lls_flag, L1D_plp_mod, L1D_plp_cod, L1D_plp_TI_num_ti_blocks, and L1D_plp_TI_num_fec_blocks_max in the L1D signaling of FIG. 54.

Further, the information common in the layer A and the layer B such as L1D_version, L1D_ntp_time, L1B_eas_code, L1D_num_ofdm_symbols, L1D_bs_present, L1D_bs_null_cells, L1D_scattered_pilot_pattern, L1D_scattered_pilot_boost, and L1D_num_layers is described in the L1D signaling of FIG. 54.

Both the information specific to the layer B and the information common in the layer A and the layer B are described in the L1D signaling of FIG. 54 in this way.

(2c) Layered division multiplexing (LDM)
(First Example of L1D Signaling)

In the first example, single L1D signaling includes information specific to each (LDM layer) of a layer k and a layer k+1 and information common in layers (LDM layers) of the layer k and the layer k+1.

FIG. 55 is a diagram illustrating the first example of syntaxes of the LID signaling in layered division multiplexing (LDM).

The information common in the layer k and the layer k+1 such as L1D_version, L1D_ntp_time, L1B_eas_code, L1D_num_ofdm_symbols, L1D_bs_present, L1D_bs_null_cells, L1D_scattered_pilot_pattern, L1D_scattered_pilot_boost, and L1D_num_layers is described in the L1D signaling of FIG. 55.

Further, the following parameters are described in the layer loop depending on the number indicated by L1B_num_layers of the L1B signaling in the L1D signaling of FIG. 55.

That is, L1D_layer_id, L1D_plp_lls_flag, L1D_plp_mod, L1D_plp_cod, L1D_plp_TI_num_ti_blocks, and L1D_plp_TI_num_fec_blocks_max are described in the layer loop.

The parameters in the layer loop are then described as information specific to each of the layer k and the layer k+1.

Both the information specific to each of the layer k and the layer k+1 and the information common in the layer k and the layer k+1 are described in the L1D signaling of FIG. 55 in this way.

(Second Example of L1D Signaling)

In the second example, L1D signaling is prepared for each (LDM layer) of the layer k and the layer k+1, and describes information specific to each layer therein. At this time, the information common in the layer k and the layer k+1 is included in the L1D signaling of any layer, and is not included in the L1D signaling of the other layer. That is, the information common in the layer k and the layer k+1 is included only in the L1D signaling of the layer k in the second example.

FIG. 56 is a diagram illustrating the second example (layer k) of syntaxes of the L1D signaling in layered division multiplexing (LDM).

The information specific to the layer k is described in the L1D signaling of FIG. 56, and thus the description of the layer loop is deleted unlike the L1D signaling of FIG. 55, and the parameters not for all the layers but for the layer k are described.

That is, the information specific to the layer k is described in L1D_layer_id, L1D_plp_lls_flag, L1D_plp_mod, L1D_plp_cod, L1D_plp_TI_num_ti_blocks, and L1D_plp_TI_num_fec_blocks_max in the L1D signaling of FIG. 56.

Further, the information common in the layer k and the layer k+1 is described in the L1D signaling of FIG. 56. That is, the information common in the layer k and the layer k+1 such as L1D_version, L1D_ntp_time, L1B_eas_code, L1D_num_ofdm_symbols, L1D_bs_present, L1D_bs_null_cells, L1D_scattered_pilot_pattern, L1D_scattered_pilot_boost, and L1D_num_layers is described in the L1D signaling of FIG. 56.

Both the information specific to the layer k and the information common in the layer k and the layer k+1 are described in the L1D signaling of FIG. 56 in this way.

FIG. 57 is a diagram illustrating the second example (layer k+1) of syntaxes of the L1D signaling in layered division multiplexing (LDM).

The information specific to the layer k+1 is described in L1D_layer_id, L1D_plp_lls_flag, L1D_plp_mod, L1D_plp_cod, L1D_plp_TI_num_ti_blocks, and L1D_plp_TI_num_fec_blocks max in the L1D signaling of FIG. 57.

Additionally, the information common in the layer k and the layer k+1 is described in the L1D signaling (FIG. 56) of the layer k as described above, and thus does not need to be described in the L1D signaling (FIG. 57) of the layer k+1.

Only the information specific to the layer k+1 is described in the L1D signaling of FIG. 57 in this way.

(Third Example of L1D Signaling)

In the third example, LID signaling is prepared for each (LDM layer) of the layer k and the layer k+1, and describes information specific to each layer therein. At this time, the information common in the layer k, the layer k+1, and the like is included in the L1D signaling of all the layers. That is, the information common in the layer k and the layer k+1 is included in both the L1D signaling of the layer k and the L1D signaling of the layer k+1 in the third example.

FIG. 58 is a diagram illustrating the third example (layer k) of syntaxes of the L1D signaling in layered division multiplexing (LDM).

The information specific to the layer k is described in L1D_layer_id, L1D_plp_lls_flag, L1D_plp_mod, L1D_plp_cod, L1D_plp_TI_num_ti_blocks, and L1D_plp_TI_num_fec_blocks_max in the L1D_signaling of FIG. 58.

Further, the information common in the layer k and the layer k+1 such as L1D_version, L1D_ntp_time, L1B_eas_code, L1D_num_ofdm_symbols, L1D_bs_present, L1D_bs_null_cells, L1D_scattered_pilot_pattern, L1D_scattered_pilot_boost, and L1D_num_layers is described in the L1D signaling of FIG. 58.

Both the information specific to the layer k and the information common in the layer k and the layer k+1 are described in the L1D signaling of FIG. 58 in this way.

FIG. 59 is a diagram illustrating the third example (layer k+1) of syntaxes of the L1D signaling in layered division multiplexing (LDM).

The information specific to the layer k+1 is described in L1D_layer_id, LD_plp_lls_flag, L1D_plp_mod, L1D_plp_cod, L1D_plp_TI_num_ti_blocks, and L1D_plp_TI_num_fec_blocks_max in the L1D signaling of FIG. 59.

Further, the information common in the layer k and the layer k+1 such as L1D_version, L1D_ntp_time, L1B_eas_code, L1D_num_ofdm_symbols, L1D_bs_present, L1D_bs_null_cells, L1D_scattered_pilot_pattern, L1D_scattered_pilot_boost, and L1D_num_layers is described in the L1D signaling of FIG. 59.

Both the information specific to the layer k+1 and the information common in the layer k and the layer k+1 are described in the L1D signaling of FIG. 59 in this way.

6. Second Solving Method

Since L1 signaling such as TMCC information is scattered and arranged in the physical layer frame in a case where frequency division multiplexing (FDM) such as current ISDB-T is employed as described above, there is a problem in which the reception apparatus 30 always requires one frame for synchronization, but the present technology solves the problem in the second solving method.
(Exemplary Centralized Arrangements of Signaling)

Figure 60:
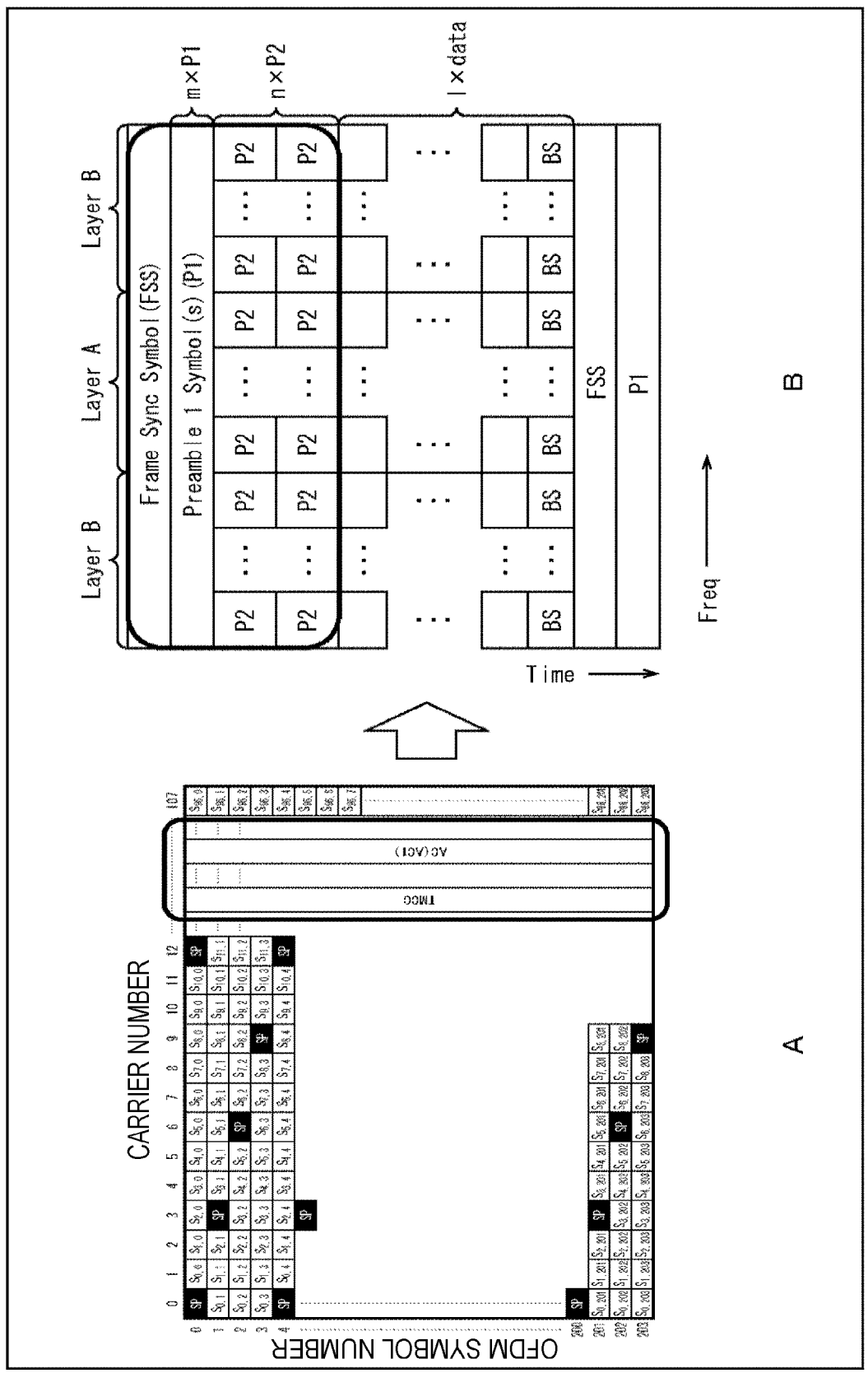
FIG. 60 is a diagram illustrating exemplary centralized arrangements of L1 signaling in a physical layer frame according to the present technology.

FIG. 60 is diagrams illustrating exemplary centralized arrangements of L1 signaling in a physical layer frame according to the present technology.

Additionally, in FIG. 60, a configuration of a physical layer frame according to the present technology is illustrated in B of FIG. 60, and a configuration of a physical layer frame in current ISDB-T is illustrated in A of FIG. 60 for comparison.

In A of FIG. 60, the horizontal direction indicates a frequency axis indicating the number of a subcarrier (carrier number), and the vertical direction indicates a time axis indicating the number of an OFDM symbol (OFDM symbol number)

Here, three transmission modes of modes 1, 2, and 3, which are different in OFDM subcarrier interval, are defined in ISDB-T. Further, four modulation systems such as quaternary phase shift keying (QPSK), 16 quadrature amplitude modulation (QAM), 64QAM, and differential QPSK (DQPSK) are defined as subcarrier modulation systems in ISDB-T.

A of FIG. 60 indicates a configuration of an OFDM segment in the modulation systems QPSK, 16QAM, and 64QAM in the transmission mode of mode 1. In A of FIG. 60, one OFDM frame is configured of 204 OFDM symbols.

In A of FIG. 60, Si, j indicates a data symbol (carrier symbol) of a subcarrier modulated by upper layer data, and the OFDM segment is configured in which each symbol (subcarrier) of scattered pilot (SP) as pilot signal, TMCC signal, and auxiliary channel (AC) signal is added to a data symbol.

A TMCC signal is directed to transmitting TMCC information as signaling (control information), and an AC signal is an extension signal for transmitting additional information associated with broadcasting. AC information such as emergency alarm information can be transmitted on the AC signal. That is, the TMCC information and the AC information may be L1 signaling.

Additionally, a configuration of an OFDM segment in current ISDB-T is described in Non-Patent Document 1 "3. 12 Frame configuration" and the like.

As illustrated in A of FIG. 60, L1 signaling such as TMCC information or AC information is arranged in the time direction in the physical layer frames in current ISDB-T, and is configured in units of physical layer frame. In other words, L1 signaling is scattered and arranged in the physical layer frames in current ISDB-T. Thus, the reception apparatus 30 has to process at least one physical layer frame until it acquires L1 signaling, and always requires (a time of) a frame length of one physical layer frame for synchronization.

On the other hand, the physical layer frame according to the present technology is configured as illustrated in B of FIG. 60.

B of FIG. 60 illustrates a configuration of a physical layer frame in frequency division multiplexing (FDM) assuming a direction from the left side toward the right side in the Figure as frequency (Freq) direction and a direction from the upper side toward the lower side in the Figure as time (Time) direction.

In B of FIG. 60, a frame synchronization symbol (FSS) is inserted at the head of the physical layer frame, and a P1 symbol (P1) is subsequently inserted.

Further, in a case where frequency division multiplexing (FDM) is employed, a predetermined frequency band (6 MHz, for example) is divided into a plurality of segments, and P2 symbols (P2), a data symbol, and a boundary symbol (BS) are arranged for each of the layer A and the layer B.

At this time, a frame synchronization symbol (FSS), a P1 symbol (P1), and P2 symbols (P2) are arranged in this order from the head of one physical layer frame as illustrated in the frame in B of FIG. 60. Here, P1 signaling is included in the P1 symbol. Further, P2 signaling such as L1B signaling or L1D signaling is included in the P2 symbol.

That is, the L1 signaling included in the P1 symbol and the P2 symbol are intensively arranged at the head of the physical layer frame. Thus, when processing the physical layer frame, the reception apparatus 30 can rapidly acquire the L1 signaling intensively arranged at the head, thereby reducing a time for synchronization.

Here, the L1 signaling can be acquired in almost half the time of a frame length of one physical layer frame, and consequently a time for synchronization can be further reduced than in the physical layer frame in current ISDB-T always requiring (a time of) a frame length of one physical layer frame.

Additionally, the configuration of the physical layer frame in B of FIG. 60 corresponds to the configuration of the physical layer frame in frequency division multiplexing (FDM) in FIG. 8. Further, the L1 signaling in frequency division multiplexing (FDM) has been described herein, but the L1 signaling is intensively arranged at the head of a physical layer frame in time division multiplexing (TDM) or a physical layer frame in layered division multiplexing (LDM) as illustrated in FIG. 5, FIG. 6, or FIG. 9.

The second solving method has been described above.

7. Third Solving Method

As described above, the current technologies have a problem in which a payload of a physical layer frame can be in FDM or LDM by use of frequency division multiplexing (FDM) or layered division multiplexing (LDM) while a frame synchronization symbol (FSS) or preamble cannot be in FDM or LDM, but the present technology solves the problem in the third solving method.
(Exemplary Arrangements of FSS, P1, and P2 in FDM and LDM)

Figure 61:
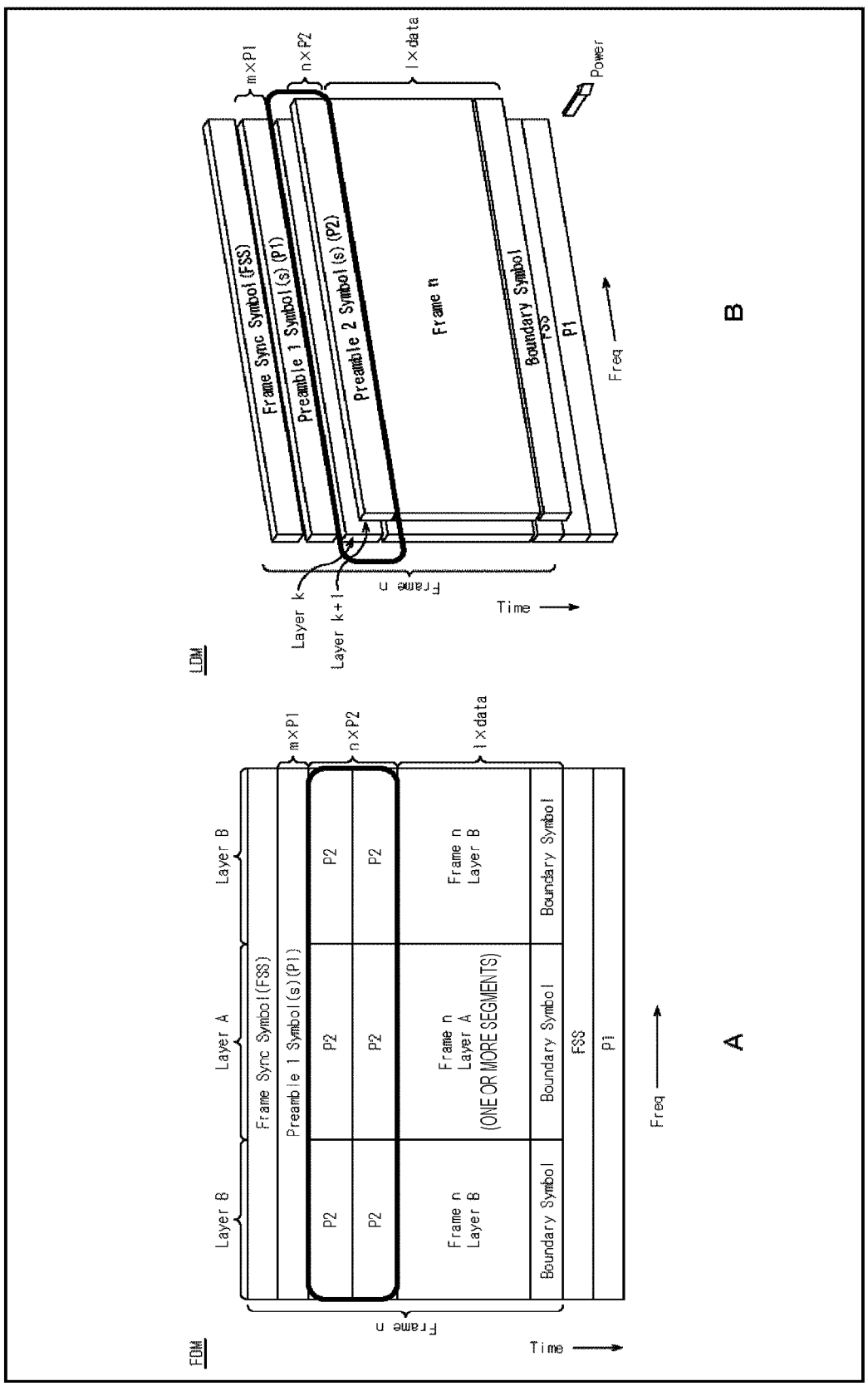
FIG. 61 is a diagram illustrating exemplary arrangements of frame synchronization symbol (FSS), P1 symbol (P1), and P2 symbol (P2) in frequency division multiplexing (FDM) and layered division multiplexing (LDM).

FIG. 61 is diagrams illustrating exemplary arrangements of a frame synchronization symbol (FSS), a P1 symbol (P1), and P2 symbols (P2) in frequency division multiplexing (FDM) and layered division multiplexing (LDM), respectively.

Additionally, in FIG. 61, A of FIG. 61 illustrates a configuration of a physical layer frame in frequency division multiplexing (FDM) and B of FIG. 61 illustrates a configuration of a physical layer frame in layered division multiplexing (LDM).

In A of FIG. 61, a frame synchronization symbol (FSS) is inserted at the head of the physical layer frame, and a P1 symbol (P1) is subsequently inserted.

Further, in frequency division multiplexing (FDM), a predetermined frequency band (6 MHz, for example) is divided into a plurality of segments, and P2 symbols (P2), a data symbol (Frame), and a boundary symbol (BS) are arranged for each layer (FDM layer) of the layer A and the layer B.

At this time, as illustrated in the frame in A of FIG. 61, the data arranged in the P2 symbols is divided so that the P2 symbols are arranged for each of the layer A and the layer B. Thus, in the physical layer frame illustrated in A of FIG.

61, not only the data symbol and the boundary symbol but also the preamble such as P2 symbols can be in FDM.

On the other hand, in B of FIG. 61, a frame synchronization symbol (FSS) is inserted at the head of the physical layer frame, and a P1 symbol (P1) is subsequently inserted.

Further, in layered division multiplexing (LDM), P2 symbols (P2), a data symbol (Frame), and a boundary symbol (BS) are arranged for each layer (LDM layer) with different transmission power.

At this time, the P2 symbols are arranged for each layer (LDM layer) of the layer k and the layer k+1 as illustrated in the frame in B of FIG. 61. Thus, not only the data symbol and the boundary symbol but also the preamble such as P2 symbols can be in LDM in the physical layer frame illustrated in B of FIG. 61.

In a case where frequency division multiplexing (FDM) or layered division multiplexing (LDM) is employed in the third solving method in this way, not only the data symbol and the boundary symbol but also the preamble such as P2 symbols can be in FDM or LDM.

Additionally, the configuration of the physical layer frame in A of FIG. 61 corresponds to the configuration of the physical layer frame in frequency division multiplexing (FDM) in FIG. 7, and the configuration of the physical layer frame in B of FIG. 61 corresponds to the configuration of the physical layer frame in layered division multiplexing (LDM) in FIG. 9.

The third solving method has been described above.

8. Operations of Reception Apparatus

The operations of the reception apparatus 30 of FIG. 1 will be described below with reference to FIG. 62 to FIG. 66.

(1) Processings in Physical Layer Frame in Time Division Multiplexing (TDM)
(Exemplary Frame Processings)

Figure 62:
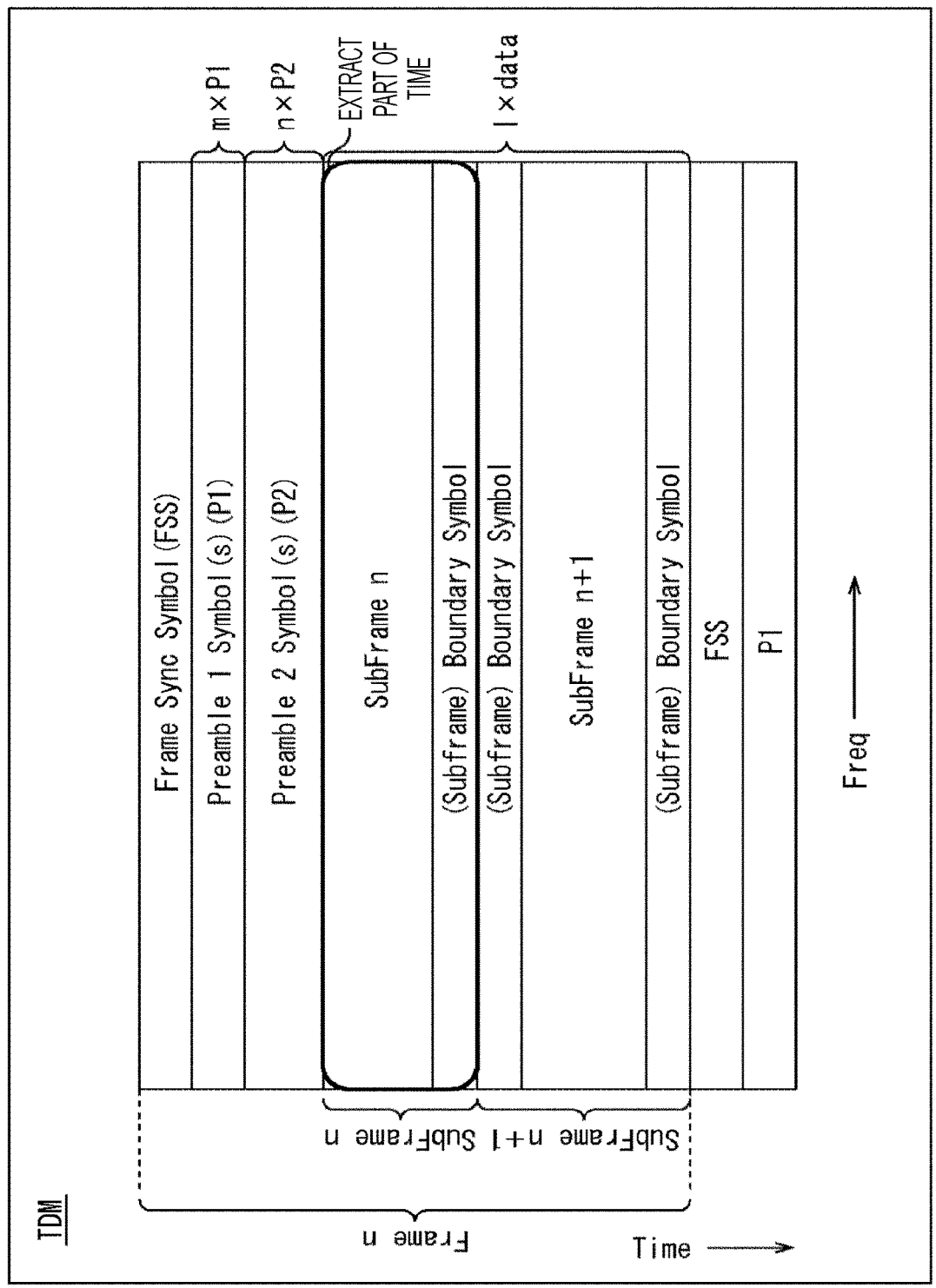
FIG. 62 is a diagram for explaining reception-side processings on a physical layer frame in time division multiplexing (TDM).

FIG. 62 is a diagram for explaining reception-side processings on a physical layer frame in time division multiplexing (TDM).

As illustrated in FIG. 62, a frame synchronization symbol (FSS), a P1 symbol (P1), and a P2 symbol (P2) are arranged in this order from the head of a physical layer frame in time division multiplexing (TDM). Further, in the example of FIG. 62, the physical layer frame corresponds to subframes, and thus two subframes of subframe n and subframe n+1 are arranged subsequent to the P2 symbol (P2).

Here, the reception apparatus 30 can recognize the head of the physical layer frame by the frame synchronization symbol (FSS), and can acquire information (P1 signaling) indicating the P1 symbol. Further, the reception apparatus 30 can extract information (P2 signaling) indicating the P2 symbol and further the data symbol from the physical layer frame by use of the P1 signaling information.

Further, in a case where two or more subframes are arranged, the modulation parameters can be changed per subframe, and the L1D signaling includes the information indicating the modulation parameters per subframe. Thus, the reception apparatus 30 can extract the data symbol of each subframe from the physical layer frame by use of the L1D signaling information (such as information in the subframe loop of the L1D signaling of FIG. 48).

Additionally, the reception apparatus 30 can selectively extract the data symbol in the subframe n in the frame of FIG. 62 from the physical layer frame by use of the L1D signaling information.

(2) Processings in Physical Layer Frame in Frequency Division Multiplexing (FDM)
(Exemplary Frame Processings)

Figure 63:
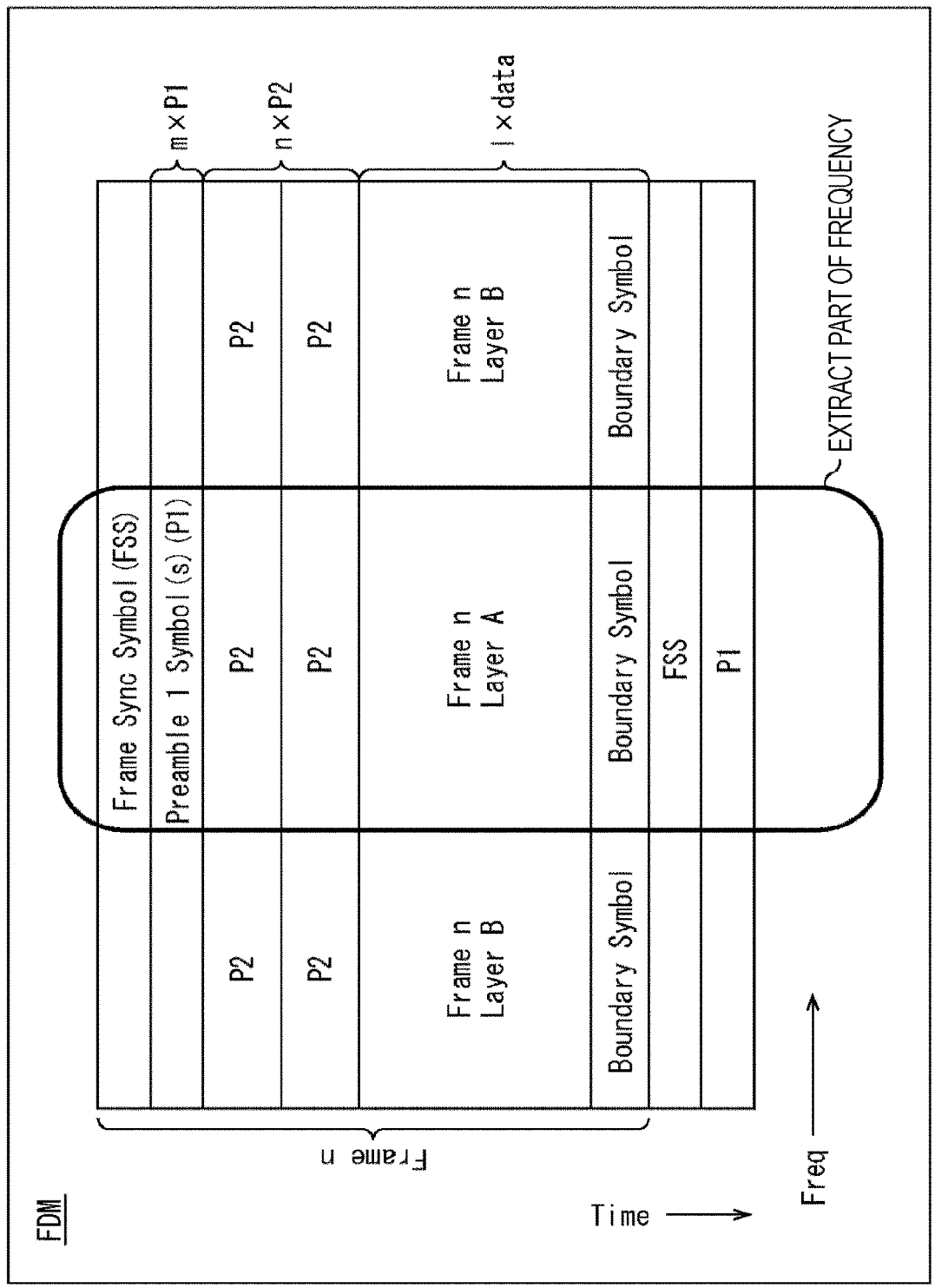
FIG. 63 is a diagram for explaining reception-side processings on a physical layer frame in frequency division multiplexing (FDM).

FIG. 63 is a diagram for explaining reception-side processings on a physical layer frame in frequency division multiplexing (FDM).

As illustrated in FIG. 63, in frequency division multiplexing (FDM), a frame synchronization symbol (FSS) and a P1 symbol (P1) are arranged in this order from the head of a physical layer frame, and P2 symbols (P2), a data symbol (Frame), and a boundary symbol (BS) are further arranged for each layer (FDM layer) of the layer A and the layer B.

Here, in a case where the reception apparatus 30 receives an entire predetermined frequency band (6 MHz, for example) assigned to channels, it can recognize the head of the physical layer frame by the frame synchronization symbol (FSS), and can acquire information (P1 signaling) indicating the P1 symbol. Further, the reception apparatus 30 can extract information (P2 signaling) indicating the P2 symbols and further the data symbol from the physical layer frame by use of the P1 signaling information.

Figure 64:
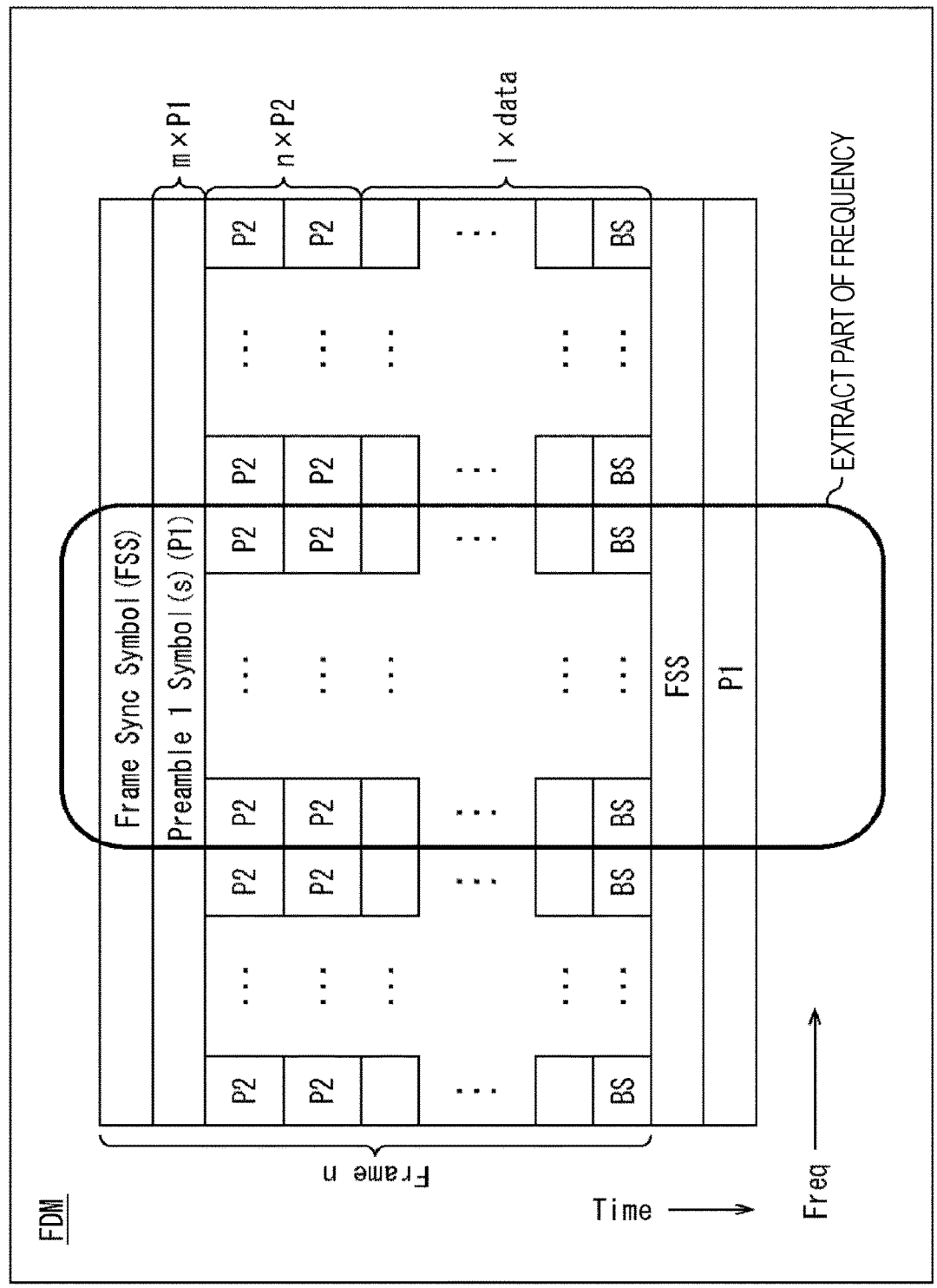
FIG. 64 is a diagram for explaining reception-side processings on a physical layer frame in frequency division multiplexing (FDM).

Further, in a case where the reception apparatus 30 receives a partial band corresponding to the layer A in the predetermined frequency band, it receives the frequency band in the frame of FIG. 63. Here, FIG. 64 illustrates a detailed configuration of the physical layer frame of FIG. 63. That is, FIG. 64 illustrates P2 symbols, a data symbol, and a boundary symbol for each layer of the layer A and the layer B in units of segment.

In FIG. 64, each layer of the layer A and the layer B is configured of a plurality of segments, and the total number of segments is assumed at 35, for example, and the layer A including the center segment can be assumed to have nine center segments. That is, in a case where the reception apparatus 30 receives the partial band corresponding to the layer A, it receives only the frequency band for the nine center segments.

In this case, the reception apparatus 30 can recognize the head of the physical layer frame by the sufficiently robust frame synchronization symbol (FSS), and can acquire the information (P1 signaling) indicating the P1 symbol. Further, the reception apparatus 30 can recognize the number of segments (nine segments, for example) of the layer A on the basis of the P1 signaling information (such as P1_P2_waveform_structure in FIG. 31).

Thus, the reception apparatus 30 can extract information (P2 signaling) indicating the P2 symbols and further the data symbol from the partial band corresponding to the layer A configured of the nine center segments by use of the P1 signaling information.

Figure 65:
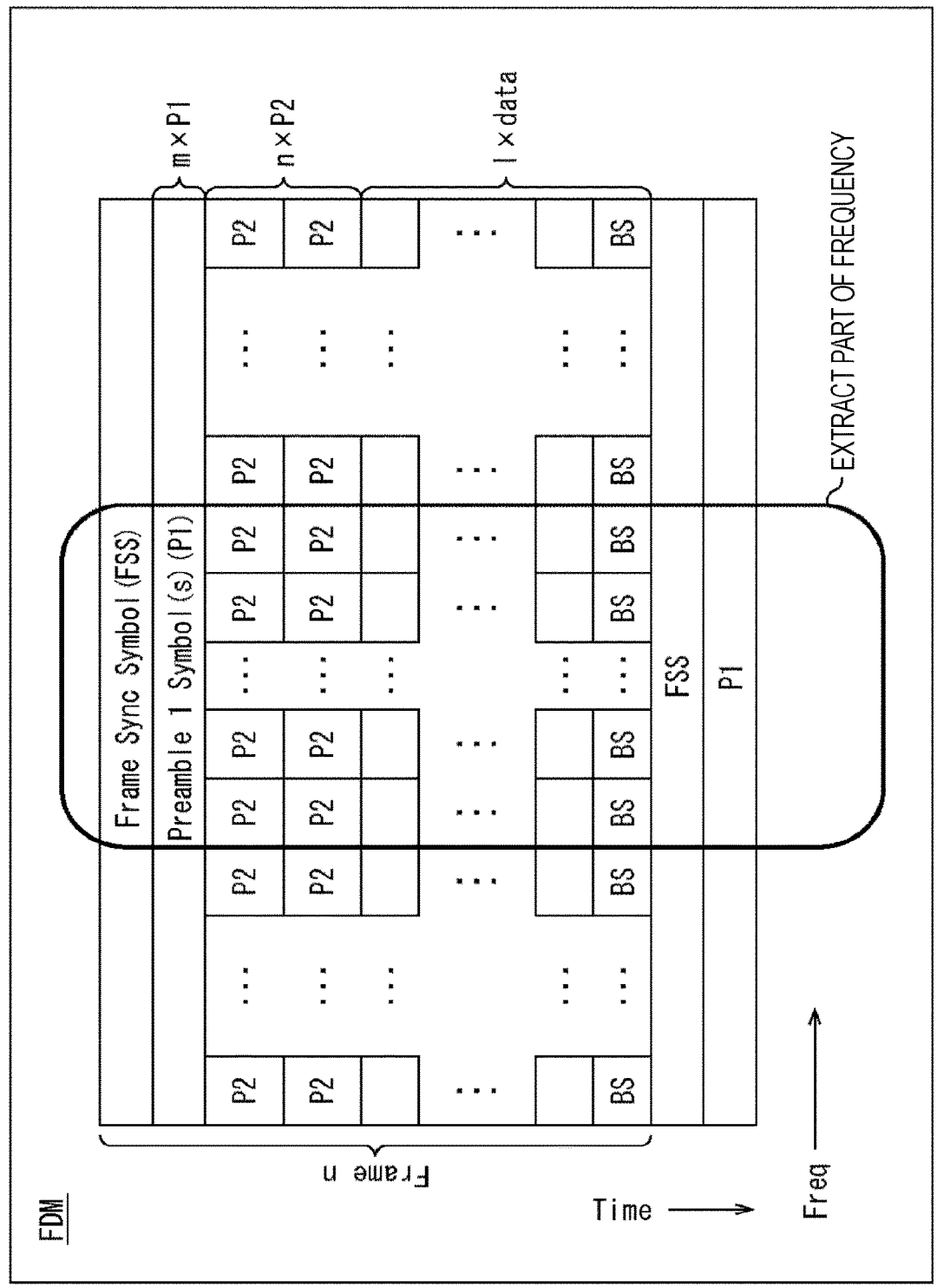
FIG. 65 is a diagram for explaining reception-side processings on a physical layer frame in frequency division multiplexing (FDM).

Additionally, for example, in a case where the total number of segments is 35 in FIG. 65, even if the seven center segments are assumed as layer A, the reception apparatus 30 receives the frequency band for the nine center segments as partial band thereby to extract the P2 signaling and further the data symbol by use of the P1 signaling information.

(3) Processings in Physical Layer Frame in Layered Division Multiplexing (LDM)
(Exemplary Frame Processings)

Figure 66:
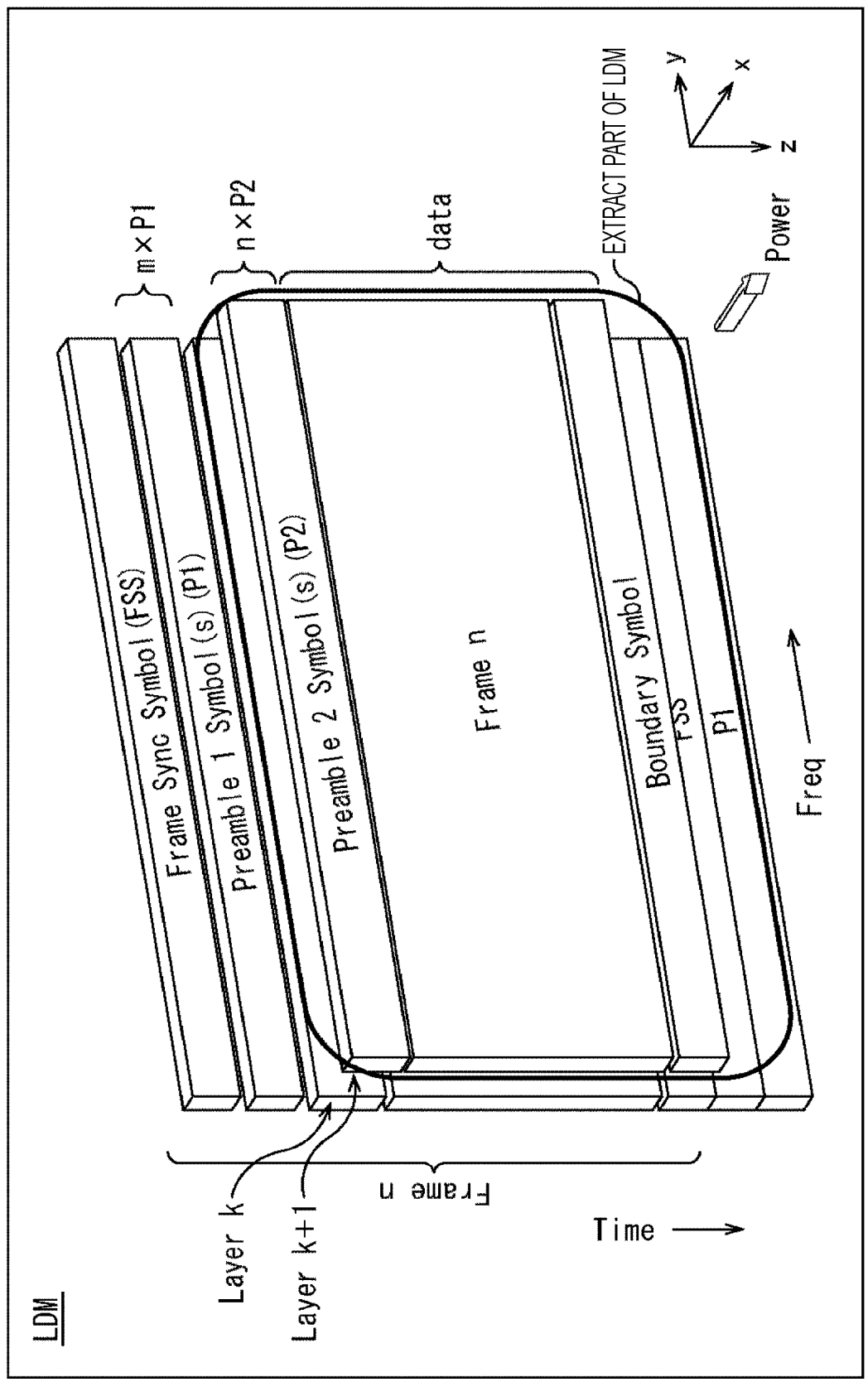
FIG. 66 is a diagram for explaining reception-side processings on a physical layer frame in layered division multiplexing (LDM).

FIG. 66 is a diagram for explaining reception-side processings on a physical layer frame in layered division multiplexing (LDM).

As illustrated in FIG. 66, in layered division multiplexing (LDM), a frame synchronization symbol (FSS) and a P1 symbol (P1) are arranged in this order from the head of a physical layer frame, and a P2 symbol (P2), a data symbol (Frame), and a boundary symbol (BS) are arranged in this order. However, the P2 symbol (P2), the data symbol (Frame), and the boundary symbol (BS) are arranged for each layer (LDM layer) of the layer k and the layer k+1.

Here, the reception apparatus 30 can recognize the head of the physical layer frame by the frame synchronization symbol (FSS), and can acquire information (P1 signaling) indicating the P1 symbol. Further, the reception apparatus 30 can extract information (P2 signaling) indicating the P2 symbol and further the data symbol for each layer of the layer k and the layer k+1 by use of the P1 signaling information.

Additionally, the reception apparatus 30 can selectively extract part of the layer (LDM layer) in the frame of FIG. 66 from the physical layer frame by use of the L1 signaling information.

9. Flows of Processings in Solving Methods

Flows of transmission-side and reception side processings in the first solving method to the third solving method will be described be low with reference to the flowcharts of FIG. 67 to FIG. 71.

(Processings in First Solving Method)

Flows of transmission-side and reception-side processings in the first solving method will be first described with reference to the flowcharts of FIG. 67 and FIG. 68. However, the synchronization pattern solving method using different synchronization patterns and the P1 signaling solving method using P1 signaling in the first solving method will be described in this order as described above.

(Processings in Synchronization Pattern Solving Method)

The flows of transmission-side and reception-side processings in the synchronization patternsolving method will be described with reference to the flowchart of FIG. 67.

In step S11, the component processing part 111 to the data processing part 114 in the data processing apparatus 10 generate streams.

In the processing in step S11, the multiplexer 13 multiplexes a component stream from the component processing part 111 and an upper layer signaling stream from the signaling generation part 112. The data processing part 114 then processes the resultant multiplexed stream thereby to generate a stream of transmission data.

In step S12, the data processing part 211 in the transmission apparatus 20 processes the stream acquired in the processing in step S11 thereby to generate a physical layer frame.

In the processing in step S12, the physical layer frame is generated such that different synchronization patterns (such as the synchronization patterns of FIG. 28) for a common frame synchronization symbol (FSS) are employed for each multiplexing system (FDM, TDM, or LDM) in the synchronization pattern solving method.

In step S13, the modulation part 212 in the transmission apparatus 20 performs a necessary processing on the physical layer frame acquired in the processing in step S12, and transmits the resultant broadcasting signal from the transmission antenna installed in the transmission station.

In step S21, the RF part 311 in the reception apparatus 30 receives the broadcasting signal transmitted from the transmission antenna installed in the transmission station.

In step S22, the demodulation part 312 in the reception apparatus 30 processes the physical layer frame acquired from the broadcasting signal received in the processing in step S21.

In the processing in step S22, a multiplexing system (FDM, TDM, or LDM) is determined on the basis of the different synchronization patterns (such as the synchronization patterns of FIG. 28) for the common frame synchronization symbol (FSS) in the synchronization pattern solving method, and the physical layer frame is processed depending on the determination result, thereby acquiring a stream of transmission data.

In step S23, the data processing part 313 in the reception apparatus 30 processes the stream acquired in the processing in step S22.

In the processing in step S23, the stream of transmission data is processed thereby to acquire the upper layer signaling and component streams. The upper layer signaling and component streams are then processed thereby to reproduce contents of broadcasting program or the like.

The flows of processings in the synchronization pattern solving method have been described above.

(Processings in P1 Signaling Solving Method)

Flows of transmission-side and reception-side processings in the P1 signaling solving method will be described with reference to the flowchart of FIG. 68.

Figure 67:
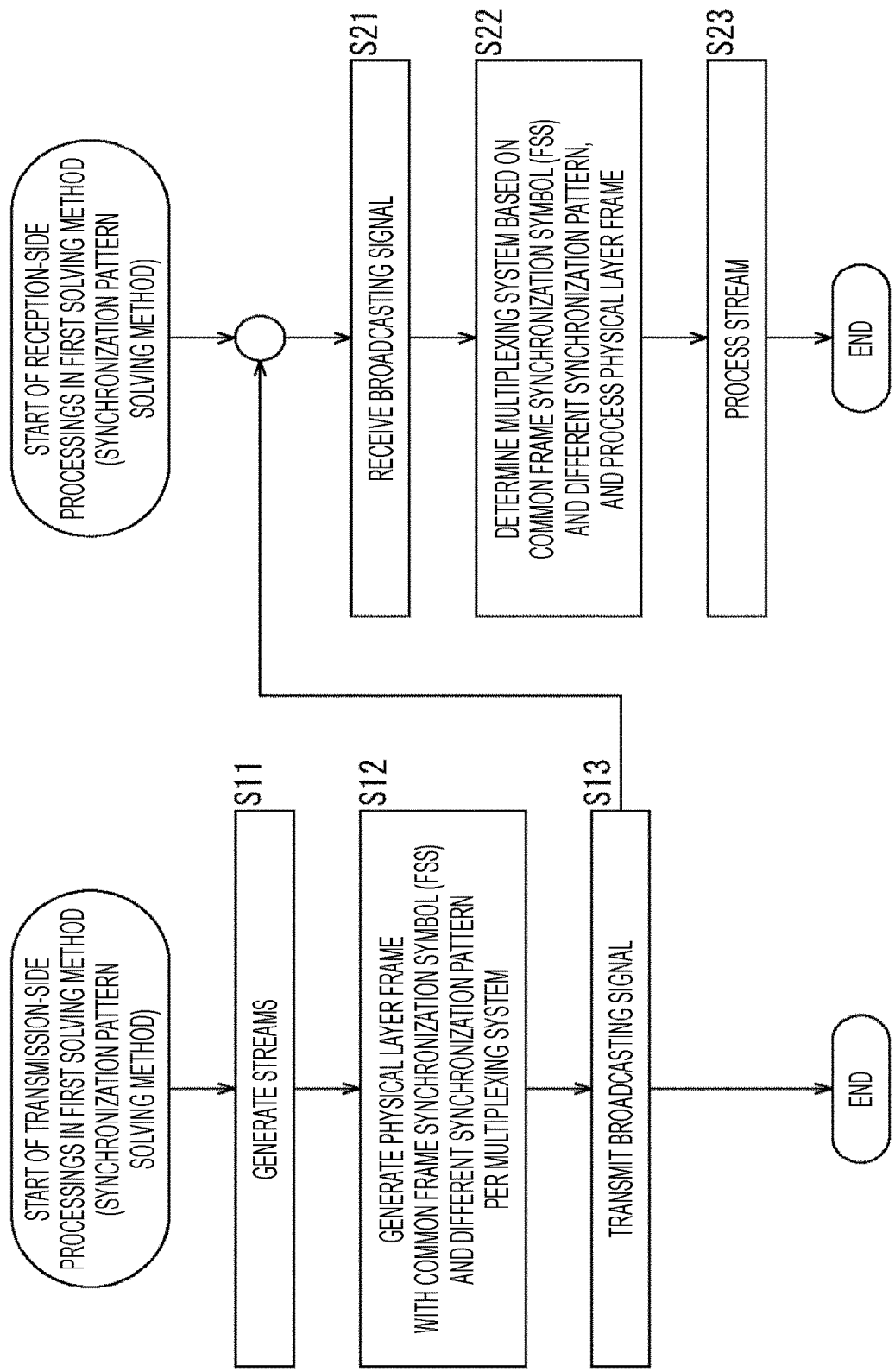
FIG. 67 is a flowchart for explaining the flows of transmission-side and reception-side processings in the first solving method (synchronization pattern solving method).
Figure 68:
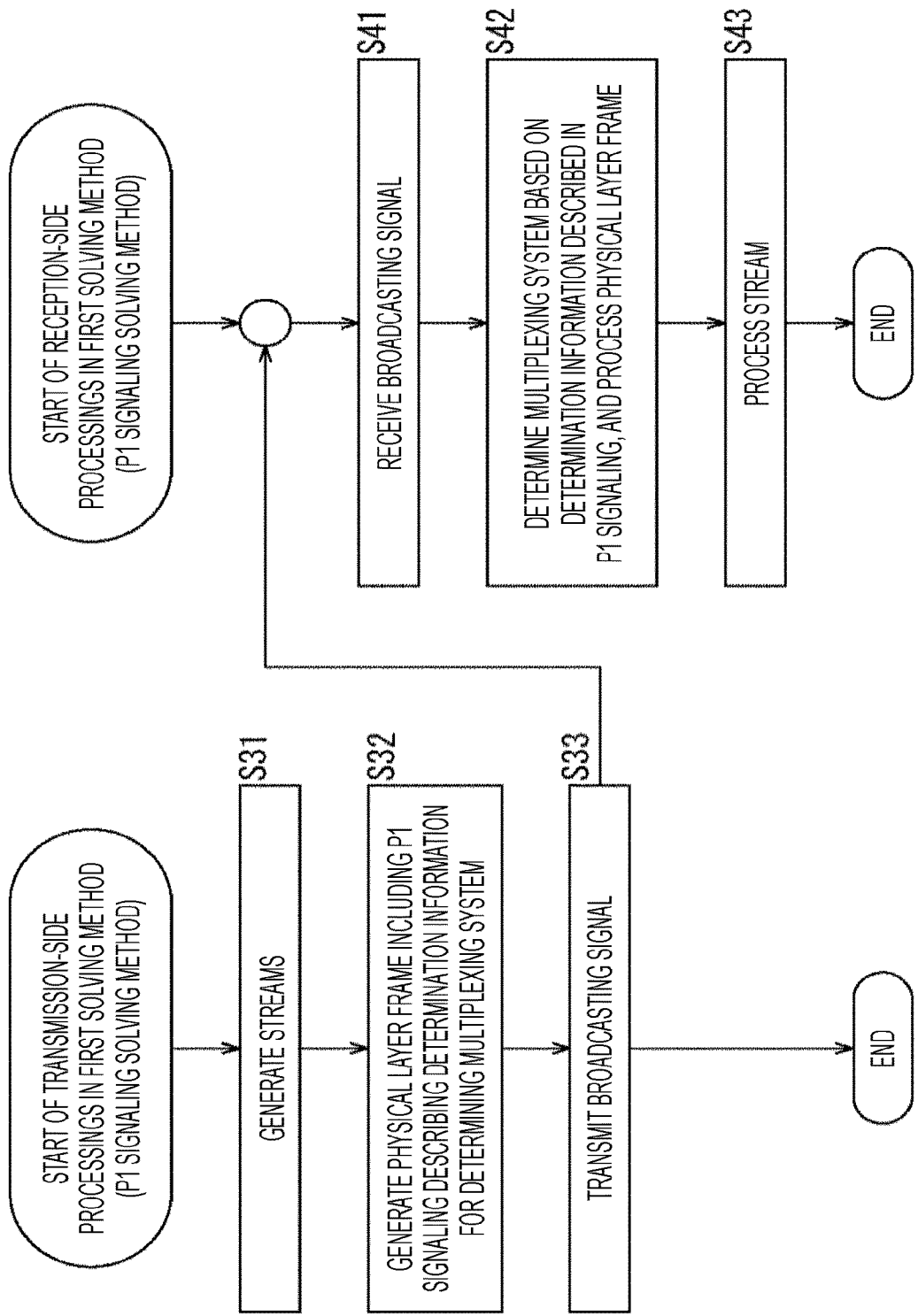
FIG. 68 is a flowchart for explaining the flows of transmission-side and reception-side processings in the first solving method (P1 signaling solving method).

Additionally, the transmission-side processings in steps S31 and S33 and the reception-side processings in steps S41 and S43 in FIG. 68 are similar to the processings in steps S11 and S13 in FIG. 67 and the processings in steps S21 and S23 in FIG. 67, and thus the description thereof will be omitted.

In step S32 on transmission side, the data processing part 211 in the transmission apparatus 20 processes the stream acquired in the processing in step S31 thereby to generate a physical layer frame.

In the processing in step S32, the physical layer frame including P1 signaling describing the determination information (such as P1 Frame_Multiplexing in FIG. 37, FIG. 39, and FIG. 41) for determining a multiplexing system (FDM, TDM, or LDM) in the P1 signaling solving method is generated. However, a common frame synchronization symbol (FSS) and the same synchronization pattern are employed in the physical frame.

On the other hand, in step S42 on reception side, the demodulation part 312 in the reception apparatus 30 processes the physical layer frame acquired from the broadcasting signal received in the processing in step S41.

In the processing in step S42, a multiplexing system (FDM, TDM, or LDM) is determined on the basis of the determination information (such as P1_Frame_Multiplexing in FIG. 37, FIG. 39, and FIG. 41) described in the P1 signaling in the P1 signaling solving method, and the physical layer frame is processed depending on the determination result, thereby acquiring a stream of transmission data.

The flows of processings in the P1 signaling solving method have been described above.

(Processings in Second Solving Method)

Figure 69:
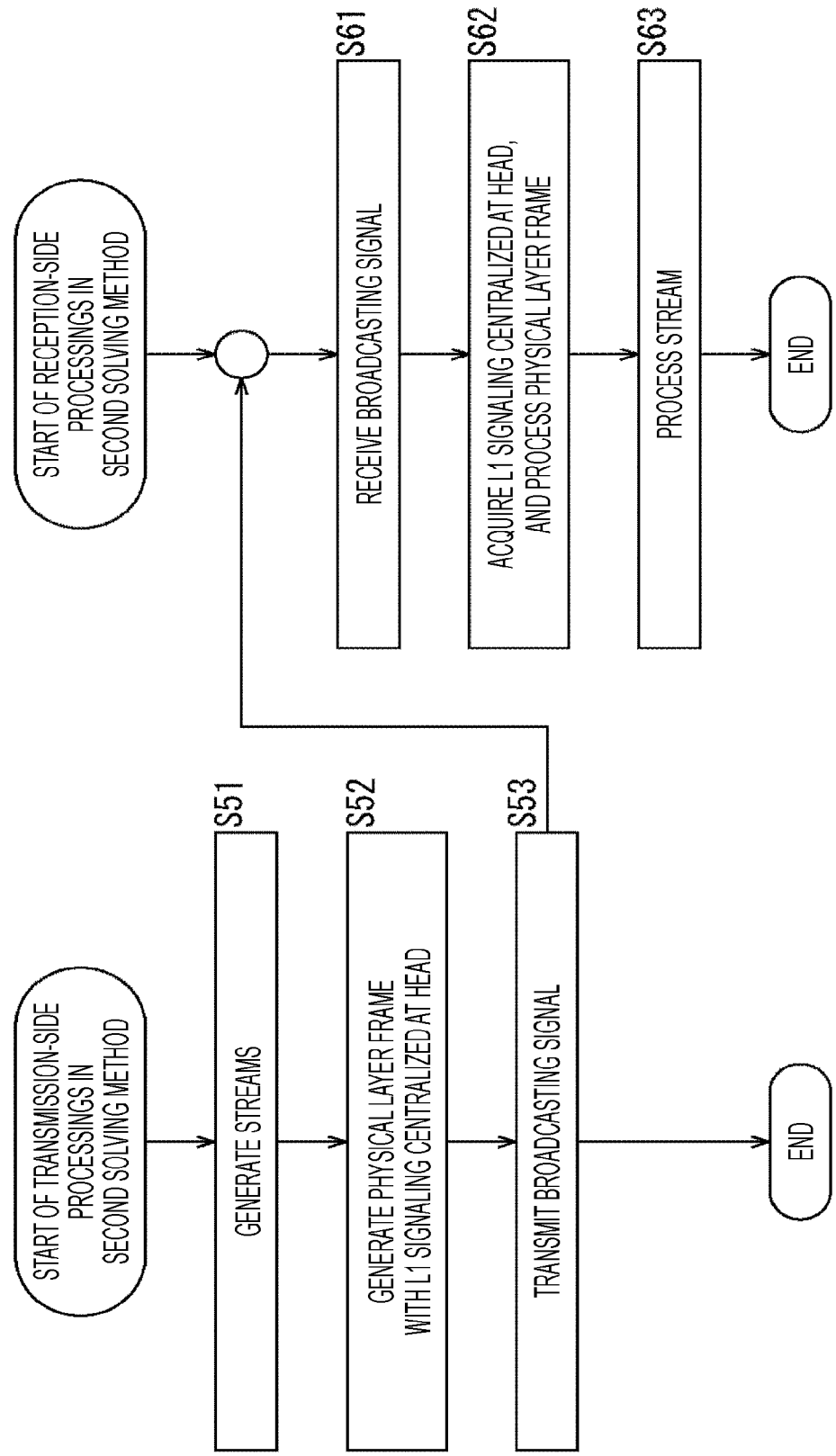
FIG. 69 is a flowchart for explaining the flows of transmission-side and reception-side processings in the second solving method.

Flows of transmission-side and reception-side processings in the second solving method will be described below with reference to the flowchart of FIG. 69.

In step S51, streams are generated by the component processing part 111 to the data processing part 114 in the data processing apparatus 10 similarly as in the processing in step S11 in FIG. 67.

In step S52, the data processing part 211 in the transmission apparatus 20 processes the streams acquired in the processing in step S51 thereby to generate a physical layer frame.

In the processing in step S52, the physical layer frame (such as the physical layer frame in B of FIG. 60) is generated such that the L1 signaling such as L1B signaling or L1D signaling are intensively arranged at the head (toward the head) in the second solving method.

In step S53, a broadcasting signal is transmitted by the modulation part 212 in the transmission apparatus 20 similarly as in the processing in step S13 in FIG. 67. In step S61, the broadcasting signal is received by the RF part 311 in the reception apparatus 30 similarly as in step S21 in FIG. 67.

In step S62, the demodulation part 312 in the reception apparatus 30 processes the physical layer frame acquired from the broadcasting signal received in the processing in step S61.

In the processing in step S62, the L1 signaling intensively arranged at the head (toward the head) of the physical layer frame (such as the physical layer frame in B of FIG. 60) are acquired and the physical layer frame is processed in the second solving method, thereby acquiring a stream of transmission data.

In step S63, the stream is processed by the data processing part 313 in the reception apparatus 30 similarly as in step S23 in FIG. 67.

The flows of processings in the second solving method have been described above.

(Processings in Third Solving Method)

Flows of transmission-side and reception-side processings in the third solving method will be finally described with reference to the flowcharts of FIG. 70 and FIG. 71. However, the two solving methods for frequency division multiplexing (FDM) and layered division multiplexing (LDM) in the third solving method will be described in this order as described above.

(Processings for FDM)

Flows of transmission-side and reception-side processings in the third solving method for FDM will be described with reference to the flowchart of FIG. 70.

In step S71, streams are generated by the component processing part 111 to the data processing part 114 in the data processing apparatus 10 similarly as in the processing in step S11 in FIG. 67.

In step S72, the data processing part 211 in the transmission apparatus 20 processes the streams acquired in the processing in step S71 thereby to generate a physical layer frame.

In the processing in step S72, (P2 signaling of) P2 symbols are arranged for each layer (FDM layer) of the layer A and the layer B to be in FDM in the third solving method for FDM, thereby generating the physical layer frame (such as the physical layer frame in A of FIG. 61).

In step S73, a broadcasting signal is transmitted by the modulation part 212 in the transmission apparatus 20 similarly as in the processing in step S13 in FIG. 67. In step S81, the broadcasting signal is received by the RF part 311 in the reception apparatus 30 similarly as in step S21 in FIG. 67.

In step S82, the demodulation part 312 in the reception apparatus 30 processes the physical layer frame acquired from the broadcasting signal received in the processing in step S81.

In the processing in step S82, the P2 signaling (L1B signaling or L1D signaling) is acquired from the P2 symbols in FDM in the physical layer frame (such as the physical layer frame inAof FIG. 61) and the physical layer frame is processed in the third solving method for FDM, thereby acquiring a stream of transmission data.

In step S83, the stream is processed by the data processing part 313 in the reception apparatus 30 similarly as in step S23 in FIG. 67.

The flows of processings in the third solving method for FDM have been described above.

(Processings for LDM)

Flows of transmission-side and reception-side processings in the third solving method for LDM will be described with reference to the flowchart of FIG. 71.

Figure 70:
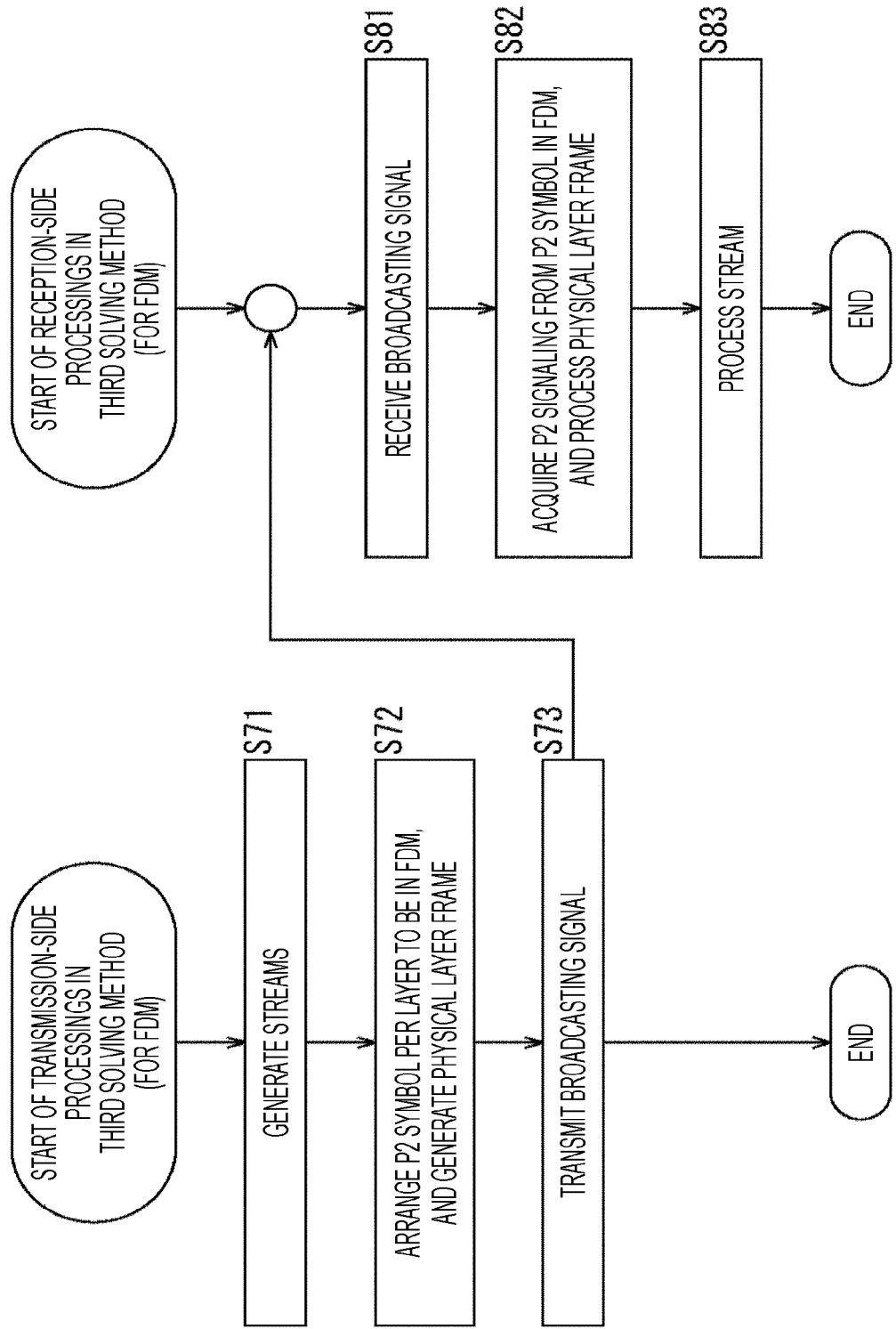
FIG. 70 is a flowchart for explaining the flows of transmission-side and reception-side processings in the third solving method (for FDM).
Figure 71:
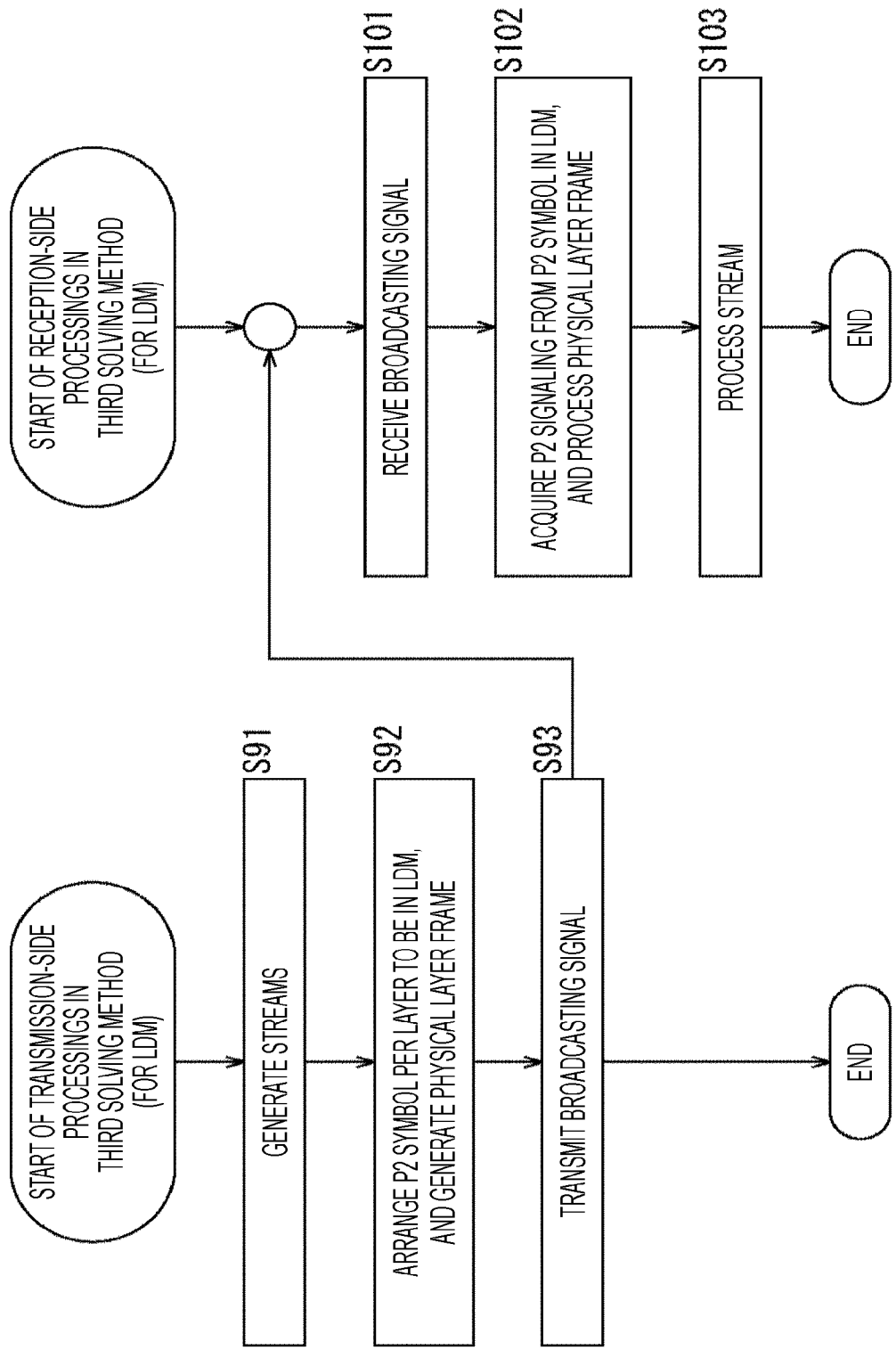
FIG. 71 is a flowchart for explaining the flows of transmission-side and reception side processings in the third solving method (for LDM).

Additionally, the transmission-side processings in steps S91 and S93 and the reception-side processings in steps S101 and S103 in FIG. 71 are similar to the processings in steps S71 and S73 in FIG. 70 and the processings in steps S81 and S83 in FIG. 70, and thus the description thereof will be omitted.

In step S92 on transmission side, the data processing part 211 in the transmission apparatus 20 processes the streams acquired in the processing in step S91 thereby to generate a physical layer frame.

In the processing in step S92, (P2 signaling of) a P2 symbol is arranged for each layer (LDM layer) of the layer k and the layer k+1 to be in LDM in the third solving method for LDM, thereby generating the physical layer frame (such as the physical layer frame in B of FIG. 61).

On the other hand, in step S102 on reception side, the demodulation part 312 in the reception apparatus 30 processes the physical layer frame acquired from the broadcasting signal received in the processing in step S101.

In the processing in step S102, the P2 signaling (L1B signaling or L1D signaling) is acquired from the P2 symbol in LDM in the physical layer frame (such as the physical layer frame in B of FIG. 61) and the physical layer frame is processed in the third solving method for LDM, thereby acquiring a stream of transmission data.

The flows of processings in the third solving method for LDM have been described above.

10. Variants (Combinations of Solving Methods)

Each of the first solving method to the third solving method has been individually described above, but two or more solving methods can be combined.

For example, in a combination of the first solving method and the second solving method, L1 signaling can be intensively arranged at the head of a physical layer frame with a common frame synchronization symbol (FSS) and the same synchronization pattern. Thereby, the reception apparatus 30 can determine a multiplexing system while processing the physical layer frame, and can reduce a time for synchronization at the same time.

Further, in a combination of the first solving method and the third solving method, the determination information for determining a multiplexing system can be included as PI signaling information in a physical layer frame, and a P2 symbol can be arranged per layer (FDM layer or LDM layer). Thereby, the reception apparatus 30 can determine a multiplexing system while processing the physical layer frame, and can make preamble in the physical layer frame in FDM or LDM (Other Multiplexing Systems)

Further, the three multiplexing systems such as frequency division multiplexing (FDM), time division multiplexing (TDM), and layered division multiplexing (LDM) have been described above by way of example, but other multiplexing systems such as layered time division multiplexing (LDM_TDM) or layered frequency division multiplexing (LDM_FDM) may be included. Further, the multiplexing systems are not limited to the three multiplexing systems such as frequency division multiplexing (FDM), time division multiplexing (TDM), and layered division multiplexing (LDM), and any of two or more multiplexing systems may be employed.

(Applications to Other Broadcasting Systems)

Integrated services digital broadcasting (ISDB) employed in Japan and the like has been mainly described as a digital TV broadcasting standard, but the present technology may be applied to advanced television systems committee (ATSC) employed in the U.S. and the like, digital video broadcasting (DVB) employed in European countries and the like, or the like.

That is, a system for realizing a plurality of multiplexing systems (such as FDM, TDM, and LDM) in the same broadcasting system is not defined also in current ATSC or DVB, but a plurality of multiplexing systems can be more flexibly realized in the same broadcasting system according to the present technology. Further, the above layers (FDM layers) can be conceptually assumed as physical layer pipe (PLP). In this case, the plurality of layers may be denoted as multiple-PLP (M-PLP).

Further, the present technology can be applied to the digital TV broadcasting standards such as satellite broadcasting using broadcasting satellite (BS), communication satellite (CS) or the like, or wired broadcasting for cable TV (CATV) or the like in addition to the terrestrial broadcasting.

(Other Exemplary Packets or Signaling)

Further, the names of packet, frame, signaling (control information), and the like described above are exemplary, and other names may be used. However, a difference in names is formal, and the substantial contents of packet, frame, signaling, and the like of interest are not different.

Further, the present technology can be applied to predetermined standards and the like (other than the digital broadcasting standards) defined assuming the use of a transmission path other than broadcasting network, that is, for example, communication lines (communication networks) including Internet, telephone network or the like. In this case, a communication line such as Internet is used as a transmission path of the transmission system 1 (FIG. 1), and the functions of the data processing apparatus 10 and the transmission apparatus 20 can be provided by a communication server provided over the Internet. The communication server and the reception apparatus 30 then make bidirectional communication via the communication line.

11. Configuration of Computer

Figure 72:
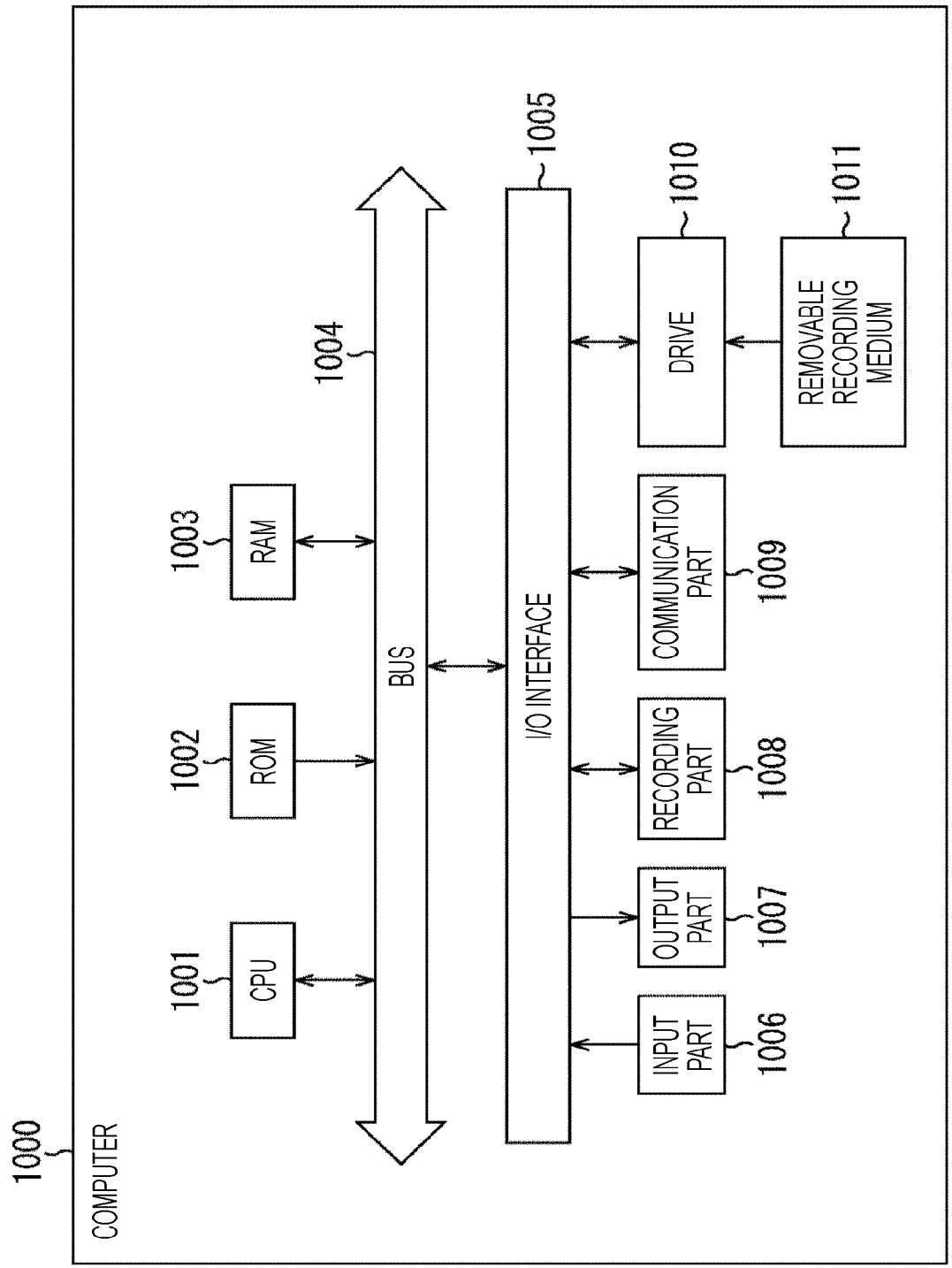
FIG. 72 is a block diagram illustrating an exemplary configuration of a computer.

A series of processings described above can be performed in hardware and in software. In a case where the processings are performed in software, the programs configuring the software are installed in a computer. FIG. 72 is a diagram illustrating an exemplary hardware configuration of a computer performing the processings by the programs.

In a computer 1000, a central processing unit (CPU) 1001, a read only memory (ROM) 1002, and a random access memory (RAM) 1003 are mutually connected via a bus 1004. The bus 1004 is further connected with an I/O interface 1005. The I/O interface 1005 is connected with an input part 1006, an output part 1007, a recording part 1008, a communication part 1009, and a drive 1010.

The input part 1006 is configured of a keyboard, a mouse, a microphone, or the like. The output part 1007 is configured of a display, a speaker, or the like. The recording part 1008 is configured of a hard disc, a nonvolatile memory, or the like. The communication part 1009 is configured of a network interface or the like. The drive 1010 drives a removable recording medium 1011 such as magnetic disc, optical disc, magnetooptical disc, or semiconductor memory.

In the thus-configured computer 1000, the CPU 1001 loads and executes the programs recorded in the ROM 1002 or the recording part 1008 into the RAM 1003 via the I/O interface 1005 and the bus 1004 so that the processings are performed.

The programs executed in the computer 1000 (the CPU 1001) can be recorded and provided in the removable recording medium 1011 as a package medium, for example. Further, the programs can be provided via a wired or wireless transmission medium such as local area network, Internet, or digital satellite broadcasting.

In the computer 1000, the removable recording medium 1011 is mounted on the drive 1010 so that the programs can be installed in the recording part 1008 via the I/O interface 1005. Further, the programs can be received by the communication part 1009 via a wired or wireless transmission medium and installed in the recording part 1008. Additionally, the programs can be previously installed in the ROM 1002 or the recording part 1008.

Here, in the present specification, the processings performed by the computer according to the programs are not necessarily performed in time series in the orders described in the flowcharts. That is, the processings performed by the computer according to the programs include processings performed in parallel or individually (such as parallel processings or processings by objects). Further, the programs may be processed in one computer (processor), or may be distributed and processed in a plurality of computers.

Additionally, embodiments of the present technology are not limited to the above embodiments, and may be variously modified without departing from the spirit of the present technology.

Further, the present technology can take the following configurations.

(1)

A transmission apparatus including:

a generation part configured to generate a physical layer frame multiplexed in a predetermined multiplexing system and including determination information capable of determining a multiplexing system; and a transmission part configured to transmit the physical layer frame as a broadcasting signal.

(2)

The transmission apparatus according to (1), in which the determination information is a different synchronization pattern per multiplexing system used in a frame synchronization symbol inserted at the head of the physical layer frame.

(3)

The transmission apparatus according to (1), in which the determination information is information indicating physical layer signaling included in the physical layer frame.

(4)

The transmission apparatus according to (3), in which the signaling is P1 signaling of a P1 symbol.

(5)

The transmission apparatus according to any of (1) to (4), in which the multiplexing system includes at least one of frequency division multiplexing (FDM), time division multiplexing (TDM), or layered division multiplexing (LDM)

(6)

A transmission method including:

generating a physical layer frame multiplexed in a predetermined multiplexing system and including determination information capable of determining a multiplexing system; and transmitting the physical layer frame as a broadcasting signal.

(7)

A reception apparatus including:

a reception part configured to receive a broadcasting signal; and a processing part configured to determine a multiplexing system of a physical layer frame multiplexed ina predetermined multiplexing system on the basis of determination information included in the physical layer frame acquired from the broadcasting signal, and to process the physical layer frame.

(8)

The reception apparatus according to (7), in which the determination information is a different synchronization pattern per multiplexing system used in a frame synchronization symbol inserted at the head of the physical layer frame.

(9)

The reception apparatus according to (7), in which the determination information is information indicating physical layer signaling included in the physical layer frame.

(10)

The reception apparatus according to (9), in which the signaling is P1 signaling of a P1 symbol.

(11)

The reception apparatus according to any of (7) to (10), in which the multiplexing system includes at least one of frequency division multiplexing (FDM), time division multiplexing (TDM), or layered division multiplexing (LDM)

(12)

A reception method including:

receiving a broadcasting signal; and determining a multiplexing system of a physical layer frame multiplexed in a predetermined multiplexing system on the basis of determination information included in the physical layer frame acquired from the broadcasting signal, and processing the physical layer frame.

(13)

A transmission apparatus including:

a generation part configured to generate a physical layer frame multiplexed in a predetermined multiplexing system, the physical layer frame with physical layer signaling intensively arranged at its head; and a transmission part configured to transmit the physical layer frame as a broadcasting signal.

(14)

A transmission method including:

generating a physical layer frame multiplexed in a predetermined multiplexing system, the physical layer frame with physical layer signaling intensively arranged at its head; and transmitting the physical layer frame as a broadcasting signal.

(15)

A reception apparatus including:

a reception part configured to receive a broadcasting signal; and a processing part configured to acquire physical layer signaling intensively arranged at the head of a physical layer frame acquired from the broadcasting signal, and to process the physical layer frame.

(16)

A reception method including:

receiving a broadcasting signal; and acquiring physical layer signaling intensively arranged at the head of a physical layer frame acquired from the broadcasting signal, and processing the physical layer frame.

(17)

A transmission apparatus including:

a generation part configured to generate a physical layer frame multiplexed in a predetermined multiplexing system, the physical layer frame with P2 signaling of a P2 symbol arranged per layer; and a transmission part configured to transmit the physical layer frame as a broadcasting signal.

(18)

A transmission method including:

generating a physical layer frame multiplexed in a predetermined multiplexing system, the physical layer frame with P2 signaling of a P2 symbol arranged per layer; and transmitting the physical layer frame as a broadcasting signal.

(19)

A reception apparatus including:

a reception part configured to receive a broadcasting signal; and a processing part configured to acquire P2 signaling of a P2 symbol arranged per layer of a physical layer frame acquired from the broadcasting signal, and to process the physical layer frame.

(20)

A reception method including:

receiving a broadcasting signal; and acquiring P2 signaling of a P2 symbol arranged per layer of a physical layer frame acquired from the broadcasting signal, and processing the physical layer frame.

REFERENCE SIGNS LIST

1 Transmission system
10, 10-1 to 10-N Data processing apparatus
20 Transmission apparatus
30, 30-1 to 30-M Reception apparatus
40, 40-1 to 40-N Communication line
50 Broadcasting transmission path
111 Component processing part
112 Signaling generation part
113 Multiplexer
114 Data processing part
211 Data processing part
212 Modulation part
311 RF part
312 Demodulation part
313 Data processing part
1000 Computer
1001 CPU

The invention claimed is:

1. A transmission apparatus comprising:

circuitry configured to generate a physical layer frame multiplexed by a type of multiplexing technique of a plurality of different types of division multiplexing techniques for transmitting a broadcast signal and including determination information indicating which of the plurality of different types of division multiplexing techniques is the type of multiplexing technique used to generate the physical layer frame; and transmit a broadcast signal that includes the physical layer frame, wherein the physical layer frame includes a bootstrap portion, a preamble portion, and a payload portion, the bootstrap portion being located at a head of the physical layer frame, the determination information is included in the bootstrap portion of the physical layer frame, the type of multiplexing technique used to generate the physical layer frame is determined from the plurality of different types of division multiplexing techniques based on the determination information included in the bootstrap portion of the physical layer frame, the determination information including a synchronization pattern or preamble signal value that identifies the type of multiplexing technique, and the synchronization pattern or the preamble signal value is different for each of the plurality of different types of division multiplexing techniques.

2. The transmission apparatus according to claim 1, wherein the determination information is the synchronization pattern used in a frame synchronization symbol inserted at the head of the physical layer frame, and the synchronization pattern is different for each of the plurality of different types of division multiplexing techniques.

3. The transmission apparatus according to claim 1, wherein the determination information is the preamble signal value indicating physical layer signaling included in the physical layer frame.

4. The transmission apparatus according to claim 3, wherein the signaling is P1 signaling of a P1 symbol.

5. The transmission apparatus according to claim 1, wherein the plurality of different types of division multiplexing techniques includes frequency division multiplexing, time division multiplexing, and layered division multiplexing, and each of the frequency division multiplexing, the time division multiplexing, and the layered division multiplexing is identified by a different synchronization pattern or a different preamble signal value.

6. A transmission method comprising:

generating a physical layer frame multiplexed in a by a type of multiplexing technique of a plurality of different types of division multiplexing techniques for transmitting a broadcast signal and including determination information indicating which of the plurality of different types of division multiplexing techniques is the type of multiplexing technique used to generate the physical layer frame; and transmitting a broadcast signal that includes the physical layer frame, wherein the physical layer frame includes a bootstrap portion, a preamble portion, and a payload portion, the bootstrap portion being located at a head of the physical layer frame, the determination information is included in the bootstrap portion of the physical layer frame, the type of multiplexing technique used to generate the physical layer frame is determined from the plurality of different types of division multiplexing techniques based on the determination information included in the bootstrap portion of the physical layer frame, the determination information including a synchronization pattern or preamble signal value that identifies the type of multiplexing technique, and the synchronization pattern or the preamble signal value is different for each of the plurality of different types of division multiplexing techniques.

7. A reception apparatus comprising:

circuitry configured to receive a broadcast signal including a physical layer frame that is multiplexed by a type of multiplexing technique of a plurality of different types of division multiplexing techniques for transmitting the broadcast signal and includes determination information indicating which of the plurality of different types of division multiplexing techniques is the type of multiplexing technique used to generate the physical layer frame;

determine the type of multiplexing technique used to generate the physical layer frame from the plurality of different types of division multiplexing techniques based on the determination information included in the physical layer frame acquired from the broadcast signal, the determination information including a synchronization pattern or preamble signal value that identifies the type of multiplexing technique; and process the physical layer frame, wherein the physical layer frame includes a bootstrap portion, a preamble portion, and a payload portion, the bootstrap portion being located at a head of the physical layer frame, the determination information is included in the bootstrap portion of the physical layer frame, and the synchronization pattern or the preamble signal value is different for each of the plurality of different types of division multiplexing techniques.

8. The reception apparatus according to claim 7, wherein the determination information is the synchronization pattern used in a frame synchronization symbol inserted at the head of the physical layer frame, and the synchronization pattern is different for each of the plurality of different types of division multiplexing techniques.

9. The reception apparatus according to claim 7, wherein the determination information is the preamble signal value indicating physical layer signaling included in the physical layer frame.

10. The reception apparatus according to claim 9, wherein the signaling is P1 signaling of a P1 symbol.

11. A reception method comprising:

receiving a broadcast signal including a physical layer frame that is multiplexed by a type of multiplexing technique of a plurality of different types of division multiplexing techniques for transmitting the broadcast signal and includes determination information indicating which of the plurality of different types of division multiplexing techniques is the type of multiplexing technique used to generate the physical layer frame;

determining the type of multiplexing technique used to generate the physical layer frame from the plurality of different types of division multiplexing techniques based on the determination information included in the physical layer frame acquired from the broadcast signal, the determination information including a synchronization pattern or preamble signal value that identifies the type of multiplexing technique; and processing the physical layer frame, wherein the physical layer frame includes a bootstrap portion, a preamble portion, and a payload portion, the bootstrap portion being located at a head of the physical layer frame, the determination information is included in the bootstrap portion of the physical layer frame, and the synchronization pattern or the preamble signal value is different for each of the plurality of different types of division multiplexing techniques.

12. A transmission apparatus comprising:

circuitry configured to generate a physical layer frame multiplexed in a frequency division multiplexing system, the physical layer frame including physical layer signaling arranged at a head of the physical layer frame, the physical layer signaling including a frame synchronization symbol and P1 and P2 signaling, the head of the physical layer corresponding to adjacent time instances across a frequency range of the physical layer frame, the frame synchronization symbol being provided in a first time instance of the adjacent time instances, the P1 signaling being provided in a second time instance of the adjacent time instances, and the P2 signaling being provided in a third time instance of the adjacent time instances, the second time instance and the third time instance being after the first time instance; and transmit a broadcasting signal that includes the physical layer frame, wherein the adjacent time instances include a starting time instance of the physical layer frame.

13. A transmission method comprising:

generating a physical layer frame multiplexed in a frequency division multiplexing system, the physical layer frame including physical layer signaling arranged at a head of the physical layer frame, the physical layer signaling including a frame synchronization symbol and P1 and P2 signaling, the head of the physical layer corresponding to adjacent time instances across a frequency range of the physical layer frame, the frame synchronization symbol being provided in a first time instance of the adjacent time instances, the P1 signaling being provided in a second time instance of the adjacent time instances, and the P2 signaling being provided in a third time instance of the adjacent time instances, the second time instance and the third time instance being after the first time instance; and transmitting a broadcasting signal that includes the physical layer frame, wherein the adjacent time instances include a starting time instance of the physical layer frame.

14. A reception apparatus comprising:

circuitry configured to receive a broadcast signal including a physical layer frame that is multiplexed in a frequency division multiplexing system, the physical layer frame including physical layer signaling arranged at a head of the physical layer frame, the physical layer signaling including a frame synchronization symbol and P1 and P2 signaling, the frame synchronization symbol being provided in a first time instance of adjacent time instances, the P1 signaling being provided in a second time instance of the adjacent time instances, and the P2 signaling being provided in a third time instance of the adjacent time instances, the second time instance and the third time instance being after the first time instance;

acquire the physical layer signaling arranged at the head of the physical layer frame acquired from the broadcast signal, the head of the physical layer corresponding to the adjacent time instances across a frequency range of the physical layer frame; and process the physical layer frame, wherein the adjacent time instances include a starting time instance of the physical layer frame.

15. A reception method comprising:

receiving a broadcast signal including a physical layer frame that is multiplexed in a frequency division multiplexing system, the physical layer frame including physical layer signaling arranged at a head of the physical layer frame, the physical layer signaling including a frame synchronization symbol and P1 and P2 signaling, the frame synchronization symbol being provided in a first time instance of adjacent time instances, the P1 signaling being provided in a second time instance of the adjacent time instances, and the P2 signaling being provided in a third time instance of the adjacent time instances, the second time instance and the third time instance being after the first time instance;

acquiring the physical layer signaling arranged at the head of the physical layer frame acquired from the broadcast signal, the head of the physical layer corresponding to the adjacent time instances across a frequency range of the physical layer frame; and processing the physical layer frame, wherein the adjacent time instances include a starting time instance of the physical layer frame.

16. A transmission apparatus comprising:

circuitry configured to generate a physical layer frame multiplexed in one of a frequency division multiplexing (FDM) system and a layered division multiplexing (LDM) system, the physical layer frame including P2 signaling of at least one P2 symbol of P2 symbols of the physical layer frame and a data symbol arranged per each of a plurality of layers of the FDM system or the LDM system in the physical layer frame such that the P2 signaling and the data symbol are multiplexed in the one of the FDM system and the LDM system; and transmit a broadcast signal that includes the physical layer frame, wherein the P2 signaling of the P2 symbols is arranged in a plurality of layers of the physical layer frame of the one of the FDM system and the LDM system to multiplex the P2 signaling in the one of the FDM system and the LDM system.

17. A transmission method comprising:

generating a physical layer frame multiplexed in one of a frequency division multiplexing (FDM) system and a layered division multiplexing (LDM) system, the physical layer frame including P2 signaling of at least one P2 symbol of P2 symbols of the physical layer frame and a data symbol arranged per each of a plurality of layers of the FDM system or the LDM system in the physical layer frame such that the P2 signaling and the data symbol are multiplexed in the one of the FDM system and the LDM system; and transmitting a broadcast signal that includes the physical layer frame, wherein the P2 signaling of the P2 symbols is arranged in a plurality of layers of the physical layer frame of the one of the FDM system and the LDM system to multiplex the P2 signaling in the one of the FDM system and the LDM system.

18. A reception apparatus comprising:
circuitry configured to
- receive a broadcast signal that includes a physical layer frame multiplexed in one of a frequency division multiplexing (FDM) system and a layered division multiplexing (LDM) system;
- acquire P2 signaling of P2 symbols, at least one P2 symbol of the P2 symbols of the physical layer frame and a data symbol being arranged per each of a plurality of layers of the FDM system or the LDM system in the physical layer frame acquired from the broadcast signal such that the P2 signaling and the data symbol are multiplexed in the one of the FDM system and the LDM system; and
- process the physical layer frame, wherein the P2 signaling of the P2 symbols is arranged in the plurality of layers of the physical layer frame of the one of the FDM system and the LDM system to multiplex the P2 signaling in the one of the FDM system and the LDM system.

19. A reception method comprising:
- receiving a broadcast signal that includes a physical layer frame multiplexed in one of a frequency division multiplexing (FDM) system and a layered division multiplexing (LDM) system; and
- acquiring P2 signaling of P2 symbols, at least one P2 symbol of the P2 symbols and a data symbol being arranged per each of a plurality of layers of the FDM system or the LDM system in the physical layer frame acquired from the broadcast signal such that the P2 signaling and the data symbol are multiplexed in the one of the FDM system and the LDM system; and
- processing the physical layer frame, wherein the P2 signaling of the P2 symbols is arranged in the plurality of layers of the physical layer frame of the one of the FDM system and the LDM system to multiplex the P2 signaling in the one of the FDM system and the LDM system.

* * * * *